(12) United States Patent
  Kawamura et al.

(10) Patent No.: US 9,178,616 B2
(45) Date of Patent: Nov. 3, 2015

(54) STATION-SIDE APPARATUS AND FRAME TRANSFER APPARATUS

(75) Inventors: Tomoaki Kawamura, Tokyo (JP); Shoko Ohteru, Tokyo (JP); Ritsu Kusaba, Tokyo (JP); Masami Urano, Tokyo (JP); Mamoru Nakanishi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 40 days.

(21) Appl. No.: 14/119,186

(22) PCT Filed: Jun. 27, 2012

(86) PCT No.: PCT/JP2012/066425
§ 371 (c)(1),
(2), (4) Date: Nov. 20, 2013

(87) PCT Pub. No.: WO2013/002282
PCT Pub. Date: Jan. 3, 2013

(65) Prior Publication Data
US 2014/0105602 A1 Apr. 17, 2014

(30) Foreign Application Priority Data

Jun. 27, 2011 (JP) ................... 2011-142183
Jun. 29, 2011 (JP) ................... 2011-143958
Jun. 29, 2011 (JP) ................... 2011-143960

(51) Int. Cl.
*H04J 14/02* (2006.01)
*H04L 12/26* (2006.01)
*H04B 10/25* (2013.01)
*H04L 12/825* (2013.01)
*H04L 12/44* (2006.01)
*H04L 12/46* (2006.01)

(52) U.S. Cl.
CPC ............ *H04B 10/2503* (2013.01); *H04L 12/44* (2013.01); *H04L 12/4641* (2013.01); *H04L 47/25* (2013.01)

(58) Field of Classification Search
CPC . H04B 10/032; H04B 10/272; H04L 12/4641
USPC ................................. 398/43, 66, 79
See application file for complete search history.

(56) References Cited

U.S. PATENT DOCUMENTS 8,428,457 B2* 4/2013 Mizutani et al. ................ 398/25
2008/0166127 A1* 7/2008 Kazawa et al. ................ 398/79

(Continued)

FOREIGN PATENT DOCUMENTS

| JP | 2009-260668 A | 11/2009 |
| JP | 2010-074214 A | 4/2010 |
| JP | 2011-097257 A | 5/2011 |

OTHER PUBLICATIONS

"Lecture on Basic Technologies [GE-PON Technology] Part 1, What Is PON?", NTT Technical Review, vol. 17, No. 8, pp. 71-74, 2005.

*Primary Examiner* — Oommen Jacob
(74) *Attorney, Agent, or Firm* — Blakely Sokoloff Taylor & Zafman LLP

(57) ABSTRACT

Identifier information (LLID) of an ONU and transfer instruction information indicating a transmission system as the output destination of a downstream frame are registered in a table (22) in correspondence with each of the destination IDs of the ONUs or user apparatuses connected to the ONUs. Upon receiving a downstream frame from a host apparatus, a frame transfer processing unit (20) acquires an LLID and transfer instruction information corresponding to the destination ID of the downstream frame from the table (22).

13 Claims, 41 Drawing Sheets

(56) References Cited

U.S. PATENT DOCUMENTS

| | | | |
|---|---|---|---|
| 2010/0002591 A1* | 1/2010 | Mizutani et al. | 370/241.1 |
| 2011/0103792 A1* | 5/2011 | Kimura | 398/2 |
| 2014/0105602 A1* | 4/2014 | Kawamura et al. | 398/66 |
| 2014/0112659 A1* | 4/2014 | Kawamura et al. | 398/33 |

* cited by examiner

| No. | MAC ADDRESS | ENTRY ENABLE/ DISABLE | DOWNSTREAM OUTPUT DESTINATION SELECTION INFORMATION | LLID |
|---|---|---|---|---|
| 1 | 0x55_44_33_22_11_00 | 1 | 0 | 0x0000 |
| 2 | 0x55_44_33_22_11_01 | 1 | 1 | 0x0001 |
| 3 | 0x55_44_33_22_11_02 | 1 | 1 | 0x0002 |
| 4 | 0x55_44_33_22_11_03 | 0 | 0 | 0x0003 |
| ⋮ | | | | |

FIG.10

| BUCKET NUMBER | INTRA-BUCKET ENTRY NUMBER | | | | | |
|---|---|---|---|---|---|---|
| | 0 | 1 | ... | j | ... | N-1 |
| 0 | DATA0_0 | DATA0_1 | ... | DATA0_j | ... | DATA0_N-1 |
| 1 | DATA1_0 | DATA1_1 | ... | DATA1_j | ... | DATA1_N-1 |
| ⋮ | ⋮ | ⋮ | ⋱ | ⋮ | ⋱ | ⋮ |
| i | DATAi_0 | DATAi_1 | ... | DATAi_j | ... | DATAi_N-1 |
| ⋮ | ⋮ | ⋮ | ⋱ | ⋮ | ⋱ | ⋮ |
| M-1 | DATAM-1_0 | DATAM-1_1 | ... | DATAM-1_j | ... | DATAM-1_N-1 |

DETAILS OF DATA i_j

| MAC ADDRESS (6byte) | ENTRY ENABLE/ DISABLE (1bit) | DOWNSTREAM OUTPUT DESTINATION SELECTION INFORMATION (1bit) | LLID (15bit) |

FIG.19

| No. | MAC ADDRESS | ENTRY ENABLE/ DISABLE | DOWNSTREAM OUTPUT DESTINATION SELECTION INFORMATION | LLID | POST-AGING RECEPTION STATE |
|---|---|---|---|---|---|
| 1 | 0x55_44_33_22_11_00 | 1 | 0 | 0x0000 | UNRECEIVED |
| 2 | 0x55_44_33_22_11_01 | 1 | 1 | 0x0001 | UNRECEIVED |
| 3 | 0x55_44_33_22_11_02 | 1 | 1 | 0x0002 | RECEIVED |
| 4 | 0x55_44_33_22_11_03 | 0 | 0 | 0x0003 | RECEIVED |
| ⋮ | | | | | |

FIG.20

| BUCKET NUMBER | INTRA-BUCKET ENTRY NUMBER | | | | | |
|---|---|---|---|---|---|---|
| | 0 | 1 | ⋯ | j | ⋯ | N-1 |
| 0 | DATA0_0 | DATA0_1 | ⋯ | DATA0_j | ⋯ | DATA0_N-1 |
| 1 | DATA1_0 | DATA1_1 | ⋯ | DATA1_j | ⋯ | DATA1_N-1 |
| ⋮ | ⋮ | ⋮ | ⋮ | ⋮ | ⋱ | ⋮ |
| i | DATAi_0 | DATAi_1 | ⋯ | DATAi_j | ⋯ | DATAi_N-1 |
| ⋮ | ⋮ | ⋮ | | ⋮ | ⋱ | ⋮ |
| M-1 | DATAM-1_0 | DATAM-1_1 | ⋯ | DATAM-1_j | ⋯ | DATAM-1_N-1 |

DETAILS OF DATA i_j

| MAC ADDRESS (6byte) | ENTRY ENABLE/ DISABLE (1bit) | DOWNSTREAM OUTPUT DESTINATION SELECTION INFORMATION (1bit) | LLID (15bit) | POST-AGING RECEPTION STATE (1bit) |
|---|---|---|---|---|

| No. | MAC ADDRESS | ENTRY ENABLE/ DISABLE | LLID | TRANSFER INSTRUCTION INFORMATION | |
|---|---|---|---|---|---|
| | | | | TRANSFER INSTRUCTION (0 SYSTEM) | TRANSFER INSTRUCTION (1 SYSTEM) |
| 0 | 55_44_33_22_11_00 | ENABLE | 0x0000 | 1 | 0 |
| 1 | 55_44_33_22_11_01 | ENABLE | 0x0001 | 0 | 1 |
| 2 | 55_44_33_22_11_02 | ENABLE | 0x0002 | 0 | 1 |
| 3 | 55_44_33_22_11_03 | DISABLE | 0x0003 | 0 | 0 |
| : | : | : | : | : | : |

STATION-SIDE APPARATUS AND FRAME TRANSFER APPARATUS

TECHNICAL FIELD

The present invention relates to an optical communication technology. More specifically, the present invention relates to a station-side apparatus (optical line terminal: to be referred to as an "OLT" hereinafter) that connects the host apparatus and a PON (Passive Optical Network) system of a carrier network (service network) and a frame transfer technology in the OLT.

BACKGROUND ART

In 2009, standardization of 10G-EPON (10 Gigabit Ethernet Passive Optical Network: "Ethernet" is a registered trademark) in IEEE802.3av was completed. The 10G-EPON features transfer 10-times faster than GE-PON (Gigabit Ethernet Passive Optical Network: see non-patent literature 1) already in widespread use. In addition, the existing GE-PON and the 10G-EPON can be used in a coexistent state.

When using the GE-PON and the 10G-EPON in a coexistent state, the WDM technology that uses different wavelengths for a 1G downstream signal and a 10G downstream signal is used, and the TDM technology is used between 1G downstream signals and between 10G downstream signals. As for upstream signals, a 1G upstream signal and a 10G upstream signal use the same wavelength, and the TDMA technology is used for both the 1G upstream signal and the 10G upstream signal. That is, three different kinds of wavelengths are used for the 1G downstream signal, the 10G downstream signal, and the upstream signals.

FIG. 41 shows an example of the arrangement of a conventional 10G-EPON system. As shown in FIG. 41, in the 10G-EPON, the GE-PON and the 10G-EPON can be used in a coexistent state. For this reason, 1G-ONUs (Optical Network Units) and 10G-ONUs can be connected to one OLT.

FIG. 42 is a block diagram showing the arrangement of an OLT for the conventional GE-PON (see patent literature 1). FIG. 43 is a block diagram showing the arrangement of the main part of frame transfer processing used in the OLT for the conventional GE-PON.

In the conventional OLT, a frame transfer processing unit 60 decides the destination ONU of the downstream frame by the destination MAC address of the downstream frame. To do this, a MAC address registration unit 61A registers the transmission source MAC address of a received upstream frame in a MAC address search table 61B in association with the LLID (Logical Link ID) of the transmission source ONU. A MAC address search unit 61C has a function of, when the destination MAC address of the received downstream frame is already registered in the MAC address search table 61B, judging the LLID associated with the MAC address as the destination ONU.

In the OLT shown in FIG. 42, a first transmission/reception circuit 52 is a circuit that transmits/receives a frame to/from the ONU via the PON connected to a PON port 51.

A second transmission/reception circuit 58 is a circuit that serves as an interface to a carrier network NW connected via an SNI (Service Node Interface) port 59 provided on the SNI side.

A frame demultiplexing unit 53 is a processing unit that transmits, out of frames received by the first transmission/reception circuit 52, a frame (control frame used to control the PON) for an OLT 50 to a control frame processing unit 54 and transmits the remaining frames to the frame transfer processing unit 60.

A frame multiplexing unit 56 is a processing unit that time-divisionally multiplexes a downstream frame from the frame transfer processing unit 60 and a control frame from the control frame processing unit 54 and transmits them to the first transmission/reception circuit 52.

The frame transfer processing unit 60 is a processing unit that transfers frames received from the frame demultiplexing unit 53 and the second transmission/reception circuit 58 based on their destination MAC address.

The control frame processing unit 54 is a processing unit that performs processes concerning PON control such as a discovery process for automatically assigning an LLID to each ONU and arbitration of an upstream signal (signal from an ONU to the OLT) and processing of transferring the PON-IF port information such as the LLID of each ONU to a band assignment processing unit 55.

The band assignment processing unit 55 is a processing unit that performs processing of assigning a band (transmission start time and transmission data amount) to an ONU or processing of managing PON-IF port information transferred from the control frame processing unit 54 in response to a request from the control frame processing unit 54.

Out of the frame transfer processing unit 60 shown in FIG. 43, a MAC address processing unit 61 registers/searches for a MAC address. In the MAC address processing unit 61, the MAC address registration unit 61A searches the MAC address search table 61B based on the transmission source MAC address of a received upstream frame. If the transmission source MAC address is not registered in the MAC address search table 61B, the MAC address is newly registered. If the transmission source MAC address is already registered in the MAC address search table 61B, the registered information is updated (if the registered information need not be updated, updating may be omitted).

The LLIDs of ONUs corresponding to the respective transmission source MAC addresses are registered in the MAC address search table 61B.

Based on the destination MAC address of a received downstream frame, the MAC address search unit 61C reads out a corresponding LLID from the MAC address search table 61B and decides the LLID to be given to the downstream frame.

A latency absorption unit 61D adds a delay to the received downstream frame, and absorbs the latency by the LLID decision processing of the MAC address search unit 61C.

An output synthesis unit 61E inserts the LLID decided by the MAC address search unit 61C into the preamble of the downstream frame output from the latency absorption unit 61D, thereby giving the destination LLID to the downstream frame to be transmitted.

In the 10G-EPON system, even when downstream frames for a 1G-ONU and a 10G-ONU coexist, the LLID of each destination ONU can similarly be decided. However, it is necessary to separately confirm what kind of ONU should have each LLID and transmit the frame from the downstream frame output of a corresponding rate. However, the conventional OLT does not have the function.

FIG. 44 is a block diagram showing the arrangement of the main part (after change) of frame transfer processing that can be considered as an example when adding, to the conventional OLT, the function of confirming the type of an ONU from an LLID and transmitting the frame for the downstream frame output of a corresponding rate. In the conventional OLT, when adding a circuit that decides the LLID of a destination ONU from the destination MAC address of a downstream frame, decides downstream transmission speed information from the LLID, and adds the pieces of information to the downstream frame (that is, when supporting 10G-EPON), the frame transfer processing unit 60 supposedly needs a downstream transmission speed processing unit 62 as shown in FIG. 44.

Referring to FIG. 44, a speed information registration unit 62A acquires the LLID of a transmission source ONU from the preamble of a received upstream frame, reads out downstream transmission speed information corresponding to the LLID of the transmission source ONU from the band assignment processing unit 55, and registers the downstream transmission speed information in a downstream transmission speed management table 62B in association with the LLID.

Downstream transmission speed information corresponding to the LLID of each ONU is registered in the downstream transmission speed management table 62B.

A downstream transmission speed search unit 62C reads out downstream transmission speed information from the downstream transmission speed management table 62B based on the destination LLID of a downstream frame and decides the downstream transmission speed information of the downstream frame to be transmitted.

A second latency absorption unit 62D adds a delay to the downstream frame having the added destination LLID, and absorbs the latency by the downstream transmission speed decision processing of the downstream transmission speed search unit 62C.

A second output synthesis unit 62E gives the downstream transmission speed information read out by the search of the downstream transmission speed search unit 62C to the downstream frame output from the second latency absorption unit 62D.

The downstream frame is sent to the PON at a given speed in accordance with the given downstream transmission speed information.

Note that in FIG. 44, an upstream frame and downstream transmission speed information from the band assignment processing unit 55 are input to the speed information registration unit 62A. However, the circuit (speed information registration unit 62A) for registration is not always necessary. Since software configured to control and manage the OLT 50 grasps the downstream transmission speed information corresponding to each LLID, necessary information can be written in the downstream transmission speed management table 62B by the software.

RELATED ART LITERATURE

Patent Literature

Patent Literature 1: Japanese Patent Laid-Open No. 2009-260668
Non-Patent Literature 1: "Lecture on Basic Technologies [GE-PON Technology] Part 1, What Is PON?", NTT Technical Review, Vol. 17, No. 8, pp. 71-74, 2005

DISCLOSURE OF INVENTION

Problem to be Solved by the Invention

However, in the above-described related art, when 1G-ONUs and 10G-ONUs are connected to one OLT, hardware configured to execute transmission speed decision processing needs to be added. The hardware configured to execute transmission speed decision processing has the same circuit scale as the MAC address processing unit 61 that executes the LLID decision processing, like, for example, the downstream transmission speed processing unit 62 shown in FIG. 44.

Hence, the circuit scale of the OLT becomes large, resulting in a bulky apparatus. In addition, such an increase in the circuit scale leads to an increase in power consumption, frame transfer delay time, and apparatus cost.

The OLT provided with the above-described frame transfer processing unit 60 may include a plurality of downstream frame output ports in accordance with downstream transmission speed information. However, in the OLT including the plurality of downstream output ports, if the destination MAC address of a downstream frame is a broadcast MAC address, the input frame needs to be duplicated and output from the plurality of output ports. A circuit for this processing is also necessary.

For this reason, in the 10G-EPON system, the circuit scale of the OLT becomes large, resulting in a bulky apparatus. In addition, such an increase in the circuit scale leads to an increase in power consumption, frame transfer delay time, and apparatus cost.

When a mass memory such as a DRAM is used as a buffer to temporarily buffer a downstream frame in the OLT, the effective throughput of write/read access to the mass memory becomes lower than the data bus speed. Especially when short frames are continuously input, the effective throughput extremely lowers.

The present invention has been made to solve the above-described problems, and has as its first object to provide a frame transfer technique capable of selecting a destination ONU from ONUs having different transmission speeds and transferring a downstream frame while suppressing an increase in the circuit scale.

It is the second object of the present invention to provide a station-side apparatus in an optical transmission system that has a plurality of downstream output ports while suppressing an increase in the circuit scale and thus implementing a circuit scale as small as possible, for example, an optical transmission system capable of supporting a 10G-EPON system in which downstream frames for a 1G-ONU and a 10G-ONU coexist.

It is the third object of the present invention to provide a station-side apparatus in an optical transmission system that has a plurality of downstream output ports while suppressing an increase in the circuit scale and thus implementing a circuit scale as small as possible, for example, an optical transmission system capable of supporting a 10G-EPON system in which downstream frames for a 1G-ONU and a 10G-ONU coexist and avoiding an extreme decrease in the effective throughput.

Means of Solution to the Problem

According to the present invention, there is provided an OLT comprising a reception circuit that receives an upstream frame from a subscriber-side apparatus connected via an optical transmission channel, a transmission/reception circuit that transmits the upstream frame to a host apparatus connected via an interface and receives a downstream frame from the host apparatus via the interface, a plurality of transmission circuits that are provided in correspondence with a plurality of transmission systems, respectively, and transmit the downstream frame to the subscriber-side apparatus via the optical transmission channel at transmission speeds preset via the optical transmission channel, a frame transfer processing unit that transfers the upstream frame received by the reception circuit to the transmission/reception circuit and transfers the downstream frame received by the transmission/reception circuit to the transmission circuits, and a table in which a destination ID for identifying one of a user apparatus and the subscriber-side apparatus serving as a destination of the downstream frame, identifier information for identifying one of the subscriber-side apparatus to which the user apparatus is connected and the subscriber-side apparatus serving as the destination, and transfer instruction information indicating the transmission system of an output destination of the downstream frame are registered in association with each other, wherein the frame transfer processing unit acquires, from the table, the identifier information and the transfer instruction information associated with the destination ID of the downstream frame received by the transmission/reception circuit, gives the identifier information to the downstream frame, and transfers the downstream frame to, out of the plurality of transmission circuits, the transmission circuit of the transmission system indicated by the transfer instruction information.

The OLT according to the present invention may further comprise a plurality of input FIFOs and output FIFOs provided for each of the plurality of transmission systems, and a memory that stores frame data of the downstream frame, and the frame transfer processing unit may acquire, from the table, the identifier information and the transfer instruction information associated with the destination ID of the downstream frame received by the transmission/reception circuit, write the identifier information and the transfer instruction information in the downstream frame, and write the downstream frame in one of the input FIFO and the output FIFO of the transmission system indicated by the transfer instruction information written in the downstream frame, and simultaneously control transfer of the frame data from the input FIFO to the output FIFO, transfer of the frame data from the input FIFO to the memory, and transfer of the frame data from the memory to the output FIFO in accordance with internally generated control information, read out the downstream frame written in the output FIFO, and transfer the downstream frame to the transmission circuit of the transmission system to which the output FIFO belongs.

According to the present invention, there is also provided a frame transfer method used in a station-side apparatus that includes a reception circuit that receives an upstream frame from a subscriber-side apparatus connected via an optical transmission channel, a transmission/reception circuit that transmits the upstream frame to a host apparatus connected via an interface and receives a downstream frame from the host apparatus via the interface, and a plurality of transmission circuits that are provided in correspondence with a plurality of transmission systems, respectively, and transmit the downstream frame to the subscriber-side apparatus via the optical transmission channel at transmission speeds preset via the optical transmission channel, and mutually transfers a frame to be exchanged between the subscriber-side apparatus and the host apparatus, the method comprising the steps of registering, in a table, a destination ID for identifying one of a user apparatus and the subscriber-side apparatus serving as a destination of the downstream frame, identifier information for identifying one of the subscriber-side apparatus to which the user apparatus is connected and the subscriber-side apparatus serving as the destination, and transfer instruction information indicating the transmission system of an output destination of the downstream frame in association with each other, and acquiring, from the table, the identifier information and the transfer instruction information associated with the destination ID of the downstream frame received by the transmission/reception circuit, giving the identifier information to the downstream frame, and transferring the downstream frame to, out of the plurality of transmission circuits, the transmission circuit of the transmission system indicated by the transfer instruction information.

Effect of the Invention

According to the present invention, identifier information (LLID) that identifies a subscriber-side apparatus serving as the destination of a downstream frame and transfer instruction information (transmission speed) representing the transmission system of the output destination of the downstream frame can be acquired only by read (search) from a table. For this reason, the transmission system of the downstream frame can easily be specified almost without an increase in the circuit scale of the OLT. It is therefore possible to select a destination ONU from ONUs having different transmission speeds and transfer the downstream frame by one OLT.

In addition, according to the present invention, it is possible to support a 10G-EPON system in which downstream frames for a 1G-ONU and a 10G-ONU coexist while suppressing an increase in the circuit scale and thus implementing a circuit scale as small as possible.

Furthermore, according to the present invention, it is possible to avoid an extreme decrease in the effective throughput.

BRIEF DESCRIPTION OF DRAWINGS

FIG. 10 is a view showing an example of the arrangement of the MAC address search table;

FIG. 19 is a view showing an example of the arrangement of a MAC address search table used in an OLT according to the third embodiment;

FIG. 20 is a view showing an example of the arrangement of the MAC address search table used in an OLT according to the third embodiment;

BEST MODE FOR CARRYING OUT THE INVENTION

1. First Embodiment

An embodiment of the present invention will now be described with reference to the accompanying drawings.

An OLT according to this embodiment is an OLT that is connected to a plurality of subscriber-side apparatuses (ONUs) via an optical transmission channel (PON) and also connected to a host apparatus via an SNI and mutually transfers a frame to be exchanged between the ONUs and the host apparatus. The OLT includes a reception circuit that receives an upstream frame from the ONU via the PON, a plurality of transmission circuits that are provided in correspondence with preset transmission speeds and transmit a downstream frame to the ONUs via the PON at the transmission speeds, a transmission/reception circuit that transmits an upstream frame to the host apparatus via the SNI and receives the downstream frame from the host apparatus via the SNI, and a frame transfer processing unit that transfers the upstream frame received by the reception circuit to the transmission/reception circuit and transfers the downstream frame received by the transmission/reception circuit to the transmission circuits. The frame transfer processing unit includes an address (destination ID) search table (table) in which identifier information (LLID) of the ONU and transfer instruction information (downstream output destination selection information) are registered in correspondence with each of the individual addresses (destination IDs) of the ONUs or user apparatuses connected to the ONUs. An LLID and downstream output destination selection information corresponding to the destination address of the downstream frame received by the transmission/reception circuit are acquired from the address search table. After the LLID is given to the downstream frame, the downstream frame is transferred to a transmission circuit corresponding to the downstream output destination selection information out of the transmission circuits.

Note that as the address of each ONU or the user apparatus connected to each ONU, for example, a MAC address is usable. The address is not limited to a MAC address, and for example, a VLAN (Virtual LAN) address (VLAN ID) or an IP address is also usable if it can identify an ONU or a user apparatus connected to an ONU.

An address that identifies the user apparatus or subscriber-side apparatus of the transmission source of an upstream frame corresponds to a "transmission source ID" of the present invention. An address that identifies the user apparatus or subscriber-side apparatus of the destination of a downstream frame corresponds to a "destination ID" of the present invention. Hence, a MAC address, a VLAN address (VLAN ID), or an IP address can be used as the transmission source ID or destination ID.

[1.1. PON System]

Figure 1:
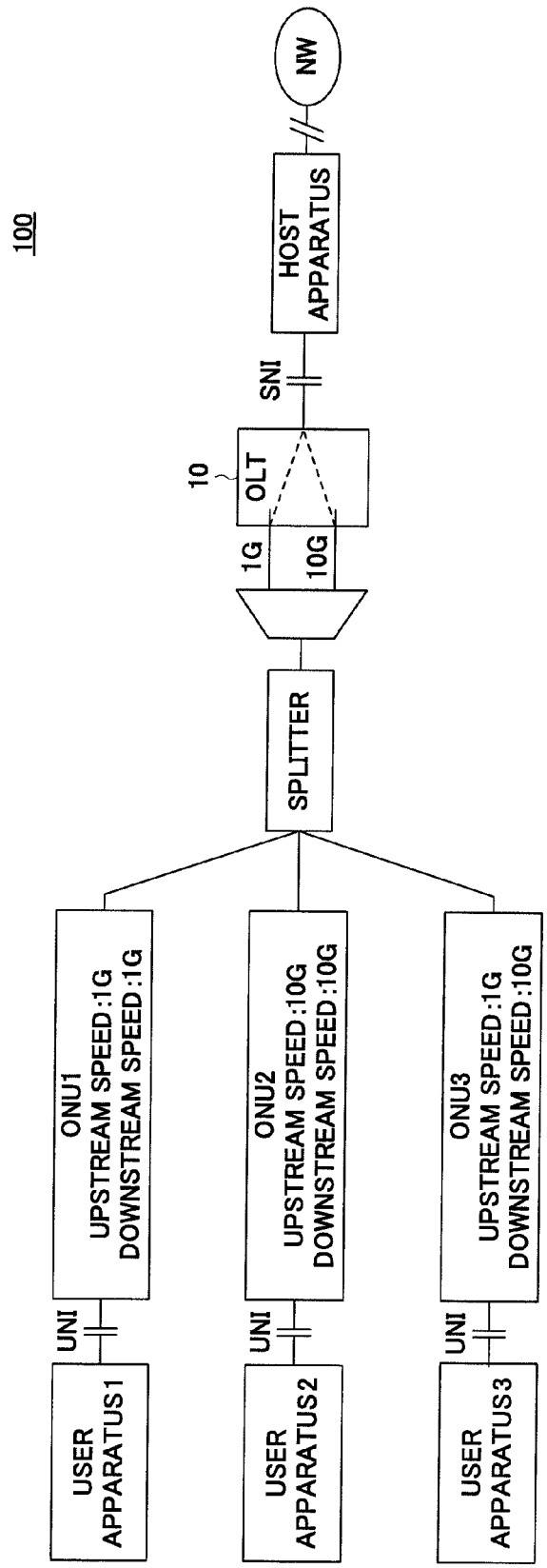
FIG. 1 is a block diagram showing the arrangement of a PON system according to the first embodiment.
Figure 2:
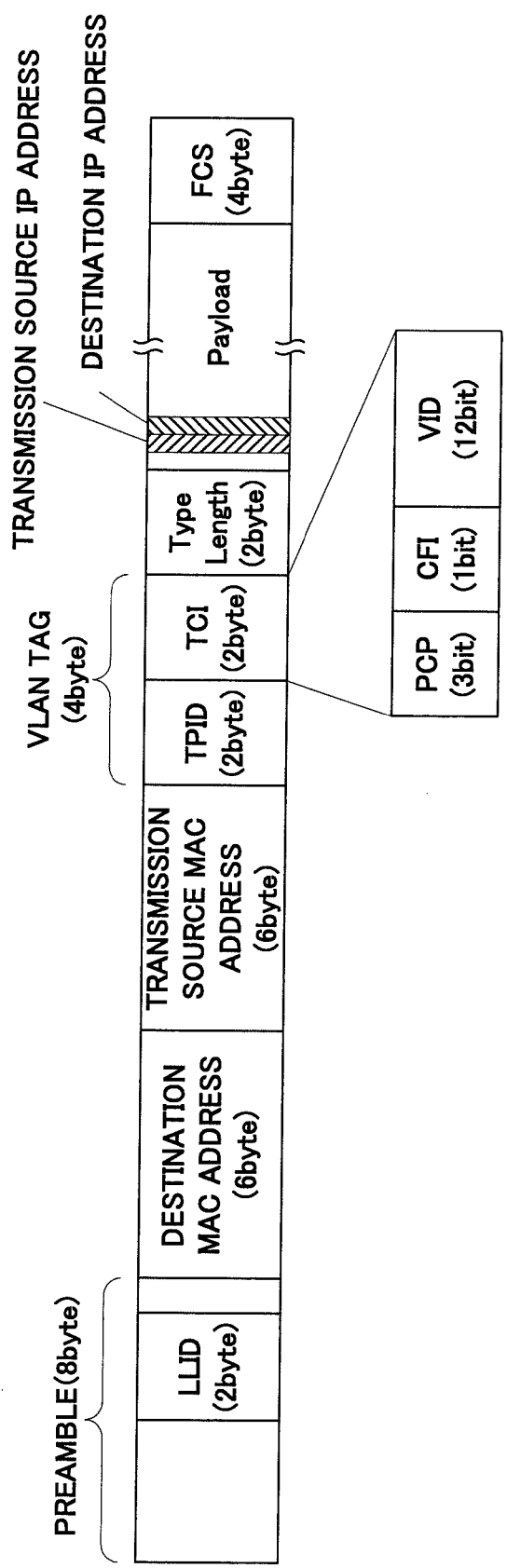
FIG. 2 is a view showing an example of the arrangement of a frame transmitted in a PON section.

A PON system 100 according to the first embodiment of the present invention will be described first with reference to FIGS. 1 and 2. FIG. 1 is a block diagram showing the arrangement of the PON system according to the first embodiment. FIG. 2 shows an example of the arrangement of a frame transmitted in a PON section.

As shown in FIG. 1, in the PON system 100, ONUs n (n=1 to 3) are connected to user apparatuses n via UNIs (User Network Interfaces).

The ONUs are commonly connected to one optical splitter via an optical transmission channel. The optical splitter is connected to one OLT 10 via the optical transmission channel and an optical multiplexing and demultiplexing device.

A host apparatus is connected, via an SNI, to an SNI port provided on the SNI side of the OLT 10.

A carrier-side network (service network) NW is connected to the host apparatus.

Data are exchanged using a frame having the arrangement as shown in FIG. 2 in the PON section of the PON system 100, that is, the section between the ONUs n and the OLT 10.

Referring to FIG. 2, the preamble is formed by embedding an LLID in the preamble of Ethernet.

The LLID (Logical Link ID) is an identifier provided in a one-to-one correspondence with each ONU. The LLID is decided by the OLT when registering an ONU (placing an ONU under the OLT). The OLT manages the LLIDs without repetition among the ONUs under it.

Like GE-PON, this PON system can establish a plurality of logical links between the OLT and the ONUs in correspondence with one physical port using MPCP (Multi Point Control Protocol). Each logical link is identified by the LLID (Logical Link ID). The LLID is an identifier uniquely assigned to each logical link. Before a frame is sent to the PON section, the LLID is given by the OLT or ONU and stored in the preamble. The LLID thus acts as identifier information used by the OLT to identify an ONU connected to a user apparatus or an ONU as the destination of data.

A VLAN tag is a tag including VLAN information. The tag may be absent, or a plurality of tags may be added. The VLAN tag includes TPID and TCI.

TPID (Tag Protocol ID) is an Ether Type value representing that a VLAN tag follows. The value is normally 0x8100.

TCI (Tag Control Information) is VLAN tag information. The TCI includes PCP, CFI, and VID.

PCP (Priority Code Point) is the priority of the frame.

CFI (Canonical Format Indicator) is a value representing whether the MAC address in the MAC header complies with the standard format.

VID or VLAN ID (VLAN Identifier) is a value that designates a VLAN to which the frame belongs.

Type is an Ether Type value representing the type of the host protocol.

Payload may include the IP address of the transmission source user apparatus and the IP address of the destination.

When a VLAN address or an IP address is used in place of the MAC address, as described above, VID or IP address included in the frame having the above-described arrangement is used.

[1.2. OLT According to First Embodiment]

Figure 3:
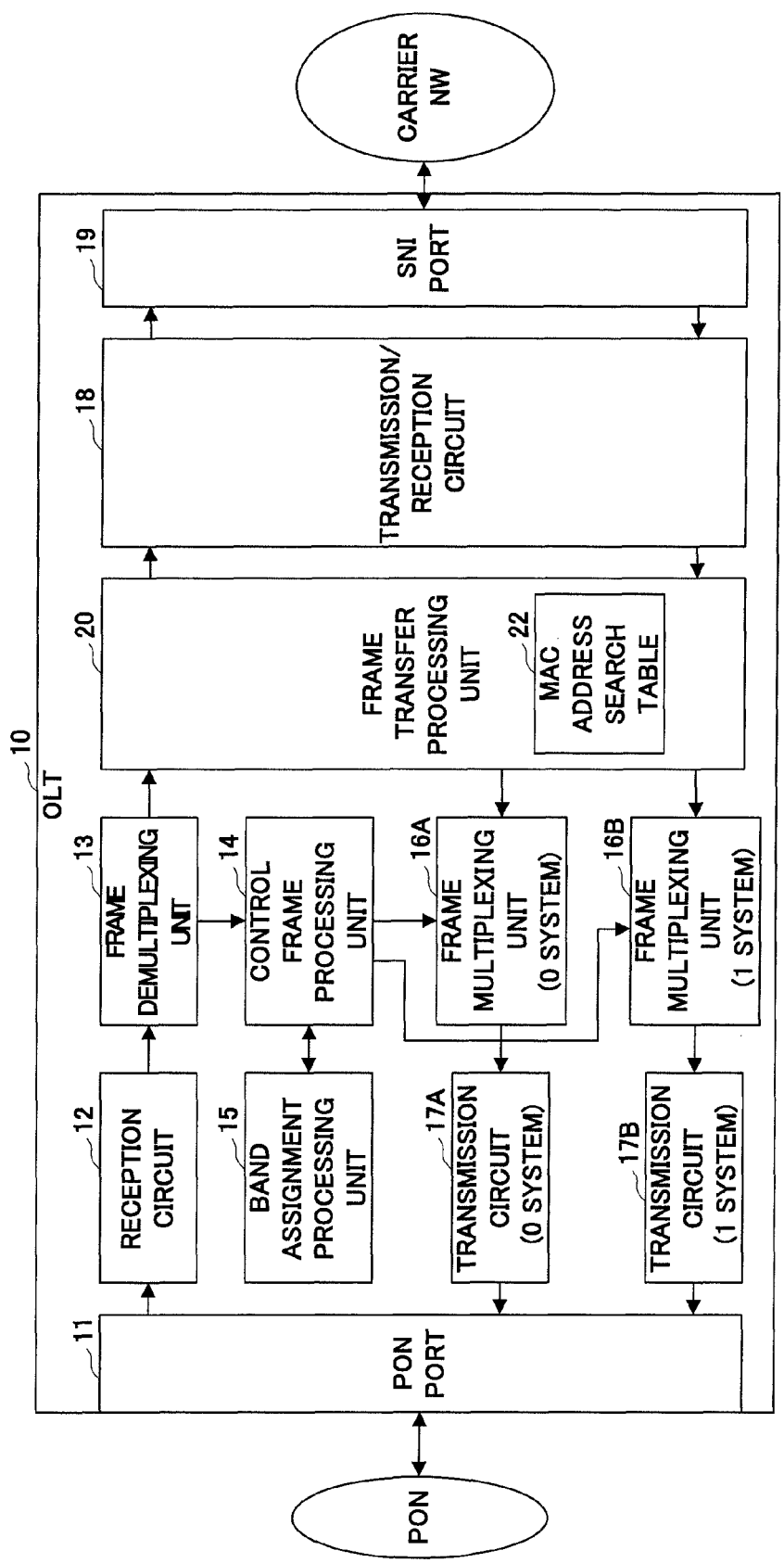
FIG. 3 is a block diagram showing the arrangement of an OLT according to the first embodiment.

The arrangement of the OLT 10 according to this embodiment will be described next with reference to FIG. 3. FIG. 3 is a block diagram showing the arrangement of the OLT according to the first embodiment.

In terms of arrangement, the OLT 10 according to this embodiment is different from the conventional OLT in that a frame multiplexing unit and a transmission circuit are provided for each of transmission systems of different transmission speeds, and the OLT includes a frame transfer processing unit having an arrangement corresponding to the frame multiplexing unit and the transmission circuit provided for each of the different transmission systems.

The processing units of the OLT 10 according to this embodiment will be described with reference to FIG. 3.

A PON port 11 is a circuit that transmits/receives frames to/from the ONUs via the PON.

A reception circuit 12 is a circuit that receives upstream frames from the ONUs via the PON and the PON port 11.

A transmission circuit (0 system) 17A and a transmission circuit (1 system) 17B are circuits that are provided for preset transmission speeds and transmit downstream frames to the ONUs (0 system) and the ONUs (1 system) at the transmission speeds via the PON port 11 and the PON. In the present invention, the 0 system represents a transmission system having a transmission speed of 1 Gbps, and the 1 system represents a transmission system having a transmission speed of 10 Gbps.

An SNI port 19 is a circuit component that transmits/receives a frame to/from the host apparatus via the SNI.

A transmission/reception circuit 18 is a circuit component that transmits/receives a frame to/from the carrier network NW via the SNI port 19 and the host apparatus.

A frame demultiplexing unit 13 is a processing unit that transmits, out of the frames input from the reception circuit 12, a frame (control frame used to control the PON) for the OLT 10 to a control frame processing unit 14 and transmits the remaining frames to a frame transfer processing unit 20.

A frame multiplexing unit (0 system) 16A is a processing unit that time-divisionally multiplexes downstream frames for the ONUs (0 system) from the frame transfer processing unit 20 and a control frame from the control frame processing unit 14 and transmits them to the transmission circuit (0 system) 17A.

A frame multiplexing unit (1 system) 16B is a processing unit that time-divisionally multiplexes downstream frames for the ONUs (1 system) from the frame transfer processing unit 20 and a control frame from the control frame processing unit 14 and transmits them to the transmission circuit (1 system) 17B.

The frame transfer processing unit 20 is a processing unit that transfers an upstream frame received by the reception circuit 12 and input from the frame demultiplexing unit 13 to the transmission/reception circuit 18 and transfers a downstream frame received from the transmission/reception circuit 18 to the frame multiplexing unit (0 system) 16A or the frame multiplexing unit (1 system) 16B based on its destination MAC address acquired from a MAC address search table 22 and corresponding downstream output destination selection information. The downstream output destination selection information corresponds to transfer instruction information of the present invention, and indicates one of the plurality of transmission systems having different transmission speeds, that is, the transmission system having a transmission speed of 1 Gbps and the transmission system having a transmission speed of 10 Gbps.

The control frame processing unit 14 is a processing unit that performs processes concerning PON control such as a discovery process for automatically assigning an LLID to each ONU and arbitration of an upstream signal (signal from an ONU to the OLT).

The band assignment processing unit 15 is a processing unit that performs assignment of a band (transmission start time and transmission data amount) to an ONU or management of PON-IF port information transferred from the control frame processing unit 14 in response to a request from the control frame processing unit 14.

[1.3. Operation of OLT According to First Embodiment]

Figure 4:
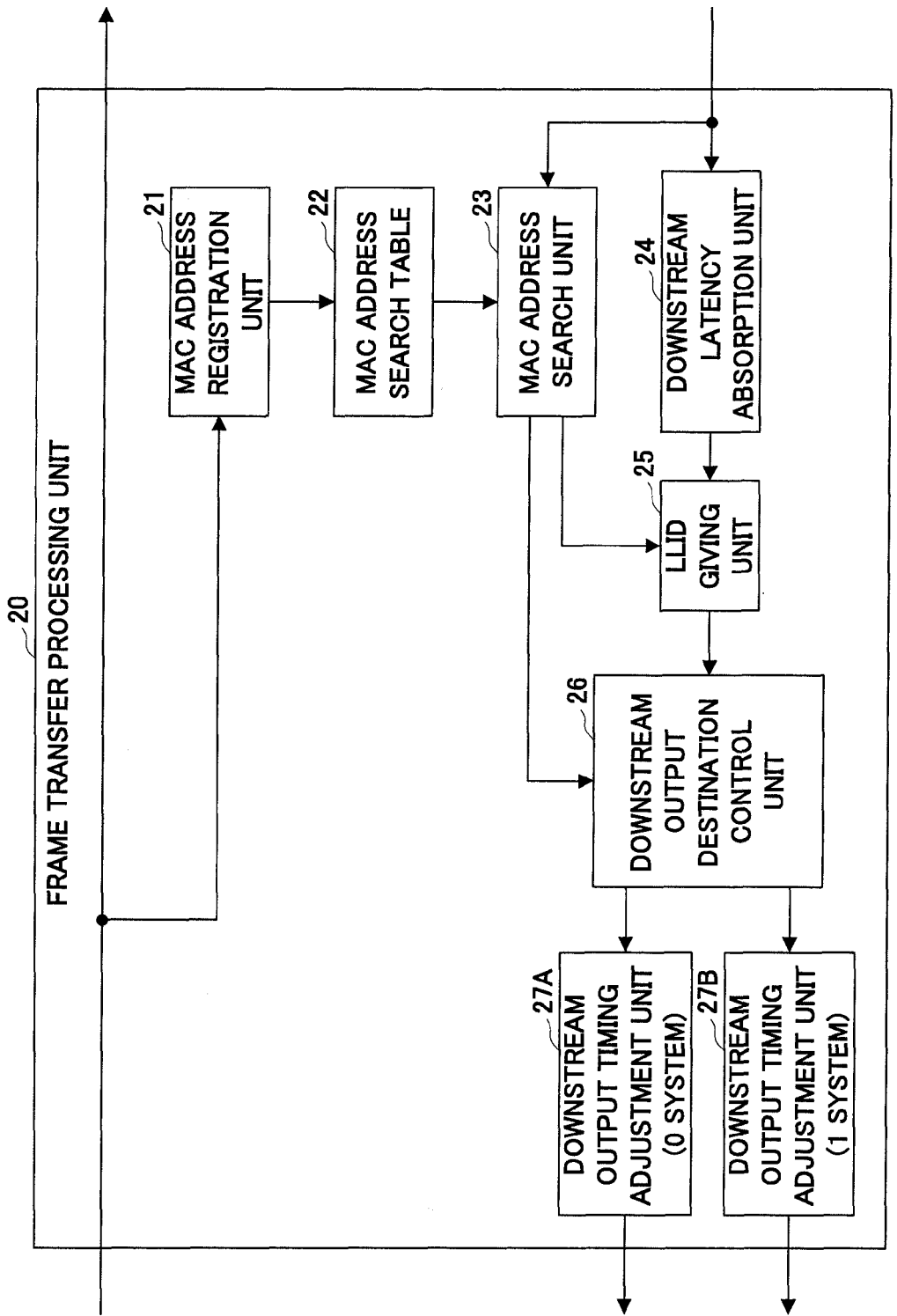
FIG. 4 is a block diagram showing an example of the arrangement of a frame transfer processing unit.
Figures 5, 6:
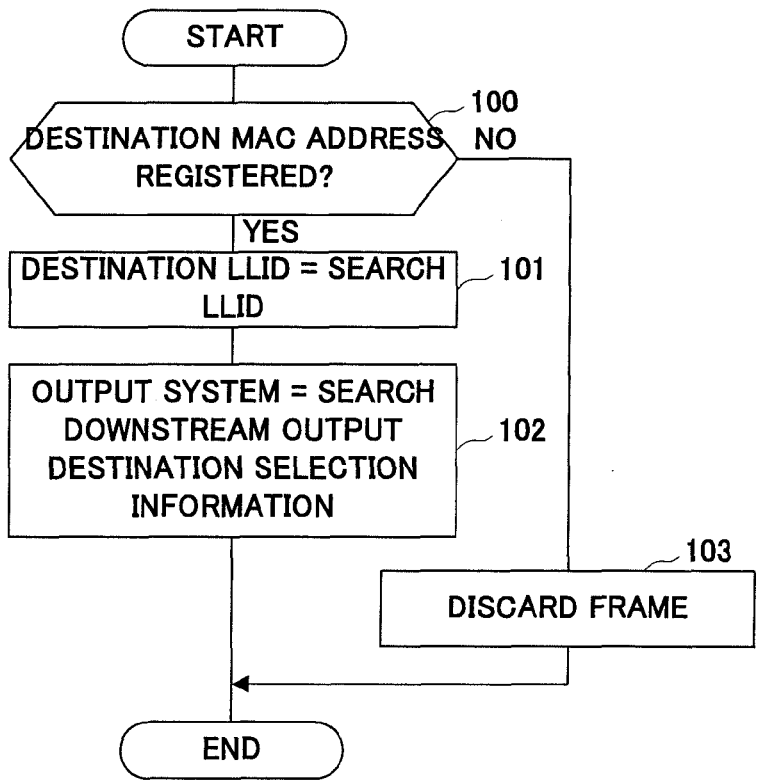
FIG. 5 is a view showing an example of the arrangement of a MAC address search table.
FIG. 6 is a flowchart showing a downstream frame output destination decision procedure.

Frame transfer processing of the OLT 10 according to this embodiment will be described next in detail with reference to FIGS. 4 to 6. FIG. 4 is a block diagram showing an example of the arrangement of the frame transfer processing unit. FIG. 5 shows an example of the arrangement of the MAC address search table. FIG. 6 is a flowchart showing a downstream frame output destination decision procedure.

The operation of the frame transfer processing unit 20 when deciding the output destination of a downstream frame will be described here.

The frame transfer processing unit 20 decides which one of the transmission circuits 17A and 17B should transmit a received downstream frame, that is, which downstream system a downstream frame should be output in the following way.

The frame transfer processing unit 20 includes the MAC address search table 22 shown in FIG. 5. The MAC address search table 22 corresponds to a table of the present invention. Downstream output destination selection information, LLID, and entry enable/disable are registered in the MAC address search table 22 in correspondence with each of the MAC addresses of the user apparatuses connected to the ONUs. Entry enable/disable is information representing the enable/disable state of the entry. "Entry disable" represents that "this entry is free" even if certain values are described in the MAC address, downstream output destination selection information, and LLID of this entry.

A MAC address search unit 23 reads out an LLID and downstream output destination selection information from the MAC address search table 22 based on the destination MAC address of the received downstream frame, and decides the destination LLID and output destination of the downstream frame in accordance with the procedure shown in FIG. 6. The information of the decided LLID is given to an LLID giving unit 25 as a destination LLID.

In the downstream frame downstream output destination decision procedure shown in FIG. 6, the MAC address search unit 23 first confirms, based on the entry enable/disable of the destination MAC address of the received downstream frame out of the MAC address search table 22, whether the destination MAC address is registered in the MAC address search table 22 (step 100).

If an "enable" state is set as the entry enable/disable, and the destination MAC address is registered (step 100: YES), the MAC address search unit 23 acquires an LLID corresponding to the destination MAC address from the MAC address search table 22, and specifies it as the destination LLID of the downstream frame (step 101).

Next, the MAC address search unit 23 acquires downstream output destination selection information corresponding to the destination MAC address from the MAC address search table 22, specifies the output system of the downstream frame (step 102), and ends the series of processes.

On the other hand, if the MAC address field does not match the destination MAC address in any entry where the "enable" state is set as the entry enable/disable (step 100: NO), the MAC address search unit 23 decides to discard the downstream frame (step 103), and ends the series of processes.

In parallel to the downstream frame downstream output destination decision procedure, a downstream latency absorption unit 24 adds a delay to the received downstream frame, and absorbs the latency by the downstream output destination decision processing of the MAC address search unit 23.

The LLID giving unit 25 gives the destination LLID to the downstream frame from the downstream latency absorption unit 24 in accordance with the LLID decided by the MAC address search unit 23.

A downstream output destination control unit 26 transfers the downstream frame from the LLID giving unit 25 to a corresponding downstream output timing adjustment unit 27A of 0 system or downstream output timing adjustment unit 27B of 1 system in accordance with the downstream output destination selection information decided by the MAC address search unit 23.

Each of the downstream output timing adjustment units 27A and 27B adjusts the output order of each downstream frame based on priority decided by PCP or the like included in the downstream frame, and transfers the downstream frame to a corresponding one of the frame multiplexing units 16A and 16B. For example, in a system in which a 10G-ONU and a 1G-ONU coexist, 10G (802.3av specifications) output is designated for the 10G-ONU, and 1G (802.3ah specifications) output is designated for the 1G-ONU.

If the MAC address search unit 23 decides to discard the downstream frame, the downstream output destination control unit 26 performs discarding processing of the downstream frame.

As for the MAC address search table 22, a MAC address registration unit 21 acquires a transmission source MAC address and an LLID from a received upstream frame, and registers the LLID and downstream output destination selection information corresponding to the LLID in the MAC address search table 22 in association with the transmission source MAC address. As the downstream output destination selection information, for example, the downstream output destination selection information of an ONU is acquired by a control frame notified by the ONU at the start of communication.

In the arrangement of this embodiment, the values in the MAC address search table 22 are set by software that controls and manages the OLT 10. More specifically, when the MAC address registration unit 21 sets information to be registered in the MAC address search table 22 as shown in FIG. 5 in a register and sets a MAC address setting request flag, the software writes the information in the MAC address search table 22 and sets a MAC address setting completion flag. In this way, the destination MAC address and downstream output destination selection information of a downstream frame are managed in correspondence with each LLID, and necessary information is registered in the MAC address search table 22.

[1.4. MAC Address Search and Registration Processing]

MAC address search and registration processing of the OLT according to this embodiment will be described below in more detail.

[1.4.1. Known Address Search Technique]

In a conventional MAC address search technique, when the number of entries in a table used by the frame transfer device for the MAC address search increases, the processing time required for the search becomes long. Alternatively, to shorten the processing time, a number of identical circuits need to be included, resulting in an increase in the circuit scale and power consumption.

For example, when the number of entries is 16,384, and processing is performed by reading each entry (each address) from the table, the read needs to be performed 16,384 times. When the OLT operates the internal circuits by a clock of 125 MHz, the read takes a time of at least 8 ns×16384=131072 ns. The minimum time of a frame transmitted by GE-PON is 8 ns×72=576 ns including the time of the preamble, or 672 ns including the minimum interval 8 ns×12=96 ns between frames.

Especially when MAC address registration of upstream frames and MAC address search of downstream frames are performed in the same table, as in the MAC address search table, frames in the two directions are simultaneously processed. Since the frame input frequency doubles, it is necessary to complete the processing within 672 ns 2=336 ns or decrease the average processing time per frame to 336 ns or less by parallelly determining a plurality of frames.

Figure 7:
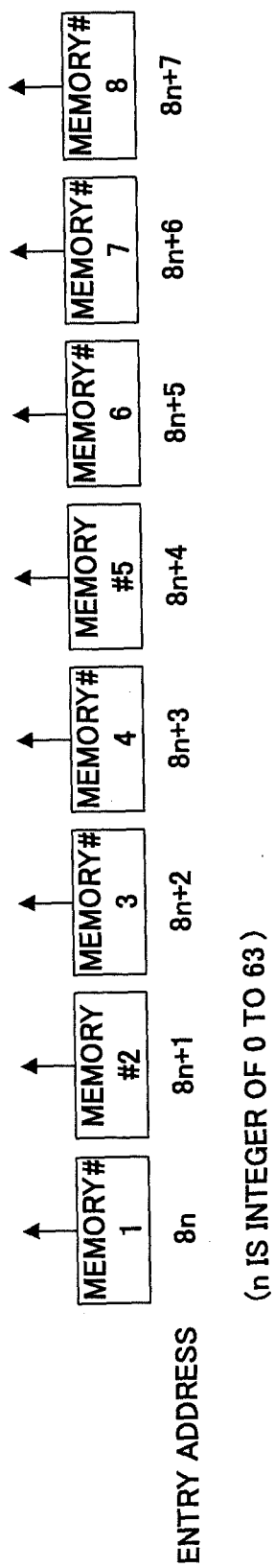
FIG. 7 is a view showing an example of the arrangement of the MAC address search table.
Figure 8:
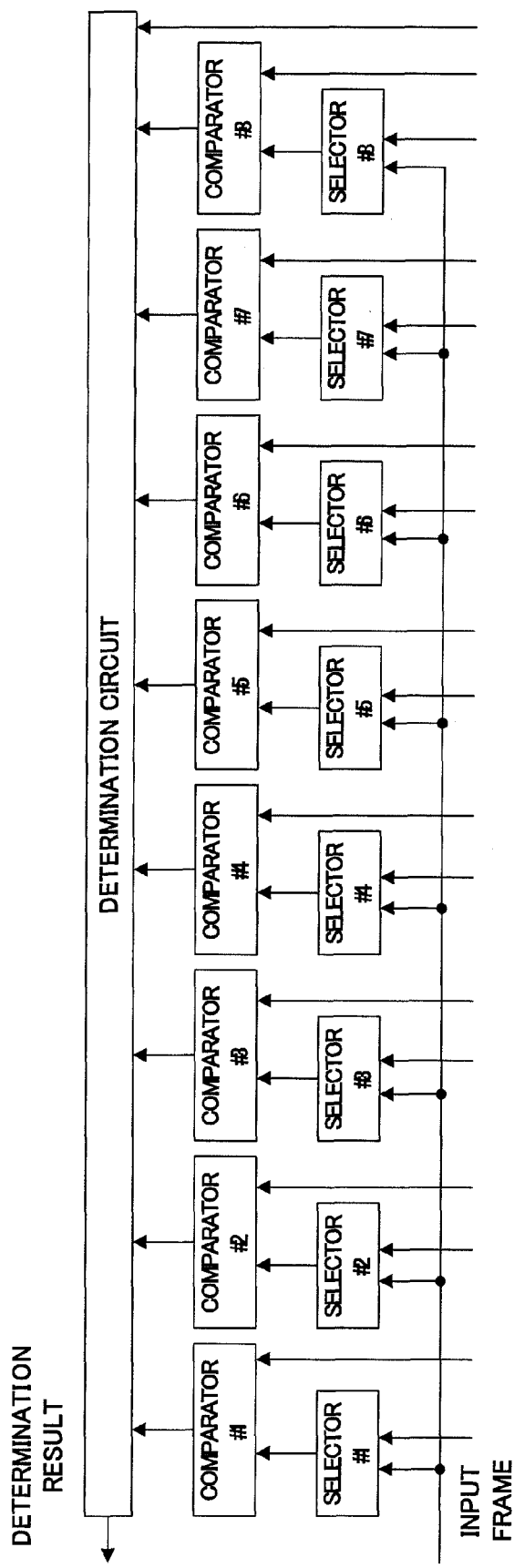
FIG. 8 is a view showing an example of the arrangement of a MAC address search unit.

As an example to cope with this, a plurality of data may parallelly be read out from the MAC address search table and processed. FIG. 7 is a view showing an example of the arrangement of the MAC address search table. FIG. 8 is a view showing an example of the arrangement of the MAC address search unit.

In these examples, the MAC address search table is formed from eight memories #1 to #8. The memories are given entry addresses 8n to 8n+7 with an increment of 1 and store data. Selection circuits #1 to #8 and comparators #1 to #8 are provided in correspondence with the data, and the MAC addresses selected from input frames and the MAC addresses of the data read out from the memories are compared parallelly.

According to this arrangement example, eight data can parallelly be read out from the memories. For this reason, when the total number of entries is 16,384, the read count can be decreased to 2,048. Even in this case, however, performing the read 2,048 times takes a time of at least 8 ns×2048=16384 ns. Even when the number of entries to be read-accessed in parallel is increased to 32, a time of at least 8 ns×512=4096 ns is necessary.

Hence, to clear the above-described condition in GE-PON, a larger number of entries need to be parallelly read out from the MAC address search table. Since a number of such identical circuits are included to shorten the processing time, the circuit scale and power consumption increase.

[1.4.2. High-Speed MAC Address Search Technique]

To solve this problem, the following technique is employed to shorten the search processing time of the MAC address search table including many entries by a little circuit scale and power consumption.

(1) MAC Address Search Circuit

Figure 9:
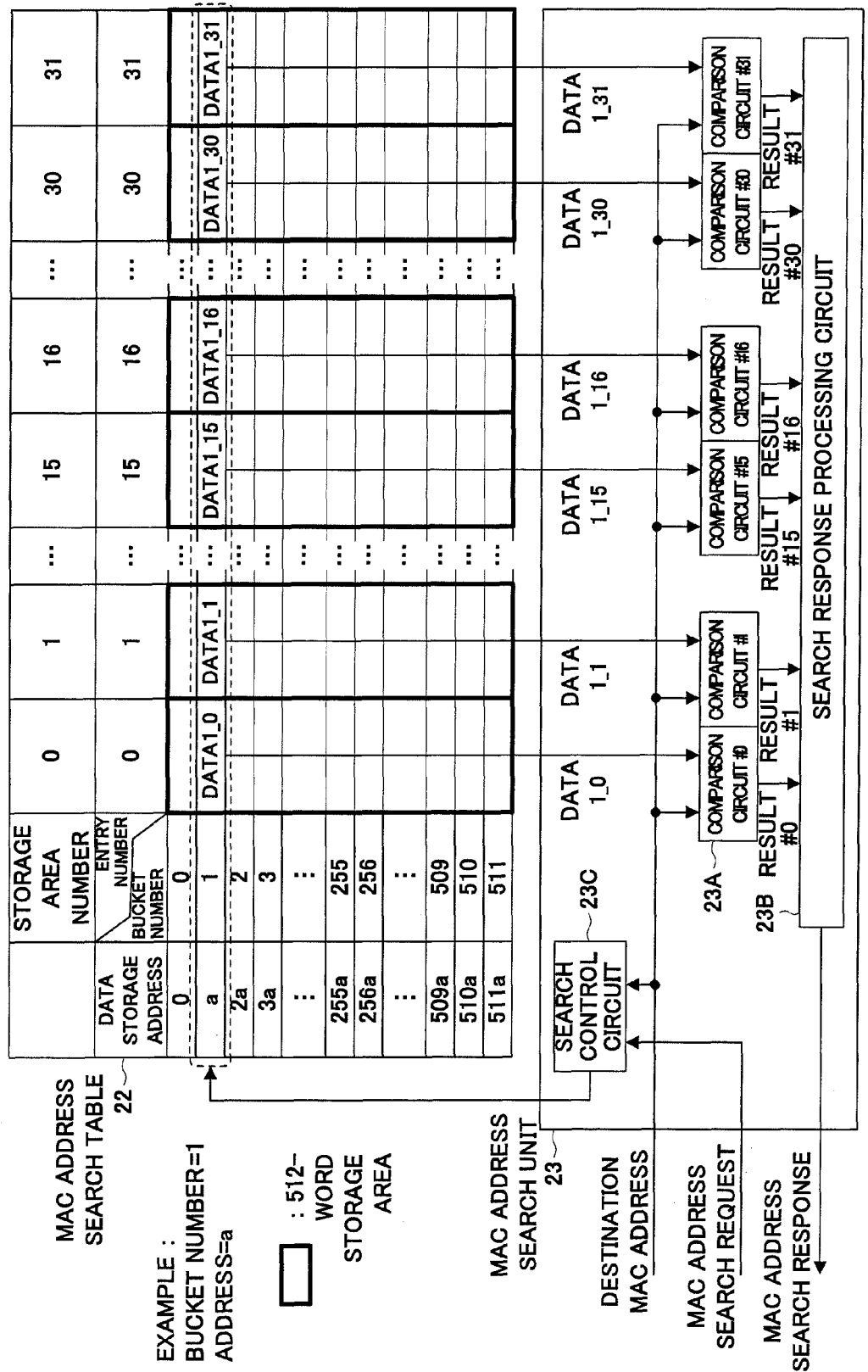
FIG. 9 is a view showing an example of the arrangement of the MAC address search table and the MAC address search unit.

FIG. 9 is a view showing an example of the arrangement of the MAC address search table and the MAC address search unit.

The MAC address search table 22 is formed from a storage circuit such as a semiconductor memory, and has a function of storing data including a MAC address and the destination information of an ONU in correspondence with each of the individual MAC addresses of the user apparatuses connected to the ONUs.

In the MAC address search table 22, M×N (M is an integer of 2 or more, and N is an integer of 2 or more) entries are provided in a matrix as data storage areas to store data. These entries are divided into M buckets each having N entries. In addition, entries of the same entry number belonging to each bucket are divided into N storage areas each having M entries. Each storage area is formed from at least one storage circuit (semiconductor memory). A bucket is virtually provided across a plurality of storage areas.

FIG. 10 is a view showing an example of the arrangement of the MAC address search table. Data i_j (i=0, 1, . . . , M−1; j=0, 1, . . . , N−1) indicates registered data stored in a bucket number i and an intra-bucket entry number j. The breakdown of the data i_j includes downstream output destination selection information, LLID, and entry enable/disable corresponding to each of the MAC addresses of the ONUs or the user apparatuses connected to the ONUs. Entry enable/disable is information representing the enable/disable state of the entry. "Entry disable" represents that "this entry is free", that is, any values described in the MAC address, downstream output destination selection information, and LLID of this entry are unusable for output destination determination, and this entry is unconditionally writable.

Each data is stored in an entry belonging to a bucket of a bucket number specified by a hash function for bucket distribution from the MAC address included in the data. The MAC address search table 22 has a function of reading out and parallelly outputting data stored in all entries belonging to a bucket selected by the MAC address search unit 23.

(2) MAC Address Search Unit

The MAC address search unit 23 has a function of, based on the destination MAC address of a downstream frame received from the host apparatus, searching the MAC address search table 22 for corresponding data, and a function of acquiring, from the data, destination information to be added to the downstream frame.

The MAC address search unit 23 includes comparison circuits 23A, a search response processing circuit 23B, and a search control circuit 23C as main circuit components.

N comparison circuits 23A are provided in correspondence with N entries provided in each bucket of the MAC address search table 22. Each comparison circuit 23A has a function of comparing the MAC address included in data read out from a corresponding entry with the destination MAC address of a downstream frame and outputting the comparison result to the search response processing circuit 23B.

The search response processing circuit 23B has a function of, based on the comparison results from the comparison circuits 23A, acquiring destination information from data including a MAC address matching the destination MAC address out of the data parallelly output from the MAC address search table 22, and outputting the destination information as a MAC address search response.

The search control circuit 23C has a function of, in response to a MAC address search request from the frame transfer processing unit 20, specifying, from the MAC address of a downstream frame, a bucket number corresponding to the destination MAC address based on a preset hash function, a function of calculating, from the bucket number, a data storage address (read address) representing the entry of the bucket corresponding to the bucket number out of the MAC address search table 22, and a function of outputting a read request for selecting the bucket corresponding to the destination MAC address based on the data storage address to the MAC address search table 22.

In the arrangement example shown in FIG. 9, 512 (N=512) buckets corresponding to bucket numbers 0 to 511 are provided in the MAC address search table 22 as storage areas. Each bucket is provided with 32 entries corresponding to entry numbers 0 to 31. The data storage addresses of the storage areas are set in a one-to-one correspondence with the bucket numbers. Each entry has a 512-word data storage area. In the entire MAC address search table 22, 16,384 data can be registered at maximum.

Since the maximum value of the bucket number is 511, the hash function to specify the bucket number is formed from, for example, a function expression for calculating nine lower bits of CRC32 of a MAC address. The relationship between the data storage address and the bucket number is given by (data storage address)=(bucket number)×a, where a is a coefficient representing the interval of data storage addresses in the storage circuit (semiconductor memory) that forms the storage area, and an integer of 1 or more is used.

Upon receiving a MAC address search request, the search control circuit 23C calculates the bucket number based on the destination MAC address of a downstream frame and performs bucket distribution. The search control circuit 23C calculates the data storage address value corresponding to the bucket number, and reads out registered data of the entries stored at the data storage address in a plurality of storage areas (storage area #0 to storage area #31) at the same timing.

This makes it possible to narrow down the search range only to buckets predicted to store the search target MAC address out of the MAC address search table 22, instead of including all entries of the MAC address search table 22 in the search range.

In the example shown in FIG. 9, the bucket number obtained by bucket distribution is "1", and the data storage address value is "a". Hence, data 1_j (j=0, 1, . . . , 31) are read out from 32 entries belonging to the bucket of the bucket number "1" at the same timing. The data 1_j read out from the MAC address search table 22 are input to the corresponding comparison circuits 23A (#j) at the same timing.

The comparison circuits 23A (#j) compare the MAC addresses included in the data 1_j with the destination MAC address of the downstream frame, and output the comparison results at the same timing. The search response processing circuit 23B determines, based on the comparison results input from the comparison circuits 23A at the same timing, whether the bucket includes an entry in which the destination MAC address of the downstream frame is registered. Upon founding data including a MAC address matching the destination MAC address, the search response processing circuit 23B acquires destination information from the data with the matching MAC address out of the data 1_j input from the comparison circuits 23A at the same timing, and outputs it as a MAC address search response.

The MAC address search response includes the presence/absence of the entry in which the destination MAC address of the downstream frame is registered, and the downstream output destination selection information and LLID registered in the entry.

The LLID giving unit 25 shown in FIG. 4 described above inserts the LLID included in the MAC address search response into the preamble of the downstream frame output from the downstream latency absorption unit 24, thereby giving the LLID to the downstream frame to be transmitted.

(3) MAC Address Registration Unit

Figure 11:
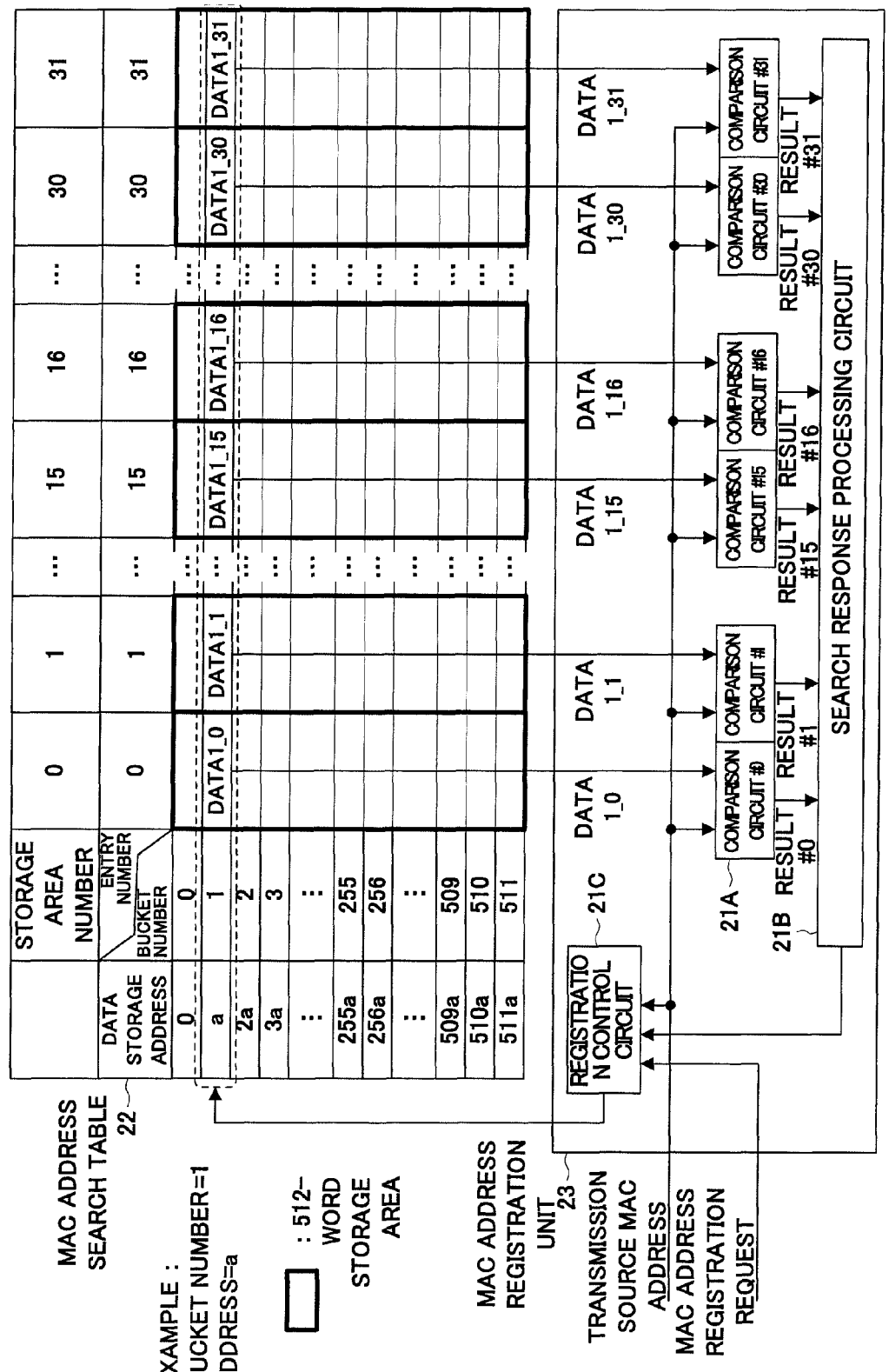
FIG. 11 is a view showing an example of the arrangement of the MAC address search table and a MAC address registration unit.

FIG. 11 is a view showing an example of the arrangement of the MAC address search table and the MAC address registration unit.

The MAC address registration unit 21 has a function of, based on the transmission source MAC address of an upstream frame received from an ONU, searching the MAC address search table 22 for corresponding data, and a function of, if data including a MAC address matching the transmission source MAC address is not registered, registering data including the transmission source MAC address and destination information acquired from the upstream frame in a free entry belonging to a bucket of a bucket number out of the MAC address search table.

The MAC address registration unit 21 includes comparison circuits 21A, a search response processing circuit 21B, and a registration control circuit 21C as main circuit components.

N comparison circuits 21A are provided in correspondence with N entries provided in each bucket of the MAC address search table 22. Each comparison circuit 21A has a function of comparing the MAC address included in data read out from a corresponding entry with the destination MAC address of the downstream frame and outputting the comparison result to the search response processing circuit 21B.

The search response processing circuit 21B has a function of determining, based on the comparison results from the comparison circuits 21A, the presence/absence of registration of data including a MAC address matching the destination MAC address out of the data parallelly output from the MAC address search table 22, and outputting the result as a MAC address search response.

The registration control circuit 21C has a function of, in response to a MAC address registration request from the frame transfer processing unit 20, specifying, from the transmission source MAC address of an upstream frame, a bucket number corresponding to the transmission source MAC address based on a preset hash function, a function of calculating, from the bucket number, a data storage address (read address) representing the entry of the bucket corresponding to the bucket number out of the MAC address search table 22, a function of outputting a read request for selecting the bucket corresponding to the destination MAC address based on the data storage address to the MAC address search table 22, and a function of, if the MAC address search response from the search response processing circuit 21B indicates the absence of registration, registering data including the transmission source MAC address and destination information acquired from the upstream frame in a free entry belonging to the bucket of the bucket number out of the MAC address search table 22.

In the arrangement example shown in FIG. 11, 512 (N=512) buckets corresponding to bucket numbers 0 to 511 are provided in the MAC address search table 22 as storage areas. Each bucket is provided with 32 entries corresponding to entry numbers 0 to 31. The data storage addresses of the storage areas are set in a one-to-one correspondence with the bucket numbers. Each entry has a 512-word data storage area. In the entire MAC address search table 22, 16,384 data can be registered at maximum.

Since the maximum value of the bucket number is 511, the hash function to specify the bucket number is formed from, for example, a function expression for calculating nine lower bits of CRC32 of a MAC address. The relationship between the data storage address and the bucket number is given by (data storage address)=(bucket number)×a, where $\underline{a}$ is a coefficient representing the interval of data storage addresses in the storage circuit (semiconductor memory) that forms the storage area, and an integer of 1 or more is used.

Upon receiving a MAC address registration request, the registration control circuit 21C calculates the bucket number based on the transmission source MAC address of an upstream frame and performs bucket distribution. The registration control circuit 21C calculates the data storage address value corresponding to the bucket number, and reads out registered data of the entries stored at the data storage address in a plurality of storage areas (storage area #0 to storage area #31) at the same timing.

This makes it possible to narrow down the search range only to buckets predicted to store the search target MAC address out of the MAC address search table 22, instead of including all entries of the MAC address search table 22 in the search range.

In the example shown in FIG. 11, the bucket number obtained by bucket distribution is "1", and the data storage address value is "a". Hence, data 1_j (j=0, 1, . . . , 31) are read out from 32 entries belonging to the bucket of the bucket number "1" at the same timing. The data 1_j read out from the MAC address search table 22 are input to the corresponding comparison circuits 21A (#j) at the same timing.

The comparison circuits 21A (#j) compare the MAC addresses included in the data 1_j with the destination MAC address of the downstream frame, and output the comparison results at the same timing. The search response processing circuit 21B determines, based on the comparison results input from the comparison circuits 21A at the same timing, whether the bucket includes an entry in which the transmission source MAC address of the downstream frame is registered. The search response processing circuit 21B outputs a MAC address search response representing the presence/absence of registration in accordance with the presence/absence of data including a MAC address matching the transmission source MAC address.

If the MAC address search response indicates the absence of registration, the registration control circuit 21C calculates the data storage address of a free entry in which no data is stored out of the bucket of the bucket number obtained from the transmission source MAC address. The free state of an entry is determined by the comparison circuit 21A or the search response processing circuit 21B based on data read out from the MAC address search table 22, and the registration control circuit 21C is notified of the determination result by the MAC address search response. The registration control circuit 21C registers destination information including the LLID of the upstream frame and downstream output destination selection information associated with the LLID in advance at the data storage address of the free entry obtained in the above-described way in association with the transmission source MAC address. If the bucket includes a plurality of free entries, for example, the information is registered in the free entry having the smallest intra-bucket entry number.

If the MAC address search response indicates the presence of registration, the registration control circuit 21C registers, by overwrite, the LLID of the upstream frame and downstream output destination selection information associated with the LLID in advance at the data storage address of the entry in which the matching MAC address is registered in association with the transmission source MAC address.

(4) Operation of MAC Address Search Unit

The MAC address search unit 23 reads out an LLID and downstream output destination selection information from the MAC address search table 22 based on the destination MAC address of a received downstream frame, and decides the destination LLID and the output destination of the downstream frame in accordance with the procedure shown in FIG. 6.

In the downstream output destination decision procedure shown in FIG. 6, the MAC address search unit 23 first confirms, based on the entry enable/disable of the destination MAC address of the received downstream frame out of the MAC address search table 22, whether the destination MAC address is registered in the MAC address search table 22 (step 100).

If an "enable" state is set as the entry enable/disable, and the destination MAC address is registered (step 100: YES), the MAC address search unit 23 acquires an LLID corresponding to the destination MAC address from the MAC address search table 22, and specifies it as the destination LLID of the downstream frame (step 101). The information of the decided LLID is given to the LLID giving unit 25 as a destination LLID.

Next, the MAC address search unit 23 acquires downstream output destination selection information corresponding to the destination MAC address from the MAC address search table 22, specifies the output system of the downstream frame (step 102), and ends the series of processes.

On the other hand, if the MAC address field does not match the destination MAC address in any entry where the "enable" state is set as the entry enable/disable (step 100: NO), the MAC address search unit 23 decides to discard the downstream frame (step 103), and ends the series of processes.

(5) MAC Address Search Processing

The processing of causing the MAC address search unit 23 to search the MAC address search table 22 in step 100 of FIG. 6 will be described next with reference to FIG. 9 described above.

The MAC address search unit 23 has a function of, based on the destination MAC address of a downstream frame received from the host apparatus, searching the MAC address search table 22 for corresponding data, and acquiring, from the data, destination information to be added to the downstream frame.

The MAC address search unit 23 includes the comparison circuits 23A, the search response processing circuit 23B, and the search control circuit 23C as main circuit components.

N comparison circuits 23A are provided in correspondence with N entries provided in each bucket of the MAC address search table 22. Each comparison circuit 23A has a function of comparing the MAC address included in data read out from a corresponding entry with the destination MAC address of a downstream frame and outputting the comparison result to the search response processing circuit 23B.

The search response processing circuit 23B has a function of, based on the comparison results from the comparison circuits 23A, acquiring destination information from data including a MAC address matching the destination MAC address out of the data parallelly output from the MAC address search table 22, and outputting the destination information as a MAC address search response.

The search control circuit 23C has a function of, in response to a MAC address search request from the frame transfer processing unit 20, specifying, from the MAC address of a downstream frame, a bucket number corresponding to the destination MAC address based on a preset hash function, a function of calculating, from the bucket number, a data storage address (read address) representing the entry of the bucket corresponding to the bucket number out of the MAC address search table 22, and a function of outputting a read request for selecting the bucket corresponding to the destination MAC address based on the data storage address to the MAC address search table 22.

In the arrangement example shown in FIG. 9, 512 (N=512) buckets corresponding to bucket numbers 0 to 511 are provided in the MAC address search table 22 as storage areas. Each bucket is provided with 32 entries corresponding to entry numbers 0 to 31. The data storage addresses of the storage areas are set in a one-to-one correspondence with the bucket numbers. Each entry has a 512-word data storage area. In the entire MAC address search table 22, 16,384 data can be registered at maximum.

Since the maximum value of the bucket number is 511, the hash function to specify the bucket number is formed from, for example, a function expression for calculating nine lower bits of CRC32 of a MAC address. The relationship between the data storage address and the bucket number is given by (data storage address) (bucket number)×a, where $\underline{a}$ is a coefficient representing the interval of data storage addresses in the storage circuit (semiconductor memory) that forms the storage area, and an integer of 1 or more is used.

Upon receiving a MAC address search request, the search control circuit 23C calculates the bucket number based on the destination MAC address of a downstream frame and performs bucket distribution. The search control circuit 23C calculates the data storage address value corresponding to the bucket number, and reads out registered data of the entries stored at the data storage address in a plurality of storage areas (storage area #0 to storage area #31) at the same timing.

This makes it possible to narrow down the search range only to buckets predicted to store the search target MAC address out of the MAC address search table 22, instead of including all entries of the MAC address search table 22 in the search range.

In the example shown in FIG. 9, the bucket number obtained by bucket distribution is "1", and the data storage address value is "a". Hence, data 1_j (j=0, 1, . . . , 31) are read out from 32 entries belonging to the bucket of the bucket number "1" at the same timing. The data 1_j read out from the MAC address search table 22 are input to the corresponding comparison circuits 23A (#j) at the same timing.

The comparison circuits 23A (#j) compare the MAC addresses included in the data 1_j with the destination MAC address of the downstream frame, and output the comparison results at the same timing. The search response processing circuit 23B determines, based on the comparison results input from the comparison circuits 23A at the same timing, whether the bucket includes an entry in which the destination MAC address of the downstream frame is registered.

Upon founding data including a MAC address matching the destination MAC address, the search response processing circuit 23B acquires destination information from the data with the matching MAC address out of the data 1_j input from the comparison circuits 23A at the same timing, and outputs it as a MAC address search response.

The MAC address search response includes the presence/absence of the entry in which the destination MAC address of the downstream frame is registered, and the downstream output destination selection information and LLID registered in the entry.

Figure 12:
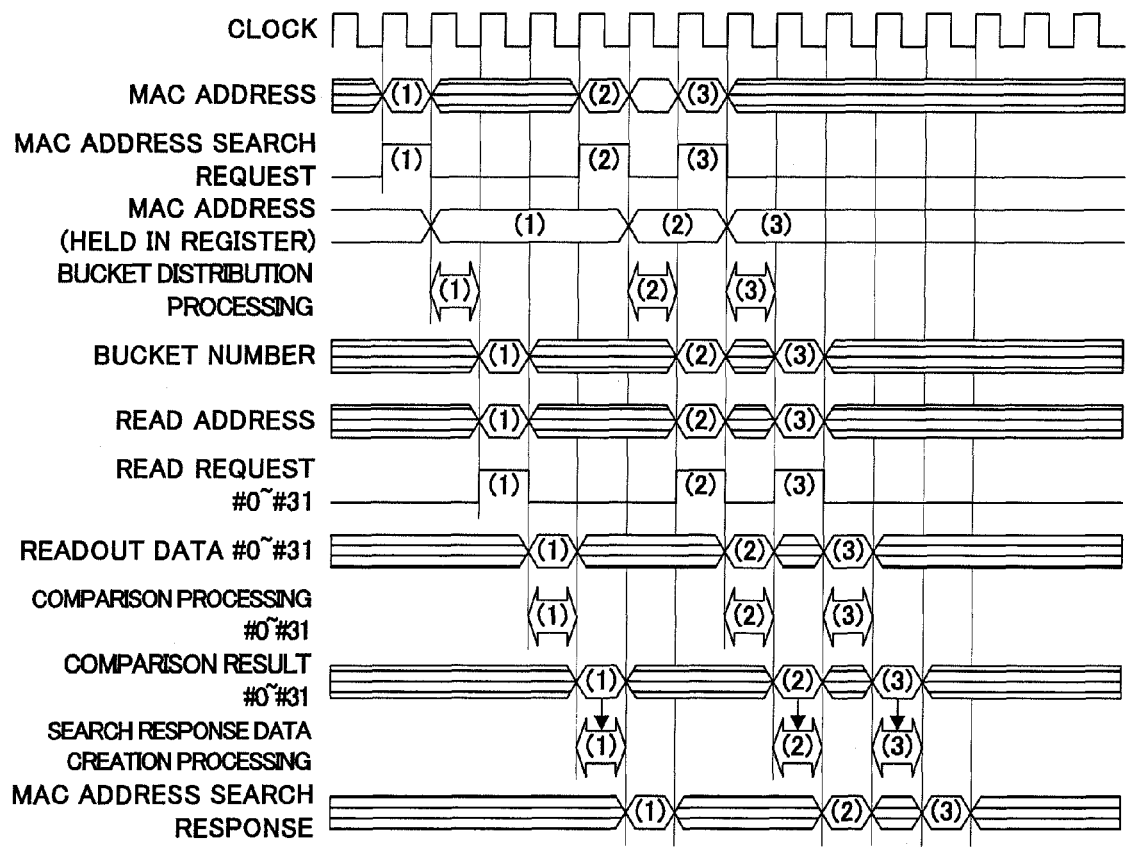
FIG. 12 is a timing chart showing MAC address search processing.

FIG. 12 is a timing chart showing MAC address search processing. In this example, when the destination MAC address of a downstream frame and the MAC address search request are input to the MAC address search unit 23 in the first clock, the bucket number is specified by bucket distribution processing in the next second clock. In the third clock from the start, the bucket number, the read address, and the read request are output from the search control circuit 23C to the MAC address search table 22.

In the fourth clock from the start, data is read out from each entry of the corresponding bucket out of the MAC address search unit 23, and each comparison circuit 23A compares the MAC address of the data with the destination MAC address.

The comparison results are output from the comparison circuits 23A to the search response processing circuit 23B in the fifth clock from the start. Search response data is created and output from the search response processing circuit 23B in the sixth clock from the start.

Hence, the MAC address search response is output five clocks after the input of the MAC address search request.

In addition, the search control circuit 23C, the MAC address search table 22, the comparison circuits 23A, and the search response processing circuit 23B can sequentially execute processing in accordance with the inputs. For this reason, a sequence operation can be performed as a whole. When one processing ends, the next processing can start at an interval of one clock. Hence, the MAC address search unit 23 can perform search processing at the minimum interval of one clock.

On the other hand, as shown in FIG. 4, in parallel to the downstream frame downstream output destination decision procedure, the downstream latency absorption unit 24 adds a delay equal to the latency generated by the MAC address search unit 23 to the received downstream frame, and absorbs the latency by the downstream output destination decision processing of the MAC address search unit 23.

The LLID giving unit 25 gives the destination LLID to the downstream frame from the downstream latency absorption unit 24 in accordance with the LLID decided by the MAC address search unit 23.

The downstream output destination control unit 26 transfers the downstream frame from the LLID giving unit 25 to the corresponding downstream output timing adjustment unit 27A of 0 system or downstream output timing adjustment unit 27B of 1 system in accordance with the downstream output destination selection information decided by the MAC address search unit 23.

Each of the downstream output timing adjustment units 27A and 27B adjusts the output order of each downstream frame based on priority decided by PCP or the like included in the downstream frame, and transfers the downstream frame to a corresponding one of the frame multiplexing units 16A and 16B. For example, in a system in which a 10G-ONU and a 1G-ONU coexist, 10G (802.3av specifications) output is designated for the 10G-ONU, and 1G (802.3ah specifications) output is designated for the 1G-ONU.

If the MAC address search unit 23 decides to discard the downstream frame, the downstream output destination control unit 26 performs discarding processing of the downstream frame.

As for the MAC address search table 22, a MAC address registration unit 21 acquires a transmission source MAC address and an LLID from a received upstream frame, and registers the LLID and downstream output destination selection information corresponding to the LLID in the MAC address search table 22 in association with the transmission source MAC address. As the downstream output destination selection information, for example, the downstream output destination selection information of an ONU is acquired by a control frame notified by the ONU at the start of communication.

In the arrangement of this embodiment, the values in the MAC address search table 22 are set by software that controls and manages the OLT 10. More specifically, when the MAC address registration unit 21 sets information to be registered in the MAC address search table 22 as shown in FIG. 10 in a register and sets a MAC address setting request flag, the software writes the information in the MAC address search table 22 and sets a MAC address setting completion flag. In this way, the destination MAC address and downstream output destination selection information of a downstream frame are managed in correspondence with each LLID, and necessary information is registered in the MAC address search table 22.

[1.5. Effects of First Embodiment]

As described above, in this embodiment, the LLID and downstream output destination selection information of an ONU are registered in the MAC address search table 22 in correspondence with each of the MAC addresses of user apparatuses connected to ONUs. Upon receiving a downstream frame from the host apparatus, the frame transfer processing unit 20 acquires an LLID and downstream output destination selection information corresponding to the destination MAC address of the downstream frame from the MAC address search table 22.

When deciding the destination LLID of a downstream frame and then judging the transmission rate, as in the above-described related art, a circuit that read-accesses a table to manage the downstream transmission speed for each LLID in addition to the MAC address search table 22 is necessary, resulting in an increase in the circuit scale of the OLT.

According to this embodiment, the destination MAC address and downstream output destination selection information (transmission speed) of a downstream frame can be determined only by read (search) from the MAC address search table 22. For this reason, the output system of the downstream frame can easily be specified almost without an increase in the circuit scale of the OLT. It is therefore possible to select a 1G-ONU or a 10G-ONU as the destination and transfer the downstream frame.

2. Second Embodiment

An OLT 10 according to the second embodiment of the present invention will be described next with reference to FIG. 13.

[2.1. Arrangement of OLT According to Second Embodiment]

Figure 13:
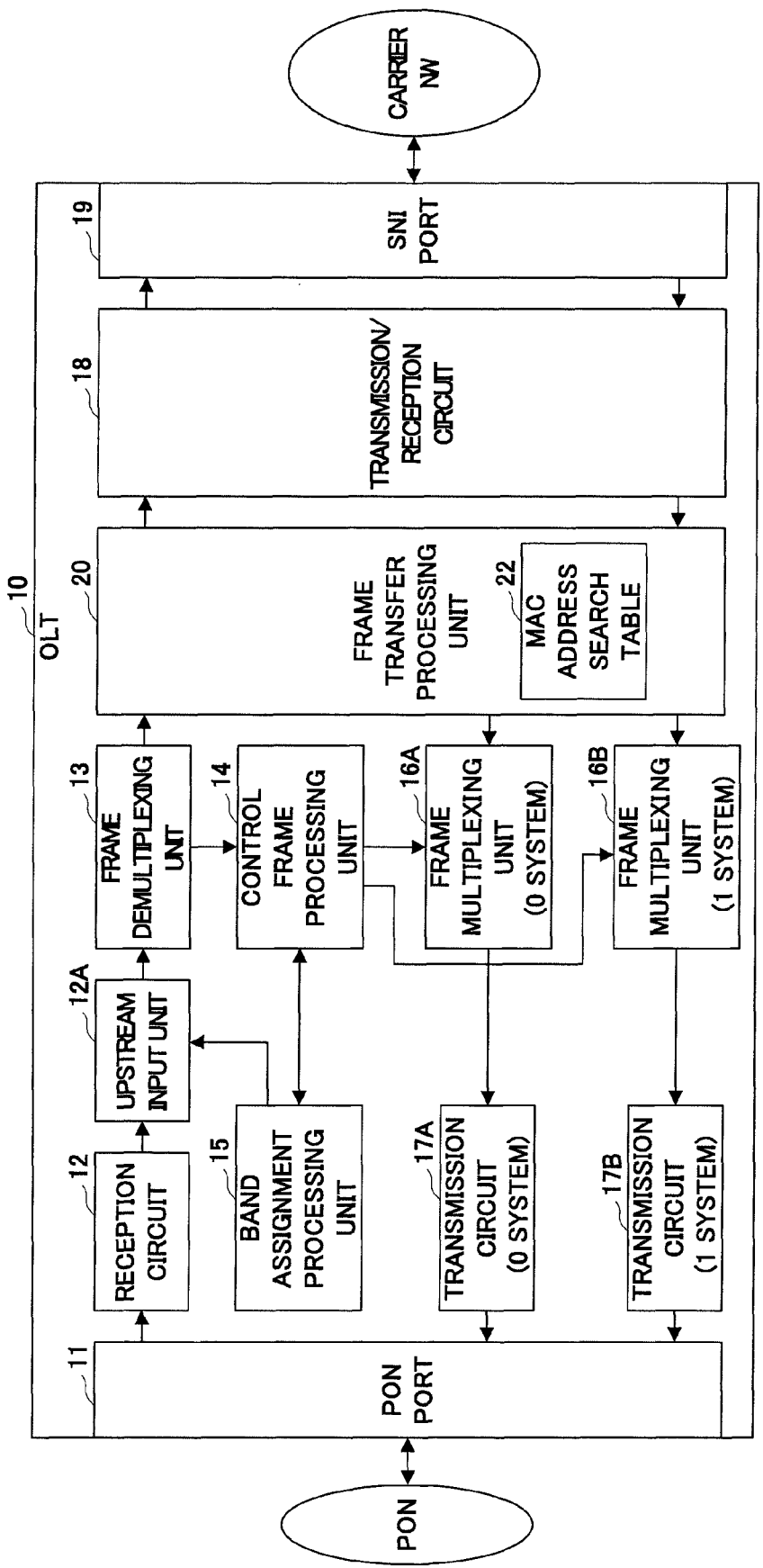
FIG. 13 is a block diagram showing the arrangement of an OLT according to the second embodiment.

FIG. 13 is a block diagram showing the arrangement of the OLT according to the second embodiment.

As compared to the first embodiment, an upstream input unit 12A is added to the OLT 10 according to the second embodiment.

In this embodiment, a band assignment processing unit 15 has a function of reading out downstream output destination selection information corresponding to the LLID of a scheduled upstream frame from PON-IF port information registered in the band assignment processing unit 15 in advance and instructing the downstream output destination selection information to the upstream input unit 12A in synchronism with the timing of the upstream frame assigned by the band assignment processing unit 15, in addition to the function described in the first embodiment.

The upstream input unit 12A is a processing unit that insets the downstream output destination selection information instructed from the band assignment processing unit 15 into the preamble of the upstream frame.

A MAC address registration unit 21 (see FIG. 4) has a function of acquiring a transmission source MAC address, LLID, and downstream output destination selection information from the upstream frame from the upstream input unit 12A and registering the LLID and the downstream output destination selection information in a MAC address search table 22 in association with the transmission source MAC address.

The rest of the arrangement according to this embodiment is the same as in the first embodiment, and a detailed description thereof will be omitted.

[2.2. Operation of OLT According to Second Embodiment]

The band assignment processing unit 15 reads out downstream output destination selection information corresponding to the LLID of a scheduled upstream frame from the PON-IF port information, and instructs the downstream output destination selection information to the upstream input unit 12A in synchronism with the reception timing of the upstream frame assigned in advance. As the downstream output destination selection information, for example, the downstream output destination selection information of an ONU is acquired by a control frame notified by the ONU at the start of communication, as will be described later.

At this time, if the LLID of the upstream frame is assigned to a 1G-ONU (the upstream speed is 1G, and the downstream speed is 1G), the "0 system" is instructed as the downstream output destination selection information. If the LLID of the upstream frame is assigned to a 10G-ONU (the upstream speed is 10G, and the downstream speed is 10G), the "1 system" is instructed as the downstream output destination selection information. Note that if the LLID of the upstream frame is assigned to an asymmetric ONU (the upstream speed is 1G, and the downstream speed is 10G), the "1 system" is instructed as the downstream output destination selection information.

Figure 14:
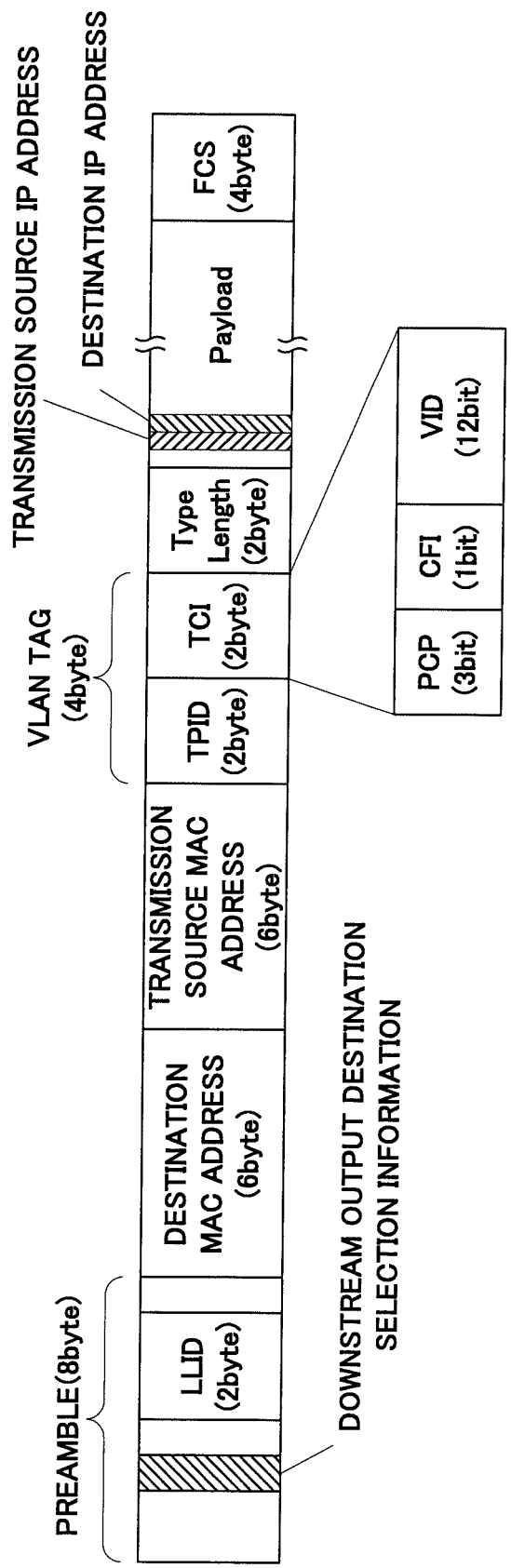
FIG. 14 is a view showing an example of the arrangement of an upstream frame output from an upstream input unit.

The upstream input unit 12A inserts the downstream output destination selection information instructed from the band assignment processing unit 15 into the preamble of the upstream frame. FIG. 14 is a view showing an example of the arrangement of the upstream frame output from the upstream input unit 12A. Unlike the frame transmitted in the PON section shown in FIG. 2 described above, downstream output destination selection information is inserted into the preamble.

For example, if the instruction from the band assignment processing unit 15 is "0 system", the upstream input unit 12A inserts "0" in the downstream output destination selection information of the preamble of the upstream frame. If the instruction from the band assignment processing unit 15 is "1 system", the upstream input unit 12A inserts "1" in the downstream output destination selection information of the preamble of the upstream frame.

Figure 15:
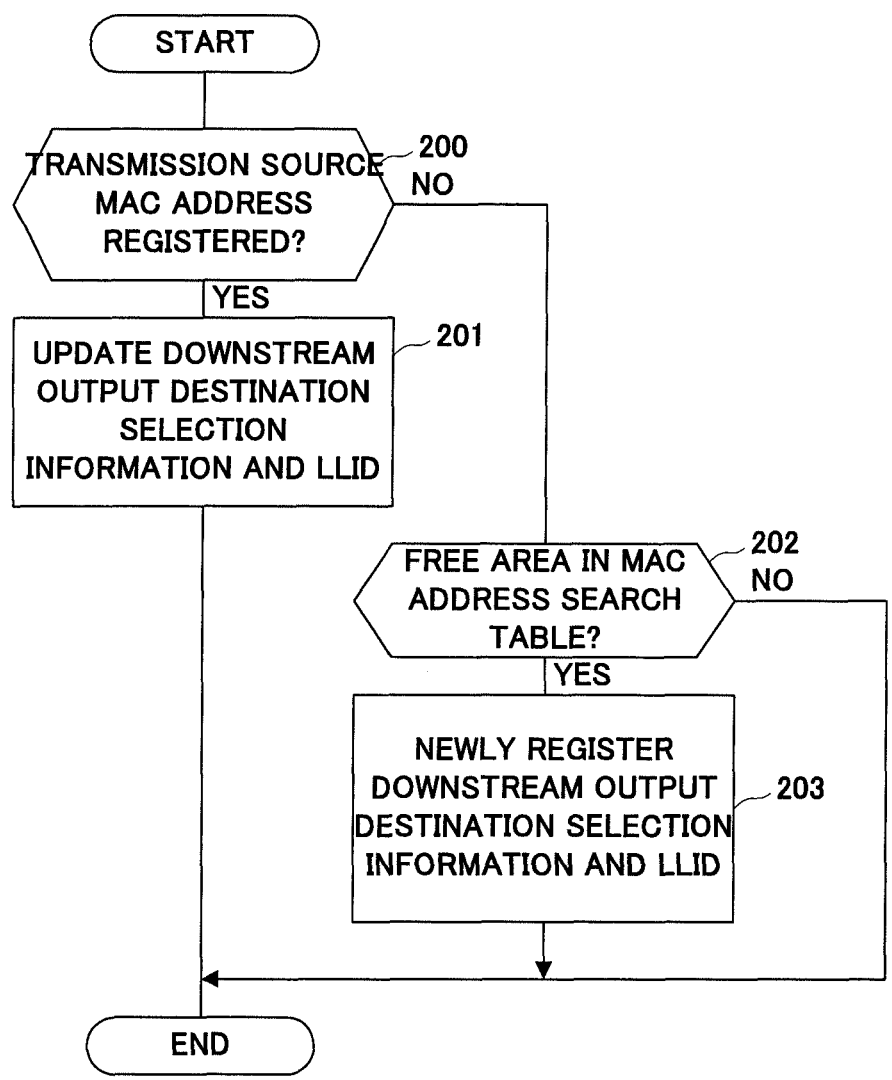
FIG. 15 is a flowchart showing MAC address registration processing.

In the OLT arrangement according to this embodiment, values in the MAC address search table 22 of a frame transfer processing unit 20 can automatically be set at the time of upstream frame reception. A method of causing the frame transfer processing unit 20 to automatically register the transmission source MAC address and the output destination selection information of a received upstream frame will be described below. FIG. 15 is a flowchart showing MAC address registration processing.

If a received upstream frame is not a PON control frame, the MAC address registration unit 21 performs MAC address registration processing shown in FIG. 15 based on the transmission source MAC address of the upstream frame.

The MAC address registration unit 21 first searches the MAC address search table 22 based on the transmission source MAC address of the upstream frame (step 200). If the transmission source MAC address is already registered in the MAC address search table 22 (step 200: YES), the MAC address registration unit 21 updates the downstream output destination selection information and LLID corresponding to the MAC address (step 201), and ends the series of processes. Note that execution of step 201 may be prohibited not to update the information.

As the downstream output destination selection information registered in the MAC address search table 22, the MAC address registration unit 21 acquires the downstream output destination selection information inserted into the preamble of the upstream frame by the upstream input unit 12A, as shown in FIG. 14. As the LLID, the MAC address registration unit 21 acquires the LLID inserted into the processing of the upstream frame by the ONU in advance.

On the other hand, if the MAC address is not registered in the MAC address search table 22 (step 200: NO), the MAC address registration unit 21 confirms whether a free area exists in the MAC address search table 22 (step 202). "A free area exists" indicates that there is an entry in which a "disable" state is set as entry enable/disable.

If a free area exists (step 202: YES), the MAC address registration unit 21 newly registers the downstream output destination selection information and LLID in the free entry in association with the MAC address (step 203), and ends the series of processes. If no free area exists (step 202: NO), the MAC address registration unit 21 ends the series of processes.

[2.2.1. MAC Address Registration Processing]

Processing of causing the MAC address registration unit 21 to register an address in the MAC address search table 22 in step 200 of FIG. 15 will be described with reference to FIG. 11 described above.

The MAC address registration unit 21 has a function of, based on the transmission source MAC address of an upstream frame received from an ONU, searching the MAC address search table 22 for corresponding data, and a function of, if data including a MAC address matching the transmission source MAC address is not registered, registering data including the transmission source MAC address and destination information acquired from the upstream frame in a free entry belonging to a bucket of a bucket number out of the MAC address search table.

The MAC address registration unit 21 includes comparison circuits 21A, a search response processing circuit 21B, and a registration control circuit 21C as main circuit components.

N comparison circuits 21A are provided in correspondence with N entries provided in each bucket of the MAC address search table 22. Each comparison circuit 21A has a function of comparing the MAC address included in data read out from a corresponding entry with the destination MAC address of a downstream frame and outputting the comparison result to the search response processing circuit 21B.

The search response processing circuit 21B has a function of determining, based on the comparison results from the comparison circuits 21A, the presence/absence of registration of data including a MAC address matching the destination MAC address out of the data parallelly output from the MAC address search table 22, and outputting the result as a MAC address search response.

The registration control circuit 21C has a function of, in response to a MAC address registration request from the frame transfer processing unit 20, specifying, from the transmission source MAC address of an upstream frame, a bucket number corresponding to the transmission source MAC address based on a preset hash function, a function of calculating, from the bucket number, a data storage address (read address) representing the entry of the bucket corresponding to the bucket number out of the MAC address search table 22, a function of outputting a read request for selecting the bucket corresponding to the transmission source MAC address based on the data storage address to the MAC address search table 22, and a function of, if the MAC address search response from the search response processing circuit 21B indicates the absence of registration, registering data including the transmission source MAC address and destination information acquired from the upstream frame in a free entry belonging to the bucket of the bucket number out of the MAC address search table 22.

In the arrangement example shown in FIG. 11, 512 (N=512) buckets corresponding to bucket numbers 0 to 511 are provided in the MAC address search table 22 as storage areas. Each bucket is provided with 32 entries corresponding to entry numbers 0 to 31. The data storage addresses of the storage areas are set in a one-to-one correspondence with the bucket numbers. Each entry has a 512-word data storage area. In the entire MAC address search table 22, 16,384 data can be registered at maximum.

Since the maximum value of the bucket number is 511, the hash function to specify the bucket number is formed from, for example, a function expression for calculating nine lower bits of CRC32 of a MAC address. The relationship between the data storage address and the bucket number is given by (data storage address)=(bucket number)×a, where $a$ is a coefficient representing the interval of data storage addresses in the storage circuit (semiconductor memory) that forms the storage area, and an integer of 1 or more is used.

Upon receiving a MAC address registration request, the registration control circuit 21C calculates the bucket number based on the transmission source MAC address of an upstream frame and performs bucket distribution. The registration control circuit 21C calculates the data storage address value corresponding to the bucket number, and reads out registered data of the entries stored at the data storage address in a plurality of storage areas (storage area #0 to storage area #31) at the same timing.

This makes it possible to narrow down the search range only to buckets predicted to store the search target MAC address out of the MAC address search table 22, instead of including all entries of the MAC address search table 22 in the search range.

In the example shown in FIG. 11, the bucket number obtained by bucket distribution is "1", and the data storage address value is "a". Hence, data 1_j (j=0, 1, . . . , 31) are read out from 32 entries belonging to the bucket of the bucket number "1" at the same timing. The data 1_j read out from the MAC address search table 22 are input to the corresponding comparison circuits 21A (#j) at the same timing.

The comparison circuits 21A (#j) compare the MAC addresses included in the data 1_j with the destination MAC address of the downstream frame, and output the comparison results at the same timing. The search response processing circuit 21B determines, based on the comparison results input from the comparison circuits 21A at the same timing, whether the bucket includes an entry in which the transmission source MAC address of the upstream frame is registered. The search response processing circuit 21B outputs a MAC address search response representing the presence/absence of registration in accordance with the presence/absence of data including a MAC address matching the transmission source MAC address.

Figure 16:
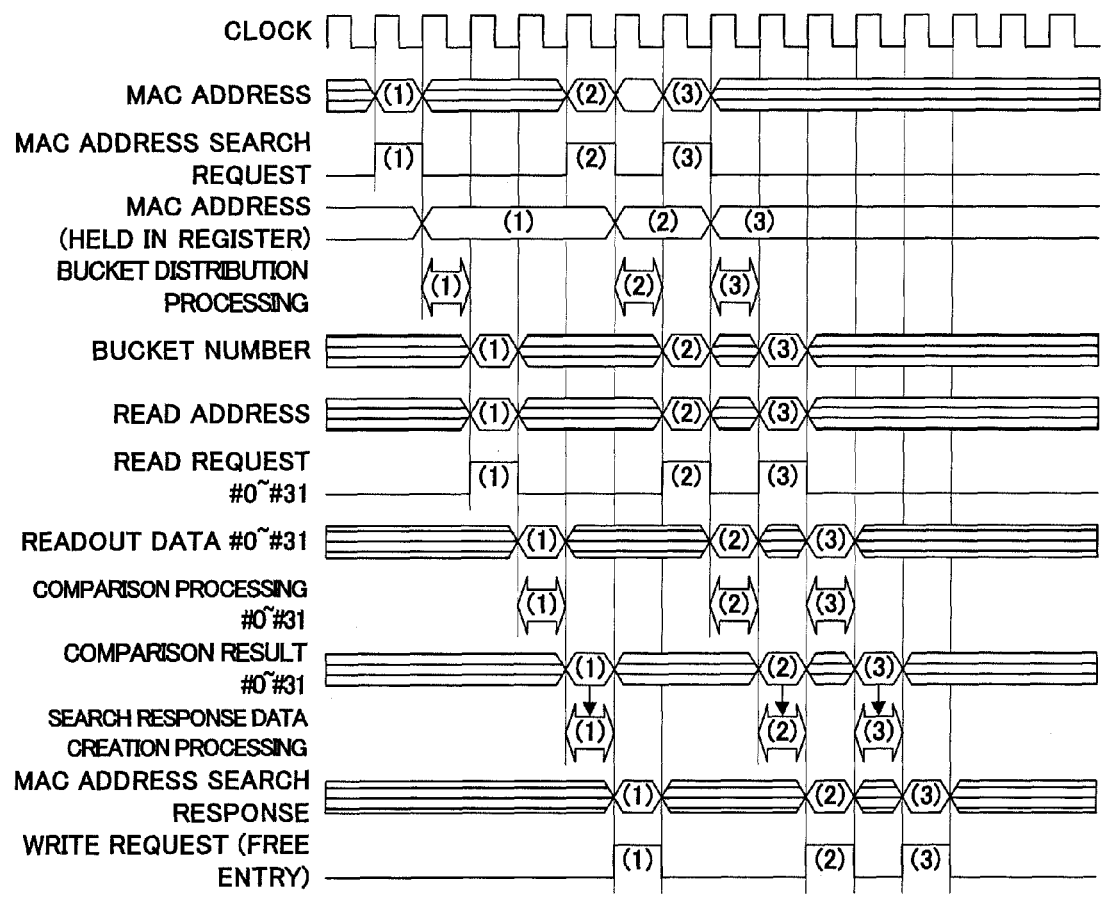
FIG. 16 is a timing chart showing MAC address registration processing.

FIG. 16 is a timing chart showing MAC address registration processing. In this example, when the transmission source MAC address of an upstream frame and the MAC address search request are input to the MAC address registration unit 21 in the first clock, the bucket number is specified by bucket distribution processing in the next second clock. In the third clock from the start, the bucket number, the read address, and the read request are output from the registration control circuit 21C to the MAC address search table 22.

Hence, in the third clock from the start, data is read out from each entry of the corresponding bucket out of the MAC address registration unit 21, and each comparison circuit 21A compares the MAC address of the data with the destination MAC address.

The comparison results are output from the comparison circuits 21A to the search response processing circuit 21B in the fourth clock from the start. Search response data is created and output from the search response processing circuit 21B in the fifth clock from the start. Based on this, the registration control circuit 21C outputs a write request to the MAC address search table 22.

Hence, the MAC address search response is output five clocks after the input of the MAC address search request, as can be seen.

In addition, the registration control circuit 21C, the MAC address search table 22, the comparison circuits 21A, and the search response processing circuit 21B can sequentially execute processing in accordance with the inputs. For this reason, a sequence operation can be performed as a whole. When one processing ends, the next processing can start at an interval of one clock. Hence, the MAC address registration unit 21 can perform search processing at the minimum interval of one clock.

[2.2.2. Downstream Output Destination Selection Information Acquisition Method]

A detailed method of acquiring the downstream output destination selection information of an ONU by a control frame notified by the ONU at the start of communication will be described below.

(1) Downstream Output Destination Selection Information Acquisition Method 1

Figure 17:
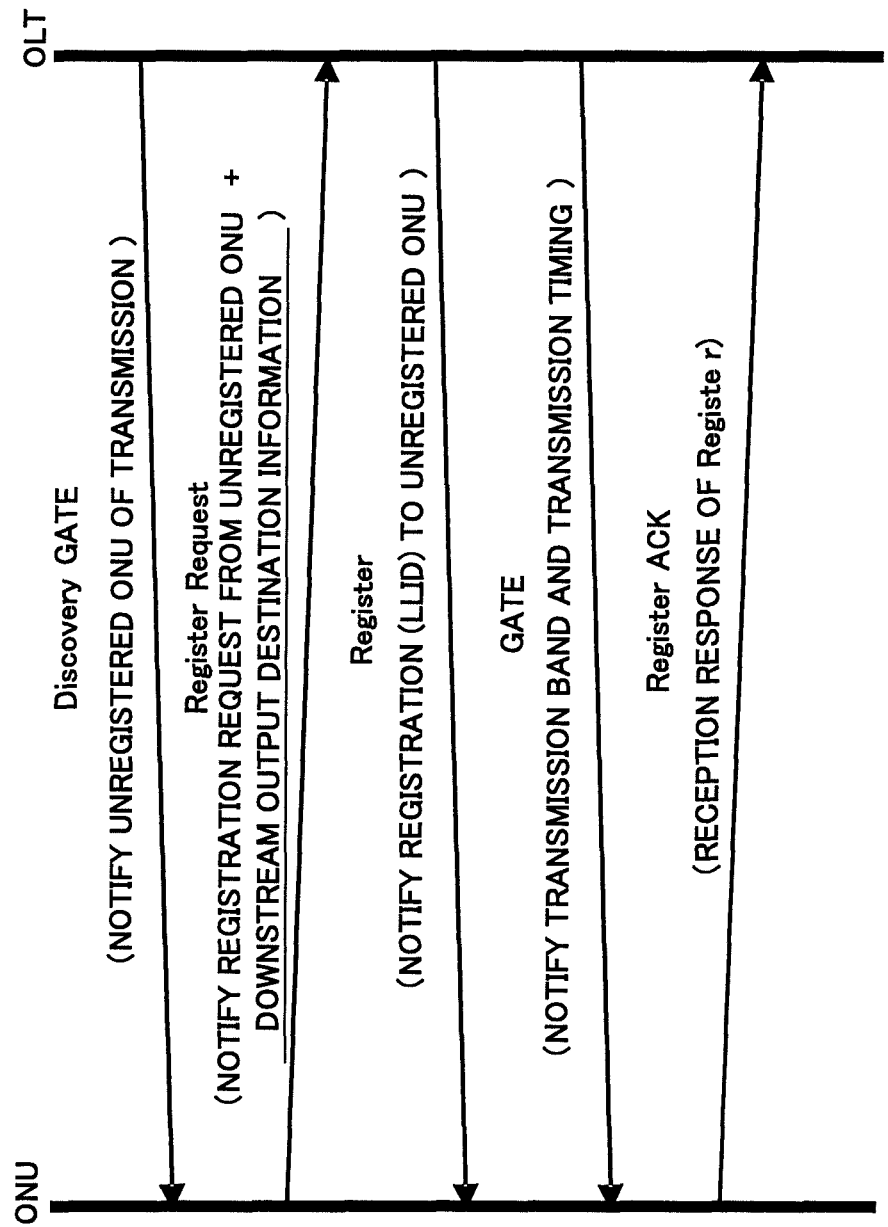
FIG. 17 is a sequence chart for explaining a procedure of acquiring the downstream output destination selection information of an ONU based on a control frame notified by the ONU at the start of communication.

The OLT inquires of an ONU about its type before the start of communication with the ONU, and receives an answer (Register Request frame) from the ONU by a control frame, thereby acquiring the downstream output destination selection information of the ONU (FIG. 17).

In a "notification of downstream output destination information", the ONU type (asymmetric ONU, 1G-ONU, or 10G-ONU), downstream speed (1G or 10G), system (0 system or 1 system), and the like are described in the Data or Reserved area of Register Request. An MPCP (Multi Point Control Protocol) frame format includes Destination Address (6 Octets), Source Address (6 Octets), Length/Type (2 Octets), Opcode (2 Octets), Timestamp (4 Octets), Data/Reserved/Pad (40 Octets), and FCS (4 Octets) sequentially from the head. Length/Type is 0x8808. "Register Request" is a frame in which Opcode has a value representing Register Request.

Figure 18:
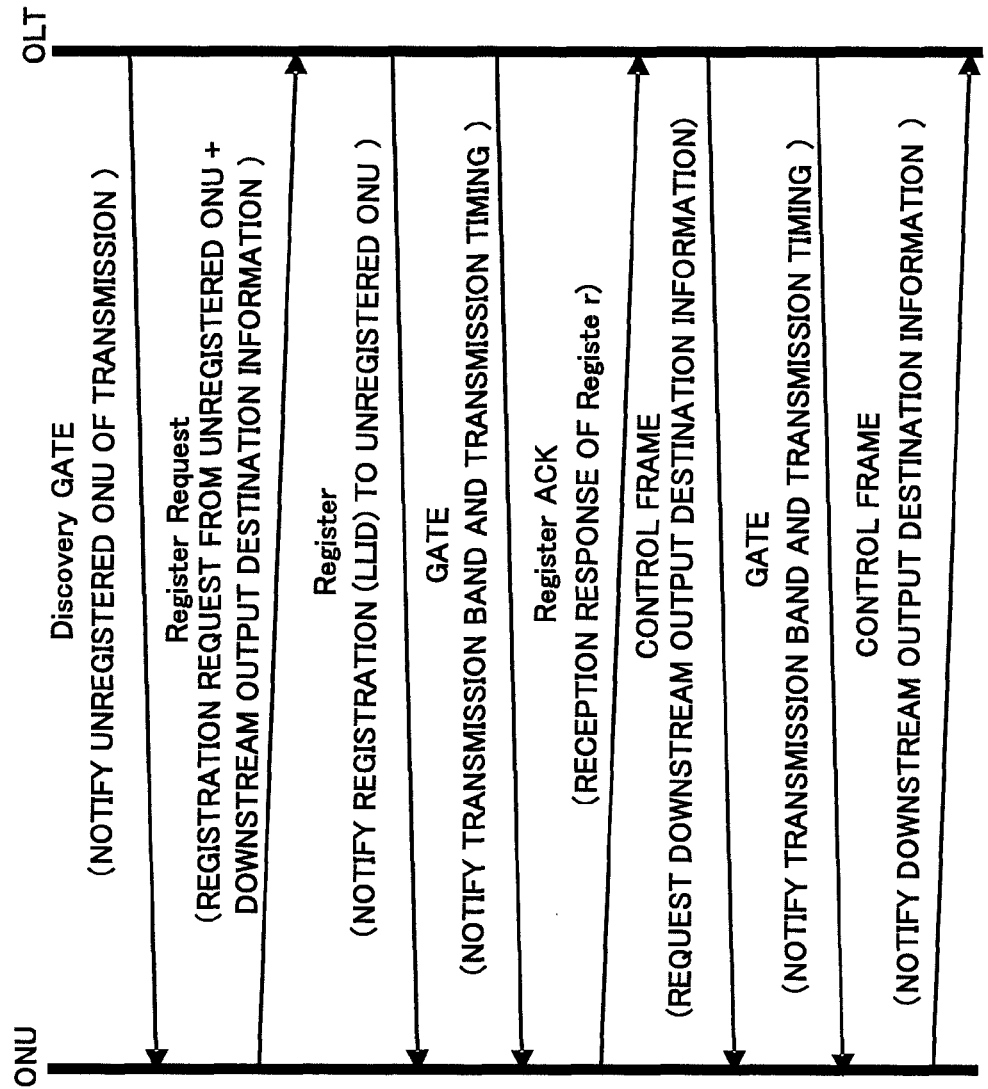
FIG. 18 is a sequence chart far explaining a procedure of acquiring the downstream output destination selection information of an ONU based on a control frame notified by the ONU at the start of communication.

Instead of using Register Request, a control frame including downstream output destination information may separately be transmitted after Register ACK to acquire the downstream output destination selection information of the ONU (FIG. 18).

In this case, "control frame" sending (request downstream output destination information) and GATE sending (notify transmission band and transmission timing) from the OLT to the ONU after Register ACK (reception response of Register) may be transposed.

(2) Downstream Output Destination Selection Information Acquisition Method 2

The OLT acquires the range of MAC addresses that can be taken by each ONU in advance, and acquires downstream output destination selection information of each ONU by comparison with the address.

(3) Downstream Output Destination Selection Information Acquisition Method 3

The OLT acquires vendor IDs included in MAC addresses that can be taken by each ONU and the model ID of each ONU in advance, and acquires downstream output destination selection information of each ONU by comparing the MAC address of a received upstream frame with the IDs.

In Ethernet®, the MAC address is a 48-bit code of which
first 24 bits constitute a vendor ID portion,
next 8 bits constitute a model vendor, and
last 16 bits constitute a serial ID in general. In this case, the model name of a network device can be specified by upper 32 bits.

(4) Downstream Output Destination Selection Information Acquisition Method 4

The OLT acquires vendor IDs of ONUs included in MAC addresses that can be taken by each ONU in advance, and acquires downstream output destination selection information of each ONU by comparing the MAC address of a received upstream frame with the IDs.

[2.3. Effects of Second Embodiment]

As described above, in this embodiment, the upstream input unit 12A gives downstream output destination selection information concerning the transmission source ONU of a received upstream frame to the upstream frame. The MAC address registration unit 21 acquires the transmission source MAC address, LLID, and downstream output destination selection information from the upstream frame from the upstream input unit 12A, and registers the LLID and the downstream output destination selection information in the MAC address search table 22 in association with the transmission source MAC address.

The MAC address registration unit 21 can thus automatically register the MAC address, LLID, and downstream output destination selection information in the MAC address search table 22, including those of an asymmetric ONU (the upstream speed is 1G, and the downstream speed is 10G).

The MAC address registration unit 21 is notified of the downstream output destination selection information using the upstream frame. This allows the MAC address registration unit 21 to acquire the downstream output destination selection information at the same timing as the transmission source MAC address and LLID to be registered in the MAC address search table 22. Hence, a circuit or control to acquire the downstream output destination selection information in synchronism with the transmission source MAC address and LLID need not be added. It is therefore possible to notify the downstream output destination selection information with a very simple arrangement.

Note that the arrangement of this embodiment needs addition of the upstream input unit 12A that inserts downstream output destination selection information in upstream processing, as compared to the arrangement of the first embodiment. In this case, the downstream output destination selection information can easily be inserted into the preamble of the upstream frame by obtaining the downstream output destination selection information (corresponding to the transmission speed of a control frame called a Gate frame) from the band assignment processing unit 15 that performs upstream band assignment.

3. Third Embodiment 3.1. Arrangement of OLT According to Third Embodiment

An OLT 10 according to the third embodiment of the present invention will be described next.

In this embodiment, a MAC address registration unit 21 of the OLT 10 adds an (aging processing) means for confirming the reception history of registered MAC addresses at a predetermined period and disabling, in a MAC address search table 22, registered MAC addresses without the reception history for a predetermined period. The period of aging processing will be referred to as an "aging period", and a timer to count the aging period will be referred to as an "aging timer".

(1) MAC Address Search Table

FIGS. 19 and 20 are views showing an example of the arrangement of the MAC address search table. As compared to FIG. 5 described above, an item "post-aging reception state" is added. The "post-aging reception state" is information representing whether a frame of a MAC address of interest has been received from the previous aging processing to the current point of time.

(2) MAC Address Registration Procedure

Figure 21:
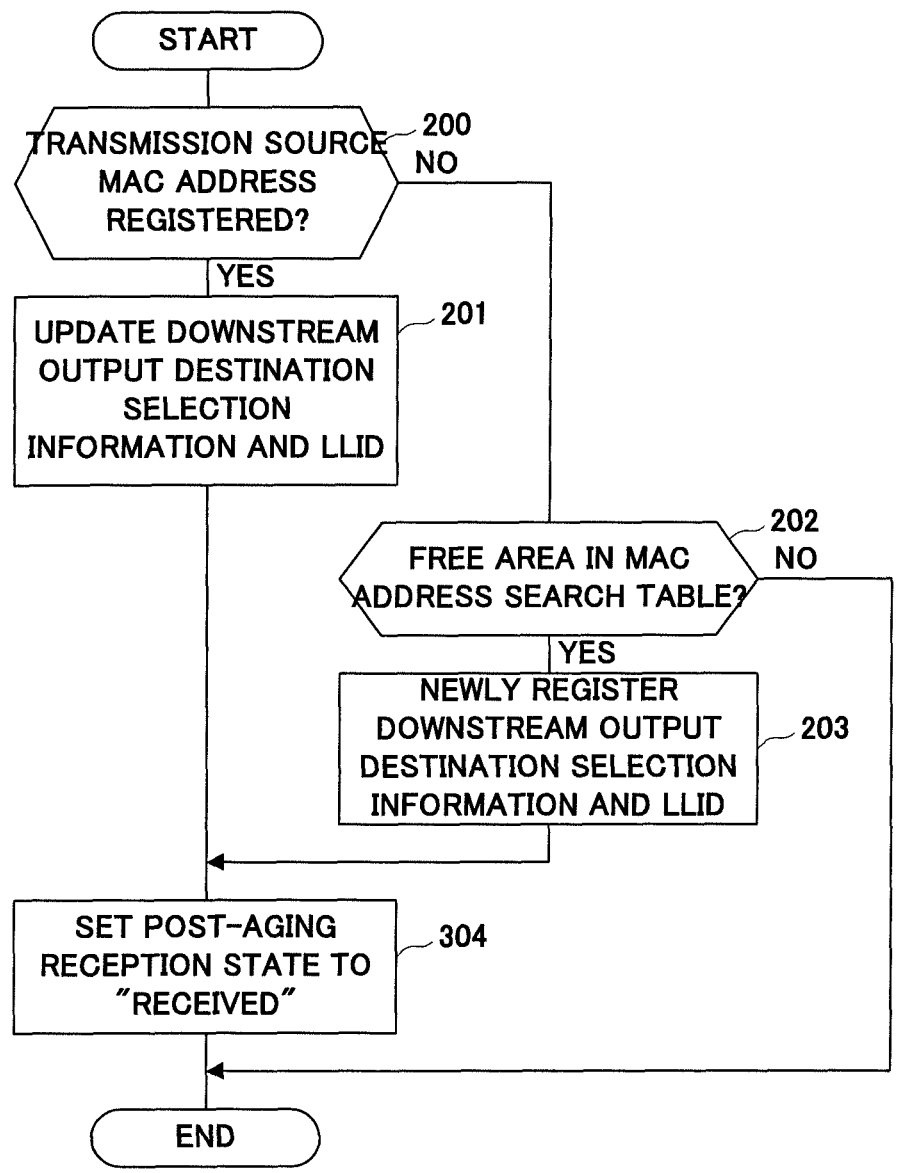
FIG. 21 is a flowchart showing a MAC address registration procedure.

FIG. 21 is a flowchart showing a MAC address registration procedure. In this MAC address registration procedure, the post-aging reception state of a MAC address of interest is set to "received" at the end of the MAC address registration procedure shown in FIG. 15 described above (step 304). The post-aging reception state is set to "received" every time a new MAC address is registered, or registration of a MAC address is updated.

(3) Aging Processing Procedure

Figure 22:
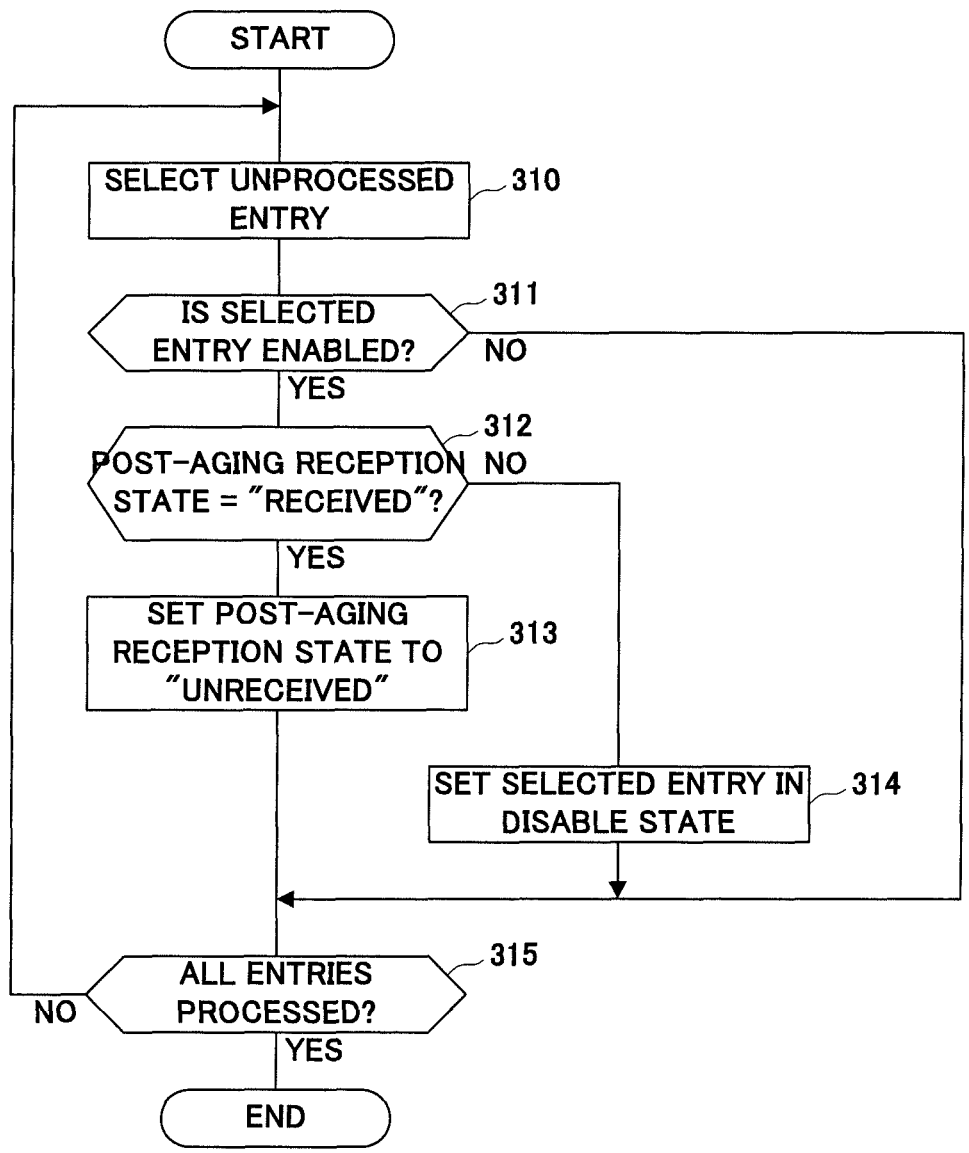
FIG. 22 is a flowchart showing an aging processing procedure.

FIG. 22 is a flowchart showing an aging processing procedure. The MAC address registration unit 21 executes the aging processing procedure shown in FIG. 22 at a predetermined period.

The MAC address registration unit 21 first selects one unprocessed entry from the MAC address search table 22 (step 310), and confirms whether the selected entry is set in an "enable" state (step 311). If the selected entry is in the "enable" state (step 311: YES), the MAC address registration unit 21 confirms whether the post-aging reception state of the selected entry is set to "received" (step 312).

If the post-aging reception state is set to "received" (step 312: YES), the MAC address registration unit 21 sets the post-aging reception state of the selected entry to "unreceived" (step 313), and confirms whether all entries have been processed (step 315). If an unprocessed entry remains (step 315: NO), the process returns to step 310. If all entries have been processed (step 315: YES), the MAC address registration unit 21 ends the series of processes.

On the other hand, if the post-aging reception state of the selected entry is set to "unreceived" (step 312: NO), the MAC address registration unit 21 sets the selected entry to a "disable" state (step 314), and advances to step 315.

When the selected entry is in the "disable state" in step 311 as well (step 311: NO), the process advances to step 315.

Figure 23:
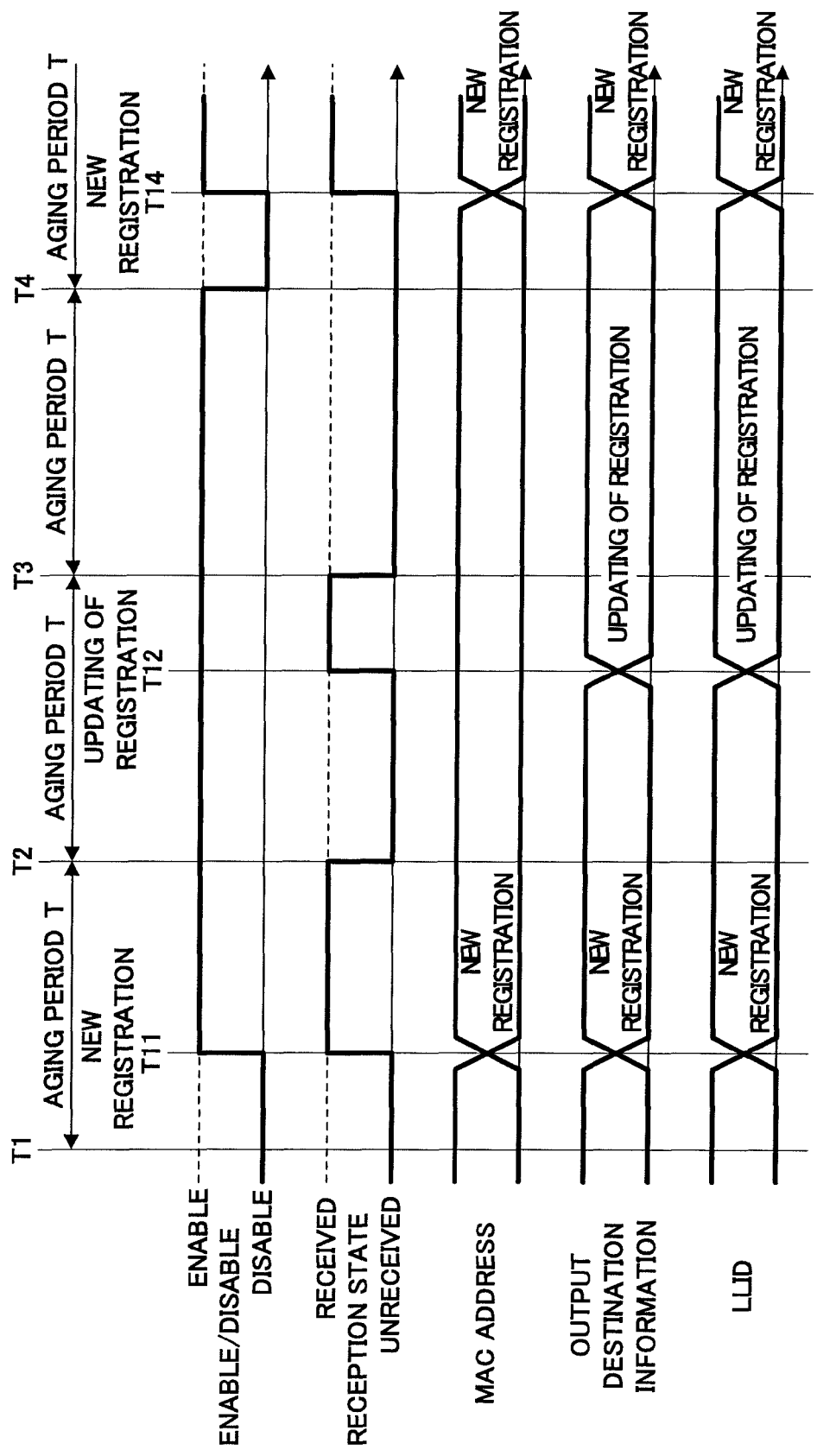
FIG. 23 is a timing chart showing transition of an entry in the MAC address search table.

FIG. 23 is a timing chart showing transition of an entry in the MAC address search table.

When the OLT 10 receives an upstream frame having an unregistered transmission source MAC address at time T11 during an aging period T from time T1 to time T2, the transmission source MAC address is newly registered in a free entry. The entry is set to the "enable" state and "received" and then set to "unreceived" by the next aging processing at the time T2.

When the OLT 10 receives an upstream frame having the transmission source MAC address again at time T12 during the aging period T from the time T2 to time T3, registration of the same MAC address is updated in the entry. The entry is set to the "enable" state and "received" and then set to "unreceived" by the next aging processing at the time T3.

After the entry is set to the "enable" state and "unreceived" in the above-described way, if no frame having the transmission source MAC address is received during the aging period T from the time T3 to time T4, the entry is set to the "disenable" state by the next aging processing at the time T4.

Hence, the entry is set to "unreceived" by the aging processing at the times T2 and T3 but remains in the "enable" state. The transmission source MAC address is continuously registered in the MAC address search table 22 up to the time T4 and set to the "disable" state at the time T4. Setting the entry to the "disable" state means that the MAC address is deleted from the MAC address search table 22, and the entry becomes free (the MAC address is regarded as deleted from the table when the entry is disabled).

Another MAC address can newly be registered in the storage area where the entry is set to the disable state.

3.2. Effects of Third Embodiment

As described above, in this embodiment, the MAC address registration unit 21 registers, for each received upstream frame, the reception state concerning the transmission source MAC address of the upstream frame in the MAC address search table 22, checks the reception state of each MAC address registered in the MAC address search table 22, and sets, out of the MAC addresses, a MAC address whose reception has not been confirmed during a predetermined period to the disable state.

If a frame having a transmission source MAC address is received, and no other frame having the same transmission source MAC address is then received before the aging processing is performed twice, the transmission source MAC address is set to the disable state. Since another MAC address can newly be registered in the storage area where the registered information is disabled, the MAC address search table 22 having a limited size (entries) can effectively be used.

For example, to prepare entries for all values that can be taken by a 48-bit MAC address, $2^{48}$ entries are necessary. The MAC address search table 22 becomes very large, and the circuit scale increases, too. The increase in the circuit scale can be suppressed by preparing the MAC address search table 22 having a small scale, deleting MAC addresses in disuse from the MAC address search table 22, and storing a newly registered MAC address in a free entry. In this method of searching for a free entry and storing a newly registered MAC address, the MAC addresses are registered while being arranged unevenly.

4. Fourth Embodiment

The fourth embodiment of the present invention will be described next.

[4.1. Arrangement of OLT According to Fourth Embodiment]

An OLT according to the fourth embodiment is a station-side apparatus (OLT) in an optical transmission system that transfers a frame between a host apparatus and a plurality of subscriber-side apparatuses (ONUs) connected via an optical transmission channel (PON), including an input/output port of an upstream frame to the host apparatus and a downstream frame from the host apparatus, an input port of the upstream frame from the subscriber-side apparatus, output ports of a plurality of systems of the downstream frame to the subscriber-side apparatus, and a frame transfer processing unit that, using the MAC address of a destination written in the downstream frame from the host apparatus as a key, reads out the identifier information (LLID) of the subscriber-side apparatus corresponding to the MAC address and transfer instruction information indicating the system of the output destination of the downstream frame to the subscriber-side apparatus from a MAC address search table and writes them in the downstream frame from the host apparatus, writes, in accordance with the transfer instruction information written in the downstream frame, the downstream frame in the buffer of the system indicated by the transfer instruction information, reads out the downstream frame written in the buffer, and outputs the downstream frame from the output port of the system to which the buffer belongs.

[4.1.1. Arrangement of PON System]

Figure 24:
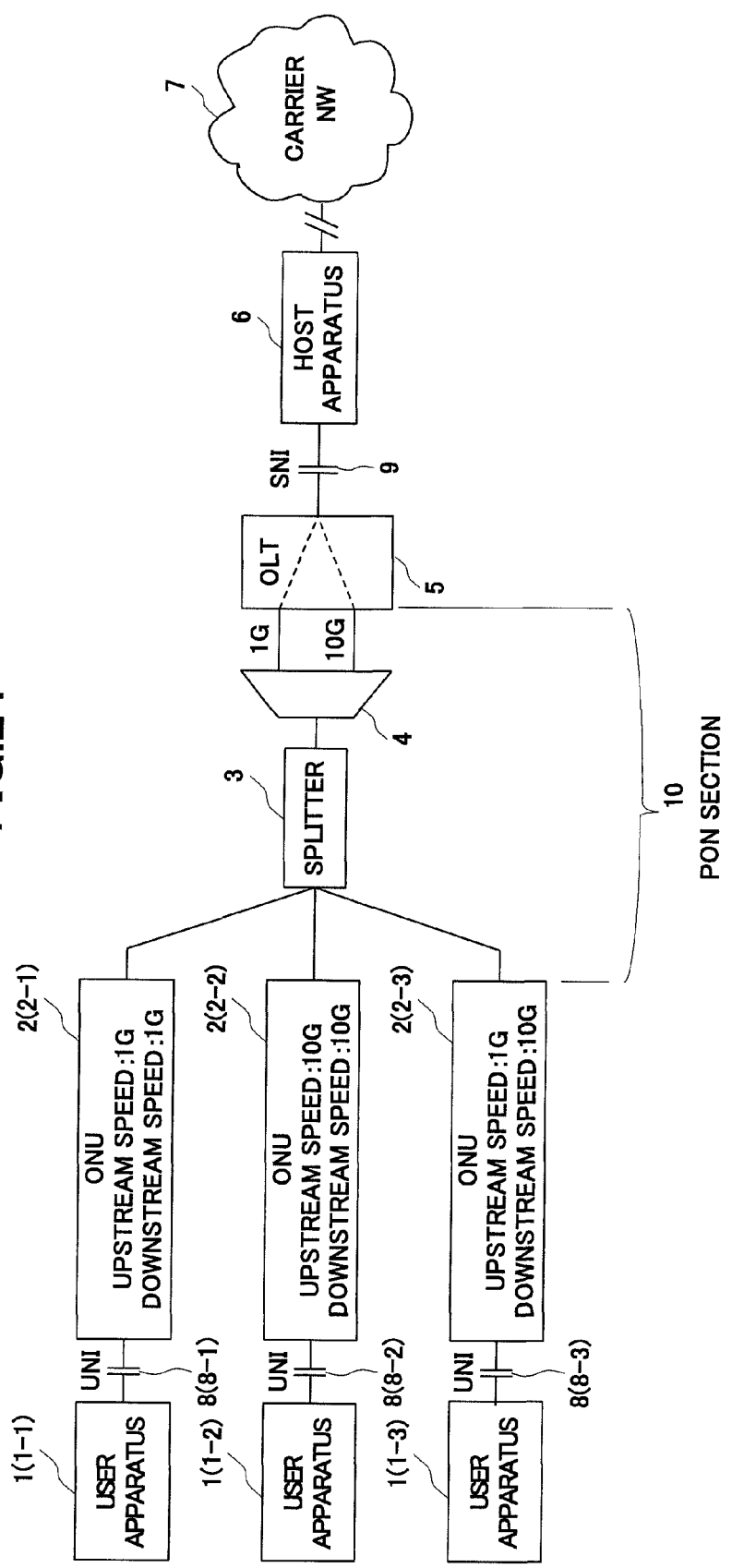
FIG. 24 is a block diagram showing the arrangement of a PON system using a station-side apparatus (OLT) according to the fourth embodiment.

FIG. 24 is a block diagram showing the arrangement of a PON system using a station-side apparatus according to this embodiment.

Referring to FIG. 24, reference numeral 1 (1-1 to 1-3) denotes a user apparatus; 2 (2-1 to 2-3), an ONU; 3, an optical splitter; 4, a demultiplexing/multiplexing device; 5, an OLT; 6, a host apparatus; 7, a carrier network; 8 (8-1 to 8-3), an interface (UNI: User Network Interface) between the user apparatus 1 and the ONU 2; and 9, an interface (SNI: Service Node Interface) between the OLT 5 and the host apparatus 6.

In this PON system, the ONUs 2-1 to 2-3 are commonly connected to the optical splitter 3 via an optical transmission channel. The optical splitter 3 is connected to the OLT 5 via the optical transmission channel and the demultiplexing/multiplexing device 4. The upstream speed and downstream speed of the ONU 2-1 are 1 Gbps. The upstream speed and downstream speed of the ONU 2-2 are 10 Gbps. The upstream speed of the ONU 2-3 is 1 Gbps, and the downstream speed of the ONU 2-3 is 10 Gbps.

Data are exchanged using a frame having the arrangement as shown in FIG. 2 in the PON section of the PON system, that is, a section 10 between the ONUs 2-1 to 2-3 and the OLT 5.

Referring to FIG. 2, the preamble is formed by embedding an LLID in the preamble of Ethernet.

The LLID (Logical Link ID) is an identifier (identifier defined by the IEEE standardization) provided in a one-to-one correspondence with each ONU. The LLID is decided by the OLT when registering an ONU (placing an ONU under the OLT). The OLT manages the LLIDs without repetition among the ONUs under it.

A VLAN tag is a tag including VLAN information. The tag may be absent, or a plurality of tags may be added. The VLAN tag includes TPID and TCI.

TPID (Tag Protocol ID) is an Ether Type value representing that a VLAN tag follows. The value is normally 0x8100.

TCI (Tag Control Information) is VLAN tag information. The TCI includes PCP, CFI, and VID.

PCP (Priority Code Point) is the priority of the frame.

CFI (Canonical Format Indicator) is a value representing whether the MAC address in the MAC header complies with the standard format.

VID or VLAN ID (VLAN Identifier) is a value that designates a VLAN to which the frame belongs.

Type is an Ether Type value representing the type of the host protocol. In some cases, notation "Type/Length" or the like is used because the area is also used for a Length value.

[4.1.2. Arrangement of OLT According to Fourth Embodiment]

Figure 25:
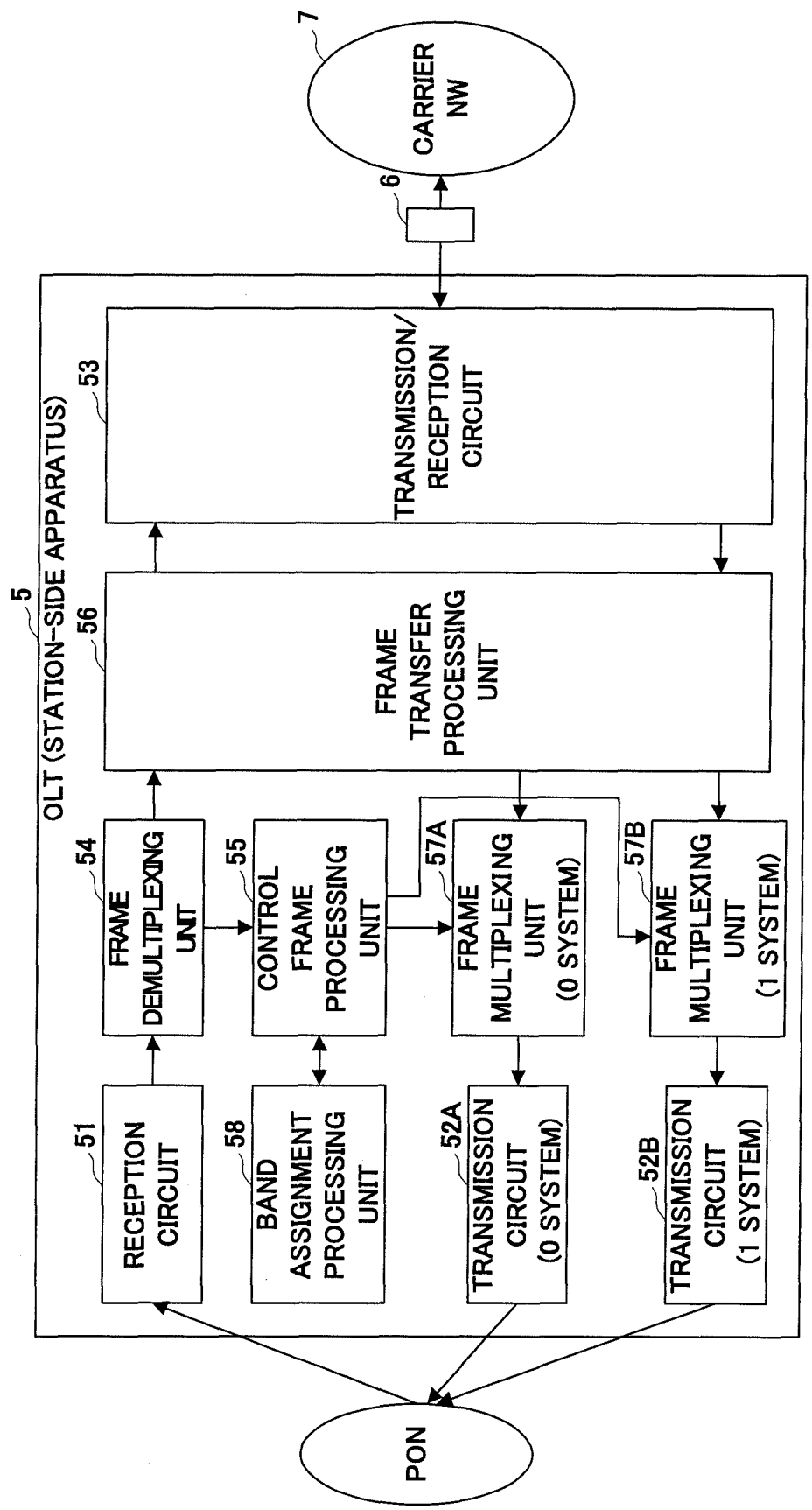
FIG. 25 is a block diagram showing an example of the arrangement of the OLT according to the fourth embodiment.

FIG. 25 is a block diagram showing an example of the arrangement of the OLT according to the fourth embodiment.

In terms of arrangement, the OLT 5 according to this embodiment is different from the conventional OLT in that a frame multiplexing unit and a transmission circuit are provided for each of two transmission systems of different transmission speeds, and the OLT includes a frame transfer processing unit having an arrangement corresponding to the frame multiplexing unit and the transmission circuit provided for each of the different transmission systems. Note that in this embodiment, the 0 system represents a transmission system having a transmission speed of 1 Gbps, and the 1 system represents a transmission system having a transmission speed of 10 Gbps.

The processing units of the OLT 5 according to this embodiment will be described with reference to FIG. 25.

A reception circuit 51 is a circuit that receives upstream frames from the ONUs (0 system and 1 system) 2 via the PON.

A transmission circuit (0 system) 52A and a transmission circuit (1 system) 52B are circuits that transmit frames to the ONUs (0 system) 2 and the ONUs (1 system) 2 via the PON.

A transmission/reception circuit 53 is a circuit component that transmits/receives a frame to/from the carrier network 7 via the host apparatus 6.

A frame demultiplexing unit 54 is a processing unit that transmits, out of the frames input from the reception circuit 51, a frame (control frame used to control the PON) for the OLT 5 to a control frame processing unit 55 and transmits the remaining frames to a frame transfer processing unit 56.

A frame multiplexing unit (0 system) 57A is a processing unit that time-divisionally multiplexes downstream frames for the ONUs (0 system) 2 from the frame transfer processing unit 56 and a control frame from the control frame processing unit 55 and transmits them to the transmission circuit (0 system) 52A.

A frame multiplexing unit (1 system) 57B is a processing unit that time-divisionally multiplexes downstream frames for the ONUs (1 system) 2 from the frame transfer processing unit 56 and a control frame from the control frame processing unit 55 and transmits them to the transmission circuit (1 system) 52B.

The frame transfer processing unit 56 is a processing unit that transfers an upstream frame received from the frame demultiplexing unit 54 and transfers a downstream frame received from the transmission/reception circuit 53 to the frame multiplexing unit (0 system) 57A or the frame multiplexing unit (1 system) 57B based on its destination MAC address and the like.

The control frame processing unit 55 is a processing unit that performs processes concerning PON control such as a discovery process for automatically assigning an LLID to each ONU 2 and arbitration of an upstream signal (signal from an ONU to the OLT) and processing of transferring PON-IF port information such as the LLID of each ONU 2 or an upstream/downstream transmission rate with respect to each ONU 2 to a band assignment processing unit 58.

The band assignment processing unit 58 is a processing unit that performs assignment of a band (transmission start time and transmission data amount) to each ONU 2 or management of PON-IF port information transferred from the control frame processing unit 55 in response to a request from the control frame processing unit 55.

[4.1.3. Operation of OLT According to Fourth Embodiment]

Frame transfer processing of the OLT 5 according to this embodiment will be described next with reference to FIGS. 26 to 29 while mentioning the functions of the frame transfer processing unit 56 as well.

Figure 26:
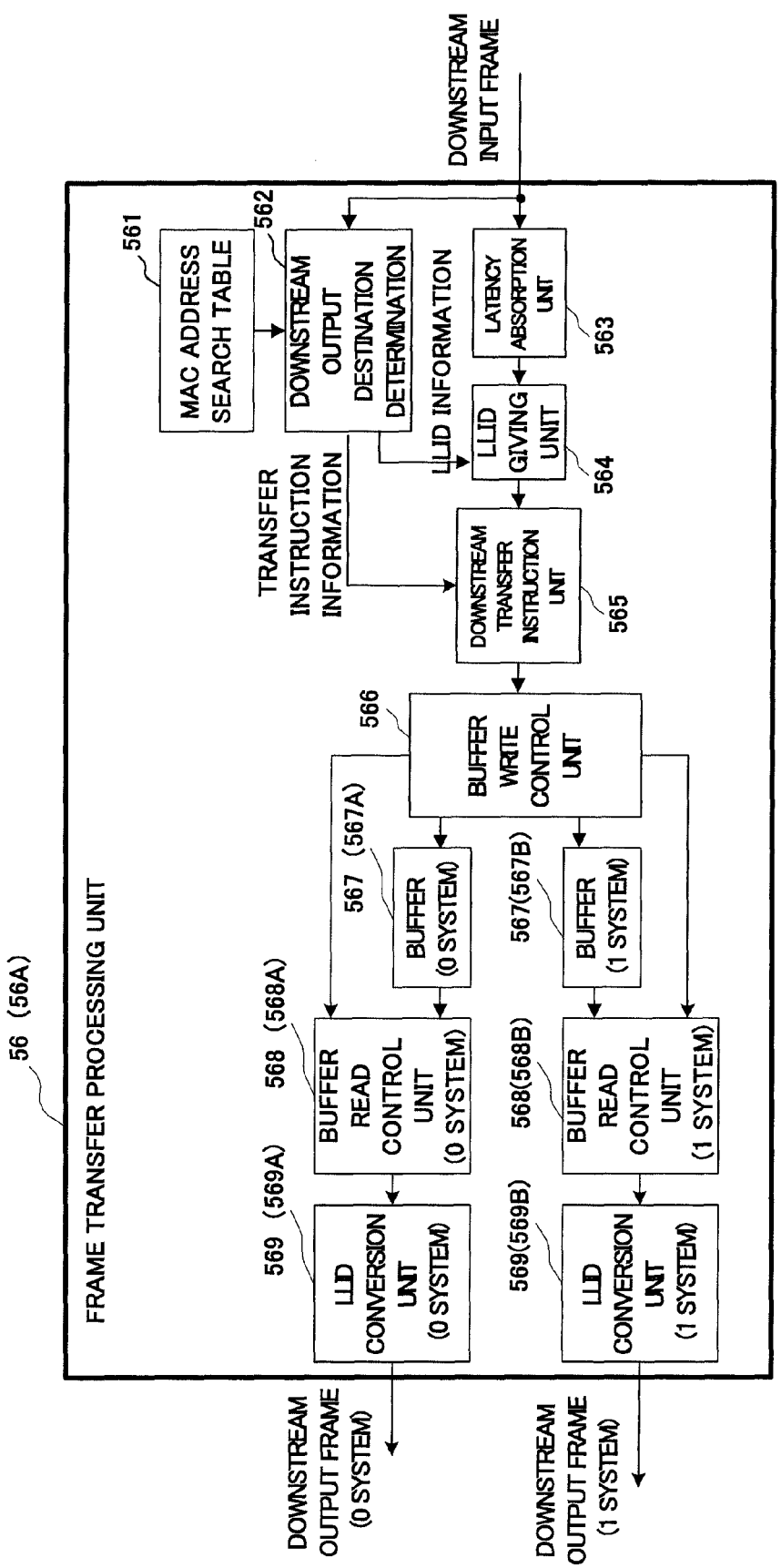
FIG. 26 is a block diagram showing an example of the arrangement of a frame transfer processing unit in the OLT according to the fourth embodiment.

FIG. 26 is a block diagram showing an example of the arrangement of the frame transfer processing unit 56 (56A). The frame transfer processing unit 56A includes a MAC address search table 561, a downstream output destination determination unit 562, a latency absorption unit 563, an LLID giving unit 564, a downstream transfer instruction unit 565, a buffer write control unit 566, a buffer (0 system) 567A, a buffer (1 system) 567B, a buffer read control unit (0 system) 568A, a buffer read control unit (1 system) 568B, an LLID conversion unit (0 system) 569A, and an LLID conversion unit (1 system) 569B. In the arrangement of the frame transfer processing unit 56A, the downstream output destination determination unit 562 corresponds to a destination ID search unit of the present invention, and the LLID giving unit 564 and the downstream transfer instruction unit 565 correspond to an information write unit of the present invention.

Figures 27, 28:
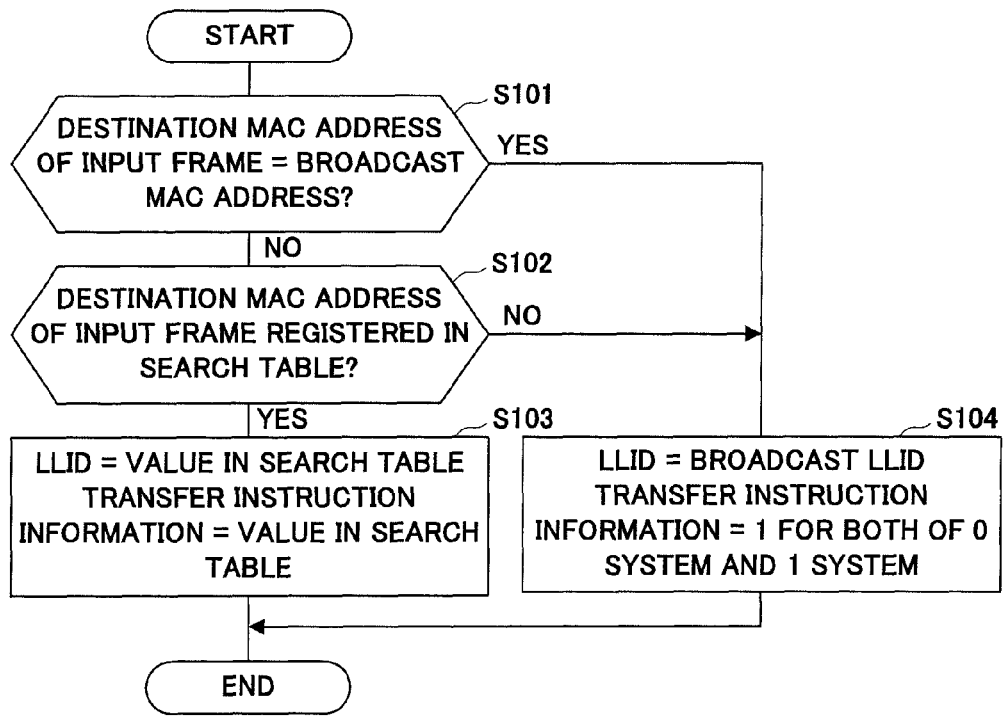
FIG. 27 is a view showing an example of the arrangement of a MAC address search table.
FIG. 28 is a flowchart showing a procedure of deciding the destination LLID and output destination of a downstream frame.

FIG. 27 shows an example of the arrangement of the MAC address search table 561. Transfer instruction information indicating the system of the output destination of a downstream frame, an LLID, and information representing the enable/disable of registered data are set in the MAC address search table 561 as registered information in correspondence with each of the MAC addresses of the ONUs 2 or user apparatuses connected to the ONUs 2. The transfer instruction information is data including bits (in this example, 2 bits) as many as the number of systems of the output destinations of downstream frames. Transfer instruction information "10" indicates that the 0 system is set as the output destination, "01" indicates that the 1 system is set as the output destination, and "11" indicates that both the 0 system and the 1 system are set as the output destinations.

Registered information in the MAC address search table 561 is set by software. More specifically, software that controls and manages the OLT 5 manages the downstream frame transmission destination MAC address and transfer instruction information for each LLID, and sets necessary information in the MAC address search table 561. For example, in a system in which a 10G-ONU and a 1G-ONU coexist, a transfer instruction to a 10G (802.3av specifications) output port is set for a frame to the 10G-ONU, and a transfer instruction to a 1G (802.3ah specifications) output port is set for a frame to the 1G-ONU.

The downstream output destination determination unit 562 reads out an LLID and transfer instruction information from the MAC address search table 561 based on the destination MAC address of a received downstream frame, and decides the destination LLID and the output destination of the downstream frame. That is, the downstream output destination determination unit 562 decides which one of the transmission circuits 52A and 52B should transmit the received downstream frame, that is, which one of the systems of different speeds should output the downstream frame from its output port. The destination LLID and output destination of the downstream frame are decided in the following way.

The downstream output destination determination unit 562 first checks the destination MAC address of the received downstream frame (FIG. 28: step S101). If the destination MAC address is not a broadcast MAC address (NO in step S101), the downstream output destination determination unit 562 checks whether the destination MAC address is registered in the MAC address search table 561 (step S102). If the destination MAC address is registered in the MAC address search table 561 (YES in step S102), the downstream output destination determination unit 562 reads out an LLID and transfer instruction information corresponding to the destination MAC address from the MAC address search table 561 (step S103).

On the other hand, if the destination MAC address is a broadcast MAC address (YES in step S101), the LLID is set to a broadcast LLID (for example, FFFD in hexadecimal notation), and the transfer instruction information is set to "11" (step S104). Even if the destination MAC address is not a broadcast MAC address (NO in step S101), when the MAC address is not registered in the MAC address search table 561 (NO in step S102), the LLID is set to a broadcast LLID, and the transfer instruction information is set to "11" (step S104), as in the case of the broadcast MAC address. In this example, when the destination MAC address is a broadcast MAC address, the downstream output destination determination unit 562 causes another circuit in it to decide the destination LLID and transfer instruction information without using the MAC address search table 561.

Note that if the destination MAC address is not registered in the MAC address search table 561 in step S102, the transfer instruction information may be set to "00" not to output the downstream frame to any port.

In addition, processing to be performed upon receiving a frame having a broadcast MAC address as the transmission destination MAC address may be performed using the MAC address search table 561. In this case, a broadcast MAC address, a broadcast LLID (for example, FFFD in hexadecimal notation), and "11" as transfer instruction information are registered in the MAC address search table 561.

On the other hand, the latency absorption unit 563 adds a delay to the received downstream frame, and absorbs the latency by the downstream output destination decision processing of the downstream output destination determination unit 562. In accordance with the LLID decided by the downstream output destination determination unit 562, the LLID giving unit 564 gives the destination LLID to the downstream frame from the latency absorption unit 563.

Figure 29:
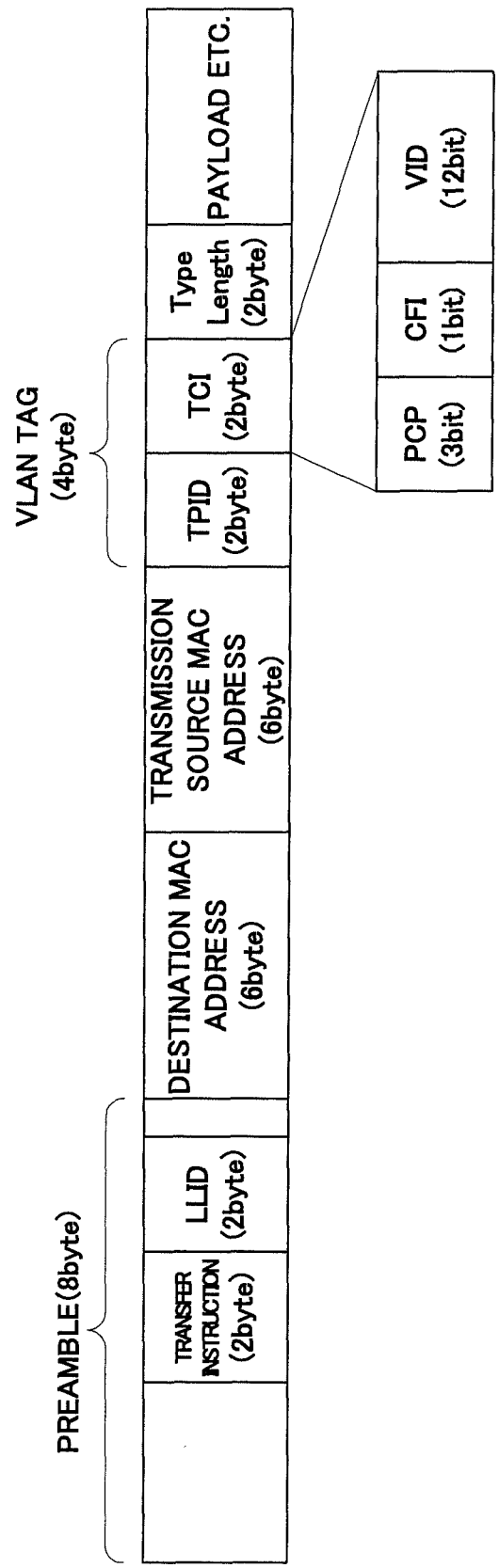
FIG. 29 is a view showing an example of the format of a frame output from a downstream transfer instruction unit.

The downstream transfer instruction unit 565 gives, in accordance with the transfer instruction information decided by the downstream output destination determination unit 562, the transfer instruction information to the downstream frame from the LLID giving unit 564, and transfers the downstream frame with the given transfer instruction information to the buffer write control unit 566. FIG. 29 shows an example of the format of the frame output from the downstream transfer instruction unit 565. In this frame, the LLID information and transfer instruction information are written in the preamble.

In accordance with the transfer instruction information written in the downstream frame, the buffer write control unit 566 writes the downstream frame in the buffer 567 (567A or 567B) of the system indicated by the transfer instruction information. For example, if the transfer instruction information is "10", the downstream frame is written in the buffer (0 system) 567A. If the transfer instruction information is "01", the downstream frame is written in the buffer (1 system) 567B. If the transfer instruction information is "11", the downstream frame is written in both the buffer (0 system) 567A and the buffer (1 system) 567B.

The buffer read control unit 568 (568A or 568B) reads out the downstream frame from the buffer 567 (567A or 567B) based on an instruction from the buffer write control unit 566, and transfers it to the LLID conversion unit 569 (569A or 569B). That is, the buffer read control unit (0 system) 568A reads out the downstream frame from the buffer (0 system) 567A and transfers it to the LLID conversion unit (0 system) 569A. The buffer read control unit (1 system) 568B reads out the downstream frame from the buffer (1 system) 567B and transfers it to the LLID conversion unit (1 system) 569B.

The LLID conversion unit 569 (569A or 569B) rewrites the LLID when the LLID of the input frame is a broadcast LLID (for example, FFFD in hexadecimal notation). For example, the LLID is rewritten to FFFF in hexadecimal notation for the 1G output port (0 system), or FFFE in hexadecimal notation for the 10G output port (1 system). In addition, the area of transfer instruction information is rewritten to idle data of the IEEE standardization or the like as needed.

[4.2. Effects of Fourth Embodiment]

Figure 44:
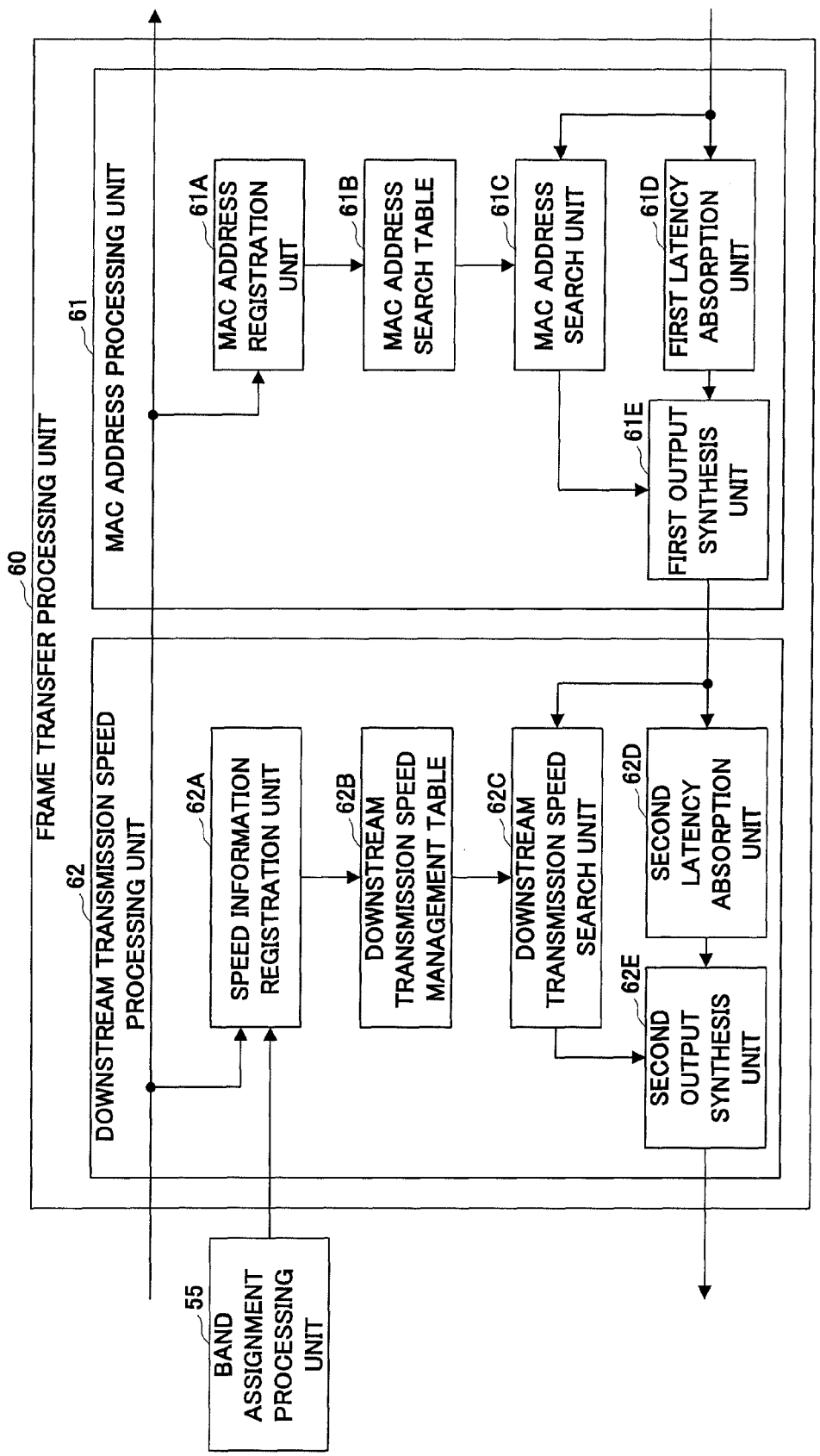
FIG. 44 is a block diagram showing the arrangement of the main part of frame transfer processing assuming a case in which a function to support 10G-EPON is added to the frame transfer processing unit of the OLT for the conventional GE-PON.

In the arrangement according to this embodiment, since downstream frame transmission processing can be performed only by access (search) of the MAC address search table 561, the circuit scale on the downstream side becomes small. That is, the arrangement shown in FIG. 44 described as a possible related art needs the circuit to access the table that manages the downstream transmission speed for each LLID in addition to the circuit to access the MAC address search table to judge the transmission rate after deciding the destination LLID of a downstream frame. However, such a circuit is unnecessary, and the circuit scale on the downstream side become small.

In the arrangement according to this embodiment, when the destination MAC address of a downstream frame is a broadcast MAC address, information that indicates all systems as the output destinations of the downstream frame is set as the transfer instruction information (in this example, "11"). This makes it possible to write the downstream frame in the buffers 567 of all systems, that is, duplicate the downstream frame in the buffers 567 of all systems and output the duplicated downstream frames from the output ports of all systems.

In the arrangement according to this embodiment, when processing to be performed upon receiving a frame having a broadcast MAC address as the transmission destination MAC address is decided by another circuit in the downstream output destination determination unit 562 without using the MAC address search table 561, a circuit for this is necessary. However, since the scale of the circuit (H/W) is small, the effectiveness of the present invention is not denied.

Note that when the transfer instruction for the plurality of systems is set to "1 (transfer instruction exists)" in the MAC address search table 561, and a downstream frame with the destination MAC address is input, the frame can be duplicated and output from the output ports of the plurality of systems.

It is also possible to add a circuit that sets the transfer instruction for the plurality of systems to "1 (transfer instruction exists)" when a downstream frame having a specific IP address (or VLAN tag) is input.

5. Fifth Embodiment

5.1. Arrangement of OLT According to Fifth Embodiment

Figure 30:
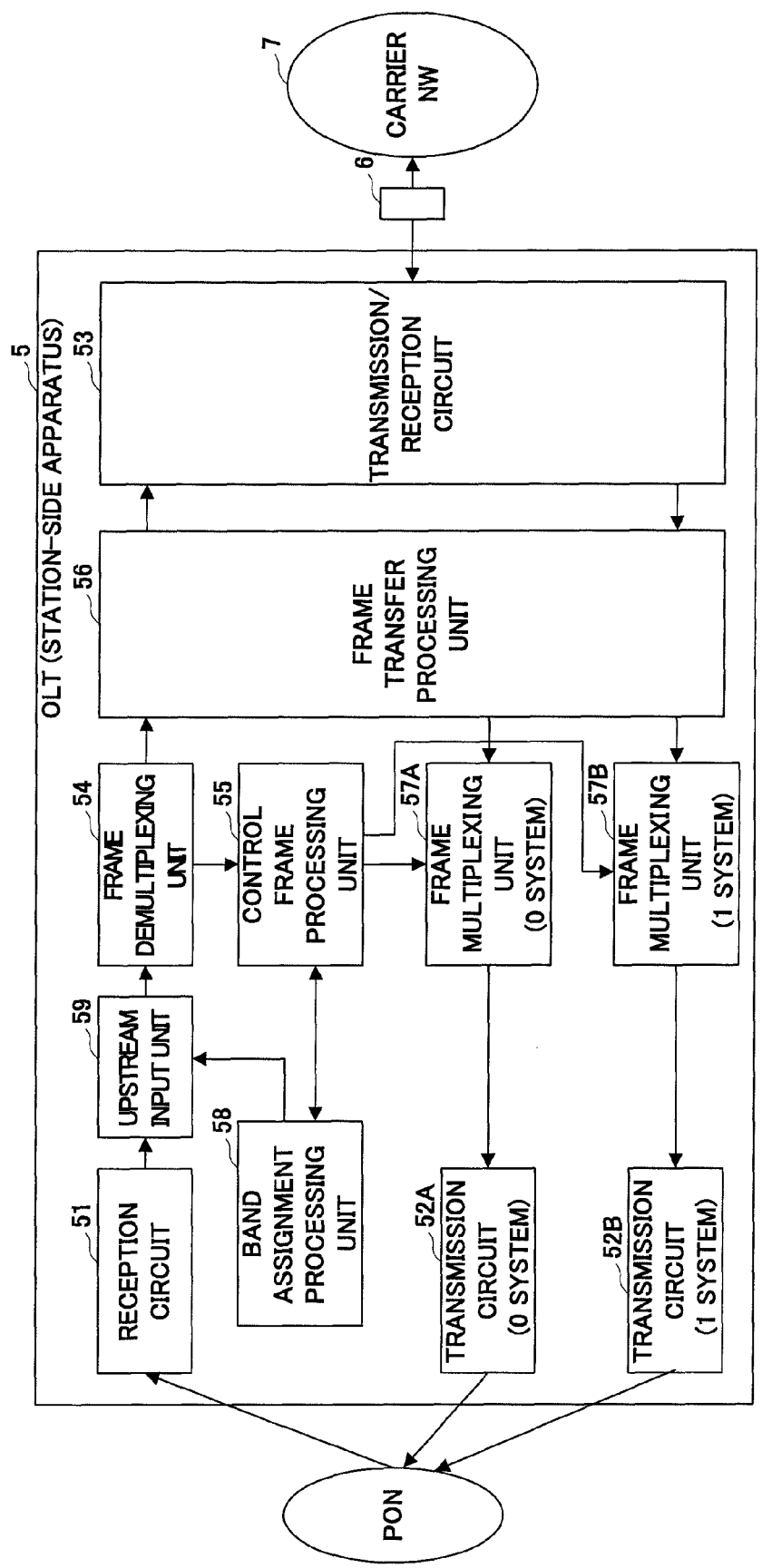
FIG. 30 is a block diagram showing an example of the arrangement of an OLT according to the fifth embodiment.
Figure 31:
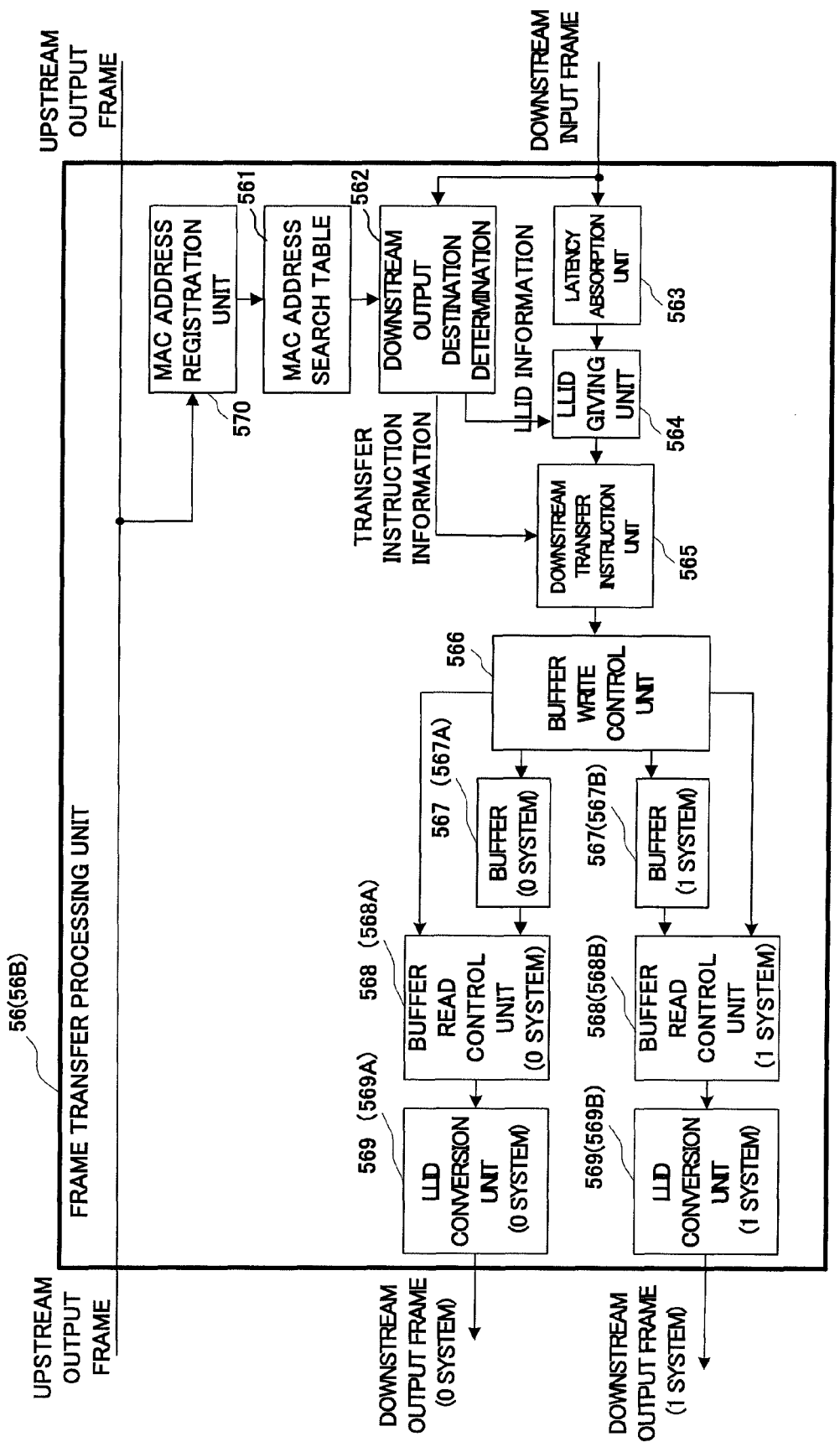
FIG. 31 is a block diagram showing an example of the arrangement of a frame transfer processing unit in the OLT according to the fifth embodiment.

An OLT 5 according to the fifth embodiment of the present invention will be described next with reference to FIG. 30. FIG. 30 is a block diagram showing the arrangement of the OLT according to the fifth embodiment. As compared to the fourth embodiment (FIG. 25), an upstream input unit 59 is added to the OLT 5 according to the fifth embodiment. Additionally, as shown in FIG. 31, a MAC address registration unit 570 is added to a frame transfer processing unit 56 (56B).

In the fifth embodiment, a band assignment processing unit 58 has a function of reading out downstream output speed information corresponding to the LLID of a scheduled upstream frame from PON-IF port information registered in the band assignment processing unit 58 in advance and instructing the downstream output speed information to the upstream input unit 59 in synchronism with the timing of the upstream frame assigned by the band assignment processing unit 59, in addition to the function described in the fourth embodiment.

For example, when the LLID of a scheduled input frame is 1G-ONU, "1G" is instructed as the downstream output speed information. When the LLID of a scheduled input frame is 10G-ONU, "10G" is instructed as the downstream output speed information. Note that when the LLID of a scheduled input frame is asymmetric ONU (the upstream speed is 1G, and the downstream speed is 10G), "10G" is instructed.

The upstream input unit 59 inserts downstream output speed information into the preamble portion of an upstream frame in accordance with an instruction from the band assignment processing unit 58. For example, when the instruction from the band assignment processing unit 58 is "1G", the upstream input unit 59 inserts "0" into the downstream output speed information of the preamble portion of the upstream frame. When the instruction from the band assignment processing unit 58 is "10G", the upstream input unit 59 inserts "1" into the downstream output speed information of the preamble portion of the upstream frame. FIG. 14 shows an example of the arrangement of the frame output from the upstream input unit 59. Unlike the frame transmitted in the PON section 10 (see FIG. 2), downstream output speed information is inserted into the preamble portion.

5.2. Operation of OLT According to Fifth Embodiment

Automatic Setting of Registered Information

Figure 32:
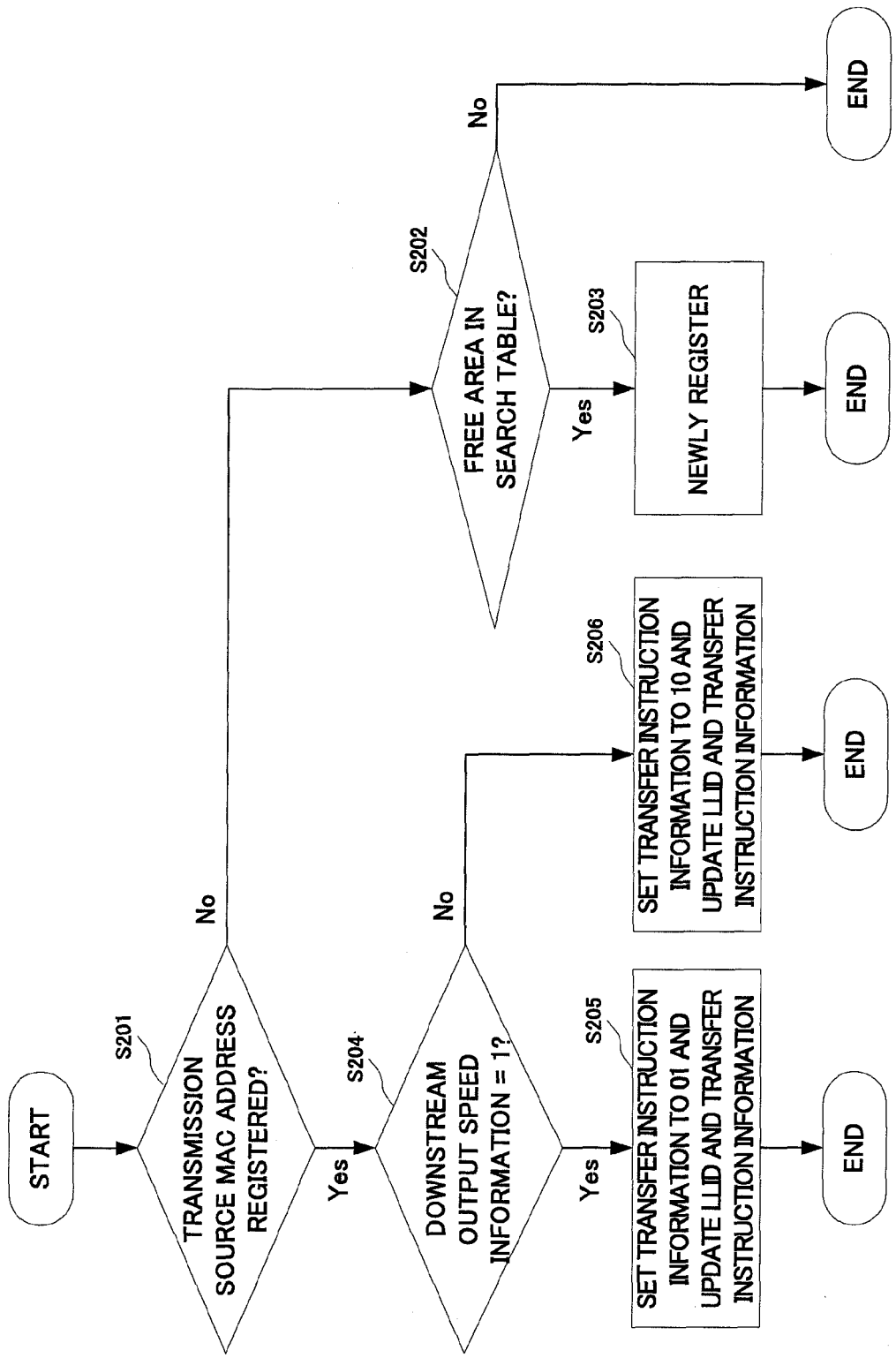
FIG. 32 is a flowchart showing a procedure of automatically setting registered information in a MAC address search table.

In this embodiment, as shown in FIG. 31, the MAC address registration unit 570 is added to the frame transfer processing unit 56B. The MAC address registration unit 570 automatically sets registered information in a MAC address search table 561 at the time of reception of an upstream frame. Automatic setting of registered information in the MAC address search table 561 will be described below with reference to the flowchart shown in FIG. 32.

At the time of reception of an upstream frame, the MAC address registration unit 570 checks whether the transmission source MAC address of the upstream frame is registered in the MAC address search table 561 (step S201). If the transmission source MAC address is not registered in the MAC address search table 561 (NO in step S201), the MAC address registration unit 570 checks whether the MAC address search table 561 has a free area (step S202). If no free area exists (NO in step S202), the processing directly ends. If a free area exists (YES in step S202), the MAC address registration unit 570 sets (newly registers) registered information in the MAC address search table 561 (step S203).

In this new registration of registered information, the MAC address registration unit 570 reads out downstream output speed information written in the upstream frame. If the downstream output speed information is "0", the transfer instruction information is set to "10" (0 system), and transfer to the 1G port is set. On the other hand, if the downstream output speed information is "1", the transfer instruction information is set to "01" (1 system), and transfer to the 10G port is set. The thus set transfer instruction information is written in the MAC address search table 561 as registered information in association with the transmission source MAC address and LLID in the upstream frame. Note that in this case, the enable/disable information of the registered data is set to "enable".

On the other hand, if the transmission source MAC address of the upstream frame is registered in the MAC address search table 561 (YES in step S201), the MAC address registration unit 570 checks whether the downstream output speed information of the upstream frame is "1" (step S204). If the downstream output speed information is "1" (YES in step S204), the transfer instruction information is set to "01" (1 system), transfer to the 10G port is set, and the LLID and transfer instruction information of the matching MAC address in the MAC address search table 561 are updated (step S205). If the downstream output speed information is not "1" (NO in step S204), the transfer instruction information is set to "10" (0 system), transfer to the 1G port is set, and the LLID and transfer instruction information of the matching MAC address in the MAC address search table 561 are updated (step S206).

Note that in this example, when the transmission source MAC address of the upstream frame is registered in the MAC address search table 561, corresponding registered information in the MAC address search table 561 is updated. However, updating of the registered information may be prohibited.

In this example, when the instruction from the band assignment processing unit 58 is "1G", "0" is written in the upstream frame as downstream output speed information. When the instruction from the band assignment processing unit 58 is "10G", "1" is written in the upstream frame as output speed information. However, "10" may be written as the downstream output speed information in place of "0", and "01" may be written as the downstream output speed information in place of "1". This obviates the necessity of converting downstream output speed information into transfer instruction information.

In the above-described way, according to the fifth embodiment, the MAC address registration unit 570 automatically registers the MAC address, LLID, and transfer instruction information in the MAC address search table 561, including those of an asymmetric ONU (the upstream speed is 1G, and the downstream speed is 10G).

5.3. Modification of Fifth Embodiment

Note that in the arrangement of the fifth embodiment, the upstream input unit 59 that registers "speed information" in upstream processing needs to be added, as compared to the arrangement of the fourth embodiment. However, the "speed information" can be inserted into the preamble portion of the upstream frame using a simple circuit by obtaining the "speed information" (corresponding to the transmission speed of a control frame called a Gate frame) from the band assignment processing unit 58 that performs upstream band assignment.

In the arrangement according to the fifth embodiment as well, when the destination MAC address of a downstream frame is a broadcast MAC address, the input frame can be duplicated and output from the output ports of all systems.

Note that when the transfer instruction for the plurality of systems is set to "1 (transfer instruction exists)" in the MAC address search table 561, and a downstream frame with the destination MAC address is input, the frame can be duplicated and output from the output ports of the plurality of systems.

It is also possible to add a circuit that sets the transfer instruction for the plurality of systems to "1 (transfer instruction exists)" when a downstream frame having a specific IP address (or VLAN tag) is input.

6. Sixth Embodiment

An OLT according to the sixth embodiment of the present invention will be described next with reference to FIG. 33.

[6.1. Arrangement of OLT According to Sixth Embodiment]

Figure 33:
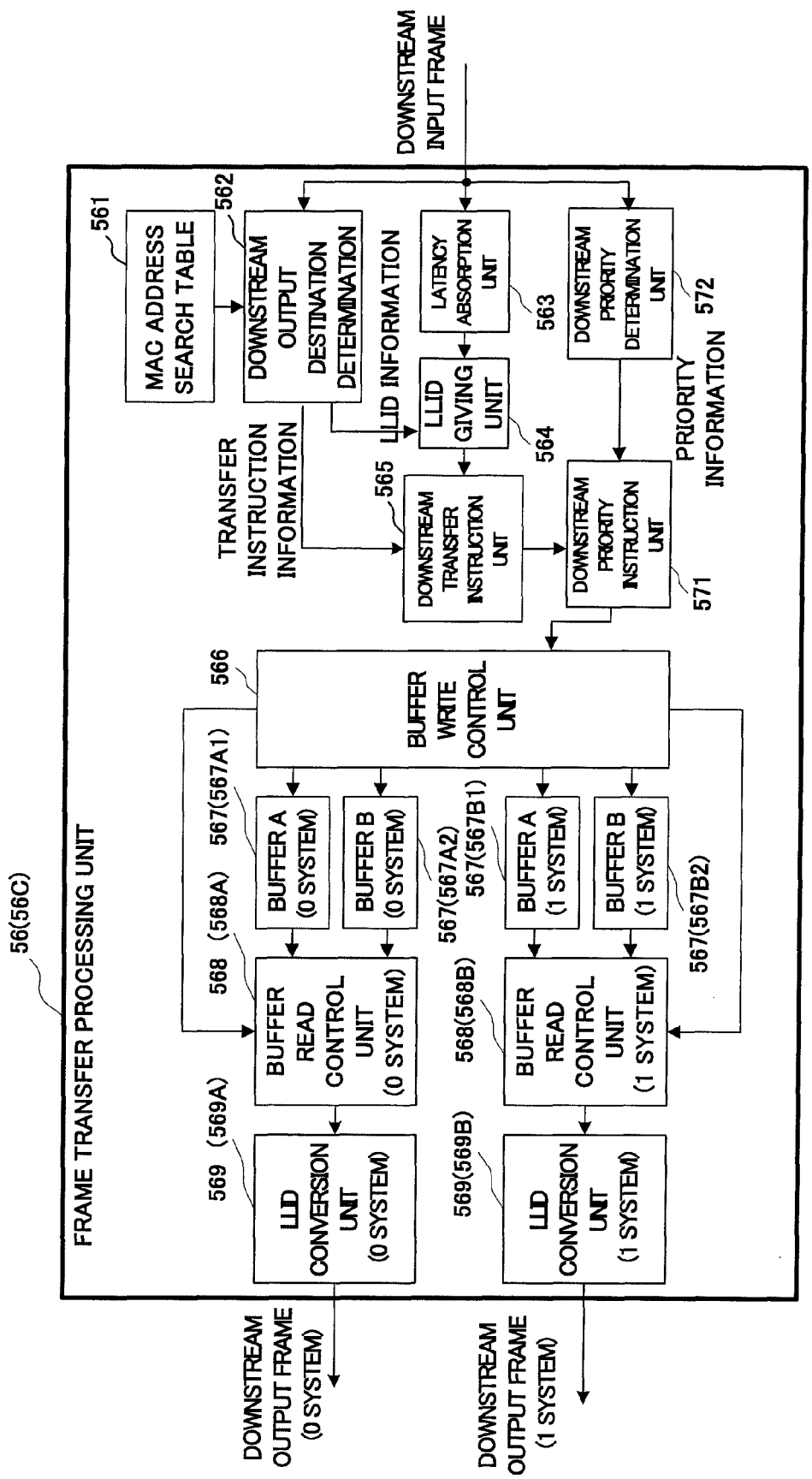
FIG. 33 is a block diagram showing an example of the arrangement of a frame transfer processing unit in an OLT according to the sixth embodiment.

FIG. 33 is a block diagram showing the arrangement of a frame transfer processing unit 56 (56C) in an OLT 5 according to the sixth embodiment. The frame transfer processing unit 56C has an arrangement obtained by adding a priority control function to the frame transfer processing unit 56A shown in FIG. 26.

The frame transfer processing unit 56C is different from the frame transfer processing unit 56A in that a plurality of buffers (buffer A and buffer B) 567 are included for each of the 0 system and the 1 system, a downstream priority instruction unit 571 is inserted between a downstream transfer instruction unit 565 and a buffer write control unit 566, and a downstream priority determination unit 572 is added to the preceding stage of the downstream priority instruction unit 571.

In this example, a buffer A (0 system) 567A1 and a buffer B (0 system) 567A2 are provided as the buffers of the 0 system, and a buffer A (1 system) 567B1 and a buffer B (1 system) 567B2 are provided as the buffers of the 1 system. The buffer A (0 system) 567A1 and the buffer A (1 system) 567B1 are set as the buffers on the high priority side.

In the frame transfer processing unit 56C, the downstream priority determination unit 572 decides the priority of an input downstream frame by referring to the PCP bits or VID in the VLAN tag or information representing priority in the IP header of the input downstream frame. If each of the 0 system and the 1 system includes two buffers (buffer A and buffer B), and, for example, the PCP bits in the VLAN tag are 0x1 to 0x7, the priority is decided to be high. If the PCP bits are 0x0, the priority is decided to be low.

Figure 34:
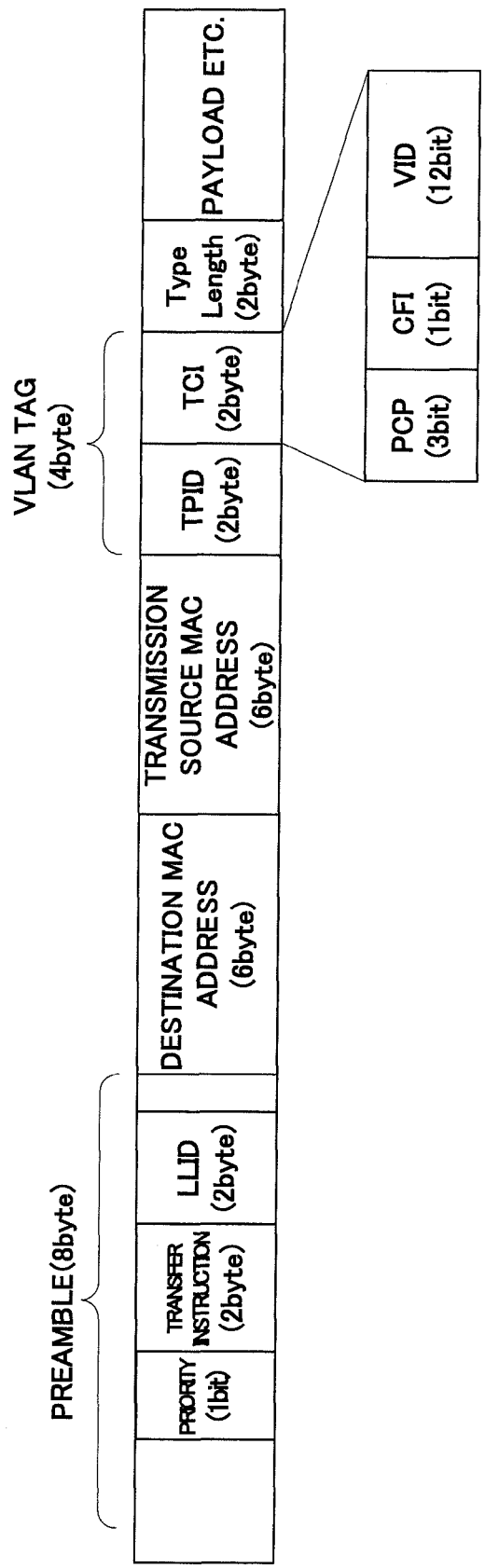
FIG. 34 is a view showing an example of the format of a frame output from a downstream priority instruction unit.

In accordance with the priority determined by the downstream priority determination unit 572, the downstream priority instruction unit 571 gives priority information to the downstream frame from the downstream transfer instruction unit 565, and transfers the frame to the buffer write control unit 566. FIG. 34 shows an example of the format of the frame output from the downstream priority instruction unit 571. The priority information is given to the preamble portion. For example, for high priority, "1" is given as priority information. For low priority, "0" is given as priority information.

In accordance with transfer instruction information and priority information written in the downstream frame from the downstream priority instruction unit 571, the buffer write control unit 566 writes the downstream frame in the buffer 567 of the system indicated by the transfer instruction information and priority information.

For example, when the transfer instruction information is "10" (0 system), and the priority information is "1", the downstream frame is written in the buffer A (0 system) 567A1 on the high priority side. When the transfer instruction information is "01" (1 system), and the priority information is "1" (high priority), the downstream frame is written in the buffer A (1 system) 567B1 on the high priority side. When the transfer instruction information is "11" (0 system/1 system), and the priority information is "1" (high priority), the downstream frame is written in both the buffer A (0 system) 567A1 and the buffer A (1 system) 567B1 on the high priority side.

A buffer read control unit 568 (568A or 568B) reads out the frame from the buffer 567 (567A1, 567A2, 567B1, or 567B2) based on an instruction from the buffer write control unit 566, and transfers it to an LLID conversion unit 569 (569A or 569B). In this case, if readout from the buffer 567A1 on the high priority side is possible, the buffer read control unit 568A gives higher priority to readout from the buffer 567A1 on the high priority side. If readout from the buffer 567B1 on the high priority side is possible, the buffer read control unit 568B gives higher priority to readout from the buffer 567B1 on the high priority side. The downstream frame of higher priority is thus read out and output first.

The LLID conversion unit 569A or 569B rewrites the LLID when the LLID of the input frame is a broadcast LLID (for example, FFFD in hexadecimal notation). For example, the LLID is rewritten to FFFF in hexadecimal notation for the 1G output port (0 system), or FFFE in hexadecimal notation for the 10G output port (1 system). In addition, the area of the priority and transfer instruction information is rewritten to idle data of the IEEE standardization or the like as needed.

[6.2. Modification of Sixth Embodiment]

Note that in the above-described fourth to sixth embodiments, output ports of two systems, that is, the 0 system and the 1 system are provided. When three or more systems are provided, the same arrangement as described above can be used by extending the number of bits of the transfer instruction information.

The transmission circuits 52 (52A and 52B) may comply with specifications other than the IEEE specifications. For example, some of the plurality of transmission circuits 52 may comply with the IEEE specifications, and the remaining transmission circuits may comply with the G-PON specifications of ITU-T.

Note that when the transmission circuits 52 (52A and 52B) comply with specifications other than the IEEE specifications, the specifications of the LLID conversion units 569A and 569B and the like are changed in accordance with the specifications.

In the sixth embodiment, two kinds of buffers including a high priority buffer and a low priority buffer are provided as the buffers 567 of each of the 0 system and the 1 system. However, when three or more buffers 567 are provided for each system, and the priority information is extended to a plurality of bits, the apparatus can cope with three or more kinds of priority.

7. Seventh Embodiment

An OLT according to the seventh embodiment of the present invention will be described next.

[7.1. Arrangement of OLT According to Seventh Embodiment]

Figure 35:
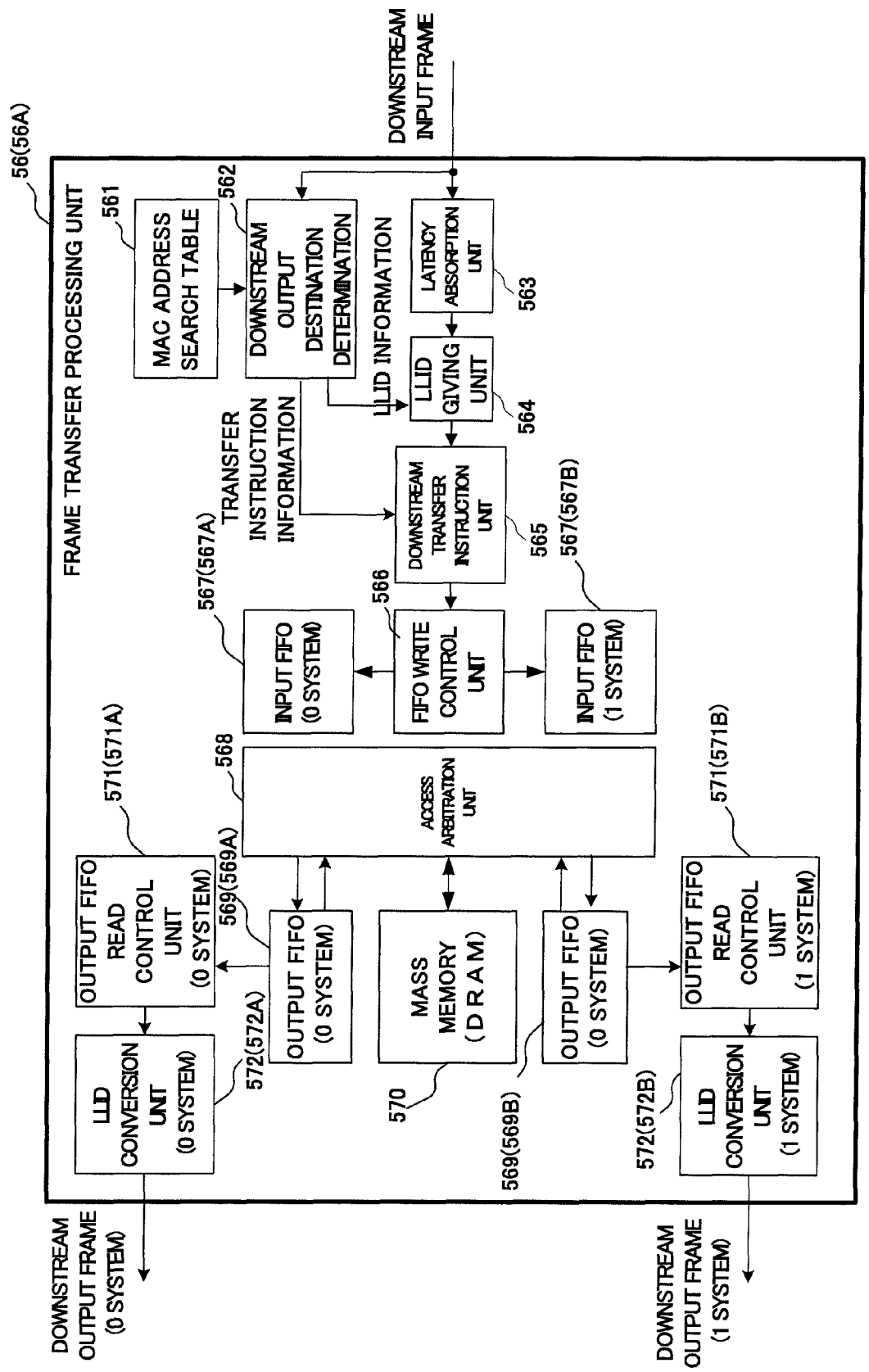
FIG. 35 is a block diagram showing an example of the arrangement of a frame transfer processing unit in an OLT according to the seventh embodiment.

In the OLT according to the seventh embodiment, a frame transfer processing unit 56 includes FIFOs, as shown in FIG. 35. The OLT according to this embodiment can be the same as the OLT according to the fourth embodiment except the arrangement of the frame transfer processing unit 56. Hence, for the arrangement of the OLT according to this embodiment other than the frame transfer processing unit 56 and the arrangement of a PON system using the OLT according to this embodiment, FIGS. 2, 24, 25, and 27 to 29 will be referred to as needed, and a detailed description thereof will be omitted.

FIG. 35 is a block diagram showing an example of the arrangement of the frame transfer processing unit 56 (56A). The frame transfer processing unit 56A includes a MAC address search table 561, a downstream output destination determination unit 562, a latency absorption unit 563, an LLID giving unit 564, a downstream transfer instruction unit 565, a FIFO write control unit 566, an input FIFO (0 system) 567A, an input FIFO (1 system) 567B, an access arbitration unit 568, an output FIFO (0 system) 569A, an output FIFO (1 system) 569B, a mass memory (DRAM) 570, an output FIFO read control unit (0 system) 571A, an output FIFO read control unit (1 system) 571B, an LLID conversion unit (0 system) 572A, and an LLID conversion unit (1 system) 572B. In the arrangement of the frame transfer processing unit 56A, the downstream output destination determination unit 562 corresponds to a destination ID search unit of the present invention, and the LLID giving unit 564 and the downstream transfer instruction unit 565 correspond to an information write unit of the present invention.

The example of the arrangement of the MAC address search table 561 and the like are the same as those described with reference to FIGS. 27 to 29 concerning the fourth embodiment.

[7.2. Operation of OLT According to Seventh Embodiment]

The downstream output destination determination unit 562 reads out an LLID and transfer instruction information from the MAC address search table 561 based on the destination MAC address of a received downstream frame, and decides the destination LLID and the output destination of the downstream frame. That is, the downstream output destination determination unit 562 decides which one of the transmission circuits 52A and 52B should transmit the received downstream frame, that is, which one of the systems of different speeds should output the downstream frame from its output port. The destination LLID and output destination of the downstream frame are decided in the following way.

The downstream output destination determination unit 562 first checks the destination MAC address of the received downstream frame (FIG. 28: step S101). If the destination MAC address is not a broadcast MAC address (NO in step S101), the downstream output destination determination unit 562 checks whether the destination MAC address is registered in the MAC address search table 561 (step S102). If the destination MAC address is registered in the MAC address search table 561 (YES in step S102), the downstream output destination determination unit 562 reads out an LLID and transfer instruction information corresponding to the destination MAC address from the MAC address search table 561 (step S103).

On the other hand, if the destination MAC address is a broadcast MAC address (YES in step S101), the LLID is set to a broadcast LLID (for example, FFFD in hexadecimal notation), and the transfer instruction information is set to "11" (step S104). Even if the destination MAC address is not a broadcast MAC address (NO in step S101), when the MAC address is not registered in the MAC address search table 561 (NO in step S102), the LLID is set to a broadcast LLID, and the transfer instruction information is set to "11" (step S104), as in the case of the broadcast MAC address. In this example, when the destination MAC address is a broadcast MAC address, the downstream output destination determination unit 562 causes another circuit in it to decide the destination LLID and transfer instruction information without using the MAC address search table 561.

Note that if the destination MAC address is not registered in the MAC address search table 561 in step S102, the transfer instruction information may be set to "00" not to output the downstream frame to any port.

In addition, processing to be performed upon receiving a frame having a broadcast MAC address as the transmission destination MAC address may be performed using the MAC address search table 561. In this case, a broadcast MAC address, a broadcast LLID (for example, FFFD in hexadecimal notation), and "11" as transfer instruction information are registered in the MAC address search table 561.

On the other hand, the latency absorption unit 563 adds a delay to the received downstream frame, and absorbs the latency by the downstream output destination decision processing of the downstream output destination determination unit 562. In accordance with the LLID decided by the downstream output destination determination unit 562, the LLID giving unit 564 gives the destination LLID to the downstream frame from the latency absorption unit 563.

The downstream transfer instruction unit 565 gives, in accordance with the transfer instruction information decided by the downstream output destination determination unit 562, the transfer instruction information to the downstream frame from the LLID giving unit 564, and transfers the downstream frame with the given transfer instruction information to the FIFO write control unit 566. FIG. 29 shows an example of the format of the frame output from the downstream transfer instruction unit 565. In this frame, the LLID information and transfer instruction information are written in the preamble.

In accordance with the transfer instruction information written in the downstream frame and control information from the access arbitration unit 568, the FIFO write control unit 566 writes the downstream frame in the input FIFO 567 or the output FIFO 569 of the system indicated by the transfer instruction information and the control information.

For example, if the transfer instruction information is "10", the downstream frame is written in the input FIFO (0 system)

567A or the output FIFO (0 system) 569A. If the transfer instruction information is "01", the downstream frame is written in the input FIFO (1 system) 567B or the output FIFO (1 system) 569B. If the transfer instruction information is "11", the downstream frame is written in both the input FIFO (0 system) 567A and the input FIFO (1 system) 567B or both the output FIFO (0 system) 569A and the output FIFO (1 system) 569B.

Note that the control information from the access arbitration unit 568 represents whether the write in each output FIFO 569 is possible, and following cases occur in the arrangement example shown in FIG. 35.

(1) If write is possible in neither the output FIFO (0 system) 569A nor the output FIFO (1 system) 569B, the write is performed in (one or both of) the input FIFOs 567.

(2) If write is possible in the output FIFO (0 system) 569A but not in the output FIFO (1 system) 569B, the write is performed in the output FIFO (0 system) 569A or the input FIFO (1 system) 567B, or both of them (the write in the output FIFO 569 is done via the access arbitration unit 568).

(3) If write is possible in the output FIFO (1 system) 569B but not in the output FIFO (0 system) 569A, the write is performed in the output FIFO (1 system) 569B or the input FIFO (0 system) 567A, or both of them (the write in the output FIFO 569 is done via the access arbitration unit 568).

(4) If write is possible in both the output FIFO (0 system) 569A and the output FIFO (1 system) 569B, the write is performed in (one or both of) the output FIFOs 569 (the write is done via the access arbitration unit 568).

The access arbitration unit 568 not only mediates the write of the downstream frame from the FIFO write control unit 566 to the output FIFO 569 but also transfers frame data from the input FIFO 567 to the mass memory 570 or the output FIFO 569 and transfers frame data from the mass memory 570 to the output FIFO 569.

Figure 36:
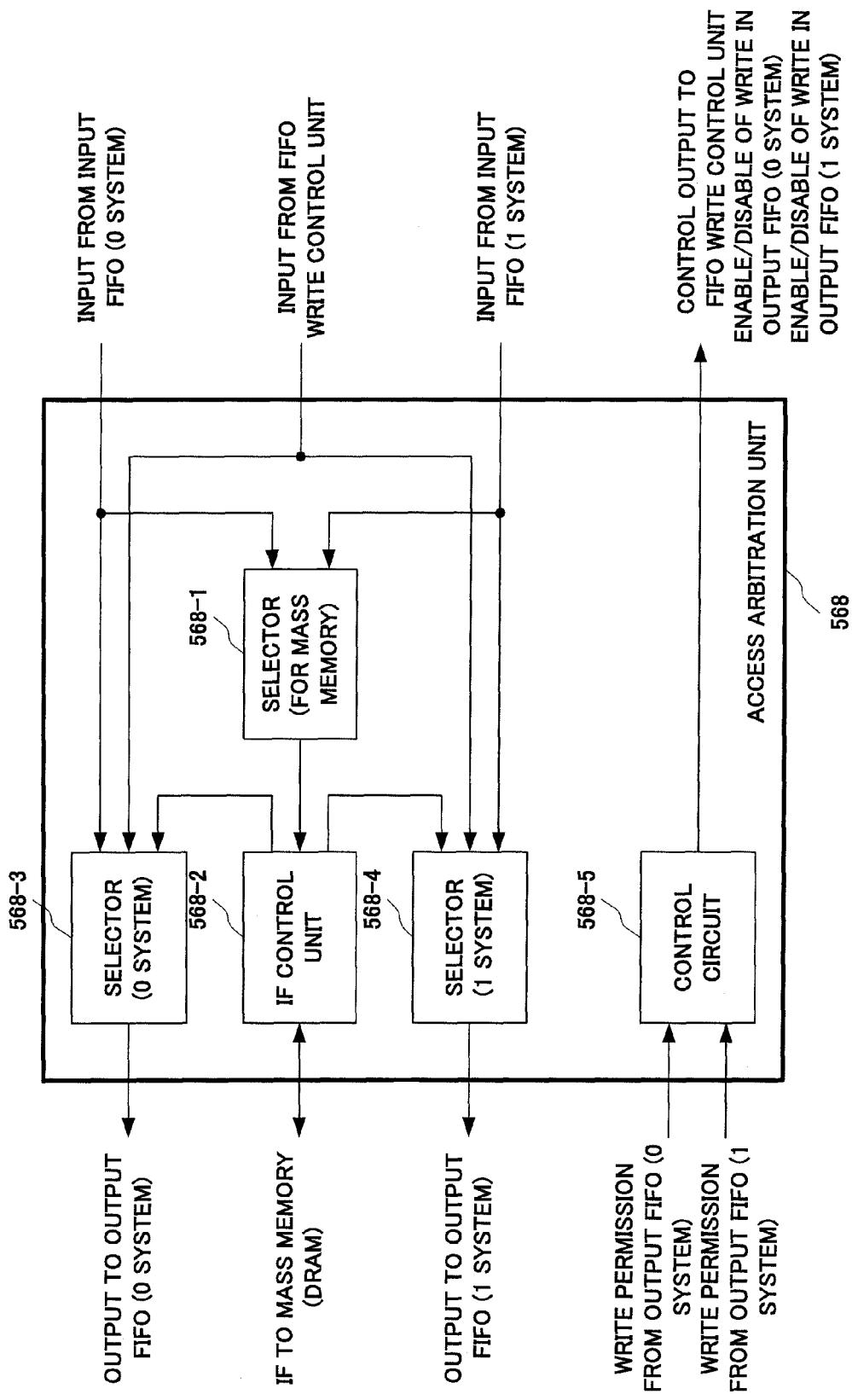
FIG. 36 is a block diagram showing an example of the arrangement of an access arbitration unit in the frame transfer processing unit.

FIG. 36 shows an example of the arrangement of the access arbitration unit 568. The access arbitration unit 568 shown in FIG. 36 operates in the following way in correspondence with write permission input from the output FIFOs 569 of the 0 system/1 system.

[State 1 on Output FIFO (0 System) Side: Initial State]

When the write permission input from the output FIFO (0 system) 569A is in a permitted state, and frame data is accumulated in neither the input FIFO (0 system) 567A nor an area (address) of the mass memory 570 corresponding to the input FIFO (0 system) 567A, information representing that the write in the output FIFO (0 system) 569A is possible is output to the FIFO write control unit 566. If a frame transfer instruction signal input from the FIFO write control unit 566 is "10" (0 system), the frame is written in the output FIFO (0 system) 569A.

Note that in this state, none of frame write from the FIFO write control unit 566 to the input FIFO (0 system) 567A, frame data transfer from the input FIFO (0 system) 567A, and frame data transfer from the area of the mass memory 570 corresponding to the input FIFO (0 system) 567A is performed.

[State 2 of Output FIFO (0 System)]

When the write permission input from the output FIFO (0 system) 569A is in a prohibited (unpermitted) state, information representing that the write in the output FIFO (0 system) 569A is impossible is output to the FIFO write control unit 566. When the total size (number of bytes) of frame data accumulated in the input FIFO (0 system) 567A exceeds a predetermined value (set to a value larger than the minimum frame size), data in the input FIFO (0 system) 567A are transferred to the area (address) of the mass memory 570 corresponding to the input FIFO (0 system) 567A at once.

After the transfer, when the total size (number of bytes) of frame data accumulated in the input FIFO (0 system) 567A exceeds the predetermined value before transition to another state, the transfer is similarly repeated.

Transfer to the mass memory 570 is performed in a different memory area (address) for each input FIFO 567. The accumulated value of the size (number of bytes) of the transferred frame data is managed for each input FIFO 567.

Note that since transfer from the input FIFO (0 system) 567A to the mass memory 570 and transfer from the input FIFO (1 system) 567B to the mass memory 570 may conflict, a selector (for mass memory) 568-1 performs conflict control.

In this state, frame write from the FIFO write control unit 566 to the input FIFO (0 system) 567A is performed. None of frame write from the FIFO write control unit 566 to the output FIFO (0 system) 569A, frame data transfer from the input FIFO (0 system) 567A to the output FIFO (0 system) 569A, and frame data transfer from the area of the mass memory 570 corresponding to the input FIFO (0 system) 567A is performed.

[State 3 on Output FIFO (0 System) Side]

When the write permission input from the output FIFO (0 system) 569A is in a permitted state, and frame data is accumulated in the area (address) of the mass memory 570 corresponding to the input FIFO (0 system) 567A, information representing that the write in the output FIFO (0 system) 569A is impossible is output to the FIFO write control unit 566. When the total size (number of bytes) of frame data accumulated in the input FIFO (0 system) 567A exceeds a predetermined value (set to a value larger than the minimum frame size), data in the input FIFO (0 system) 567A are transferred to the area (address) of the mass memory 570 corresponding to the input FIFO (0 system) 567A at once.

After the transfer, when the total size (number of bytes) of frame data accumulated in the input FIFO (0 system) 567A exceeds the predetermined value before transition to another state, the transfer is similarly repeated.

Transfer to the mass memory 570 is performed in a different memory area (address) for each input FIFO 567. The accumulated value of the size (number of bytes) of the transferred frame data is managed for each input FIFO 567.

Note that since transfer from the input FIFO (0 system) 567A to the mass memory 570 and transfer from the input FIFO (1 system) 567B to the mass memory 570 may conflict, the selector (for mass memory) 568-1 performs conflict control.

In addition, frame data accumulated in the area (address) of the mass memory 570 corresponding to the input FIFO (0 system) 567A is transferred to the output FIFO (0 system) 569A. This transfer is performed until the state transits to another state, or the frame data accumulated in the area (address) of the mass memory 570 corresponding to the input FIFO (0 system) 567A becomes nonexistent.

At the time of transfer from the mass memory 570 to the output FIFO 569, the size (number of bytes) of the transferred frame data is counted for each output FIFO 569 (for each corresponding input FIFO 567) and subtracted from the accumulated value of the size (number of bytes) of the frame data transferred from the input FIFO 567 to the mass memory 570. This value is used to confirm the presence/absence of frame data accumulated in the mass memory 570 for each corresponding input FIFO 567.

Note that since transfer from the mass memory 570 to the output FIFO (0 system) 569A and transfer from the mass memory 570 to the output FIFO (1 system) 569B may conflict, an IF control unit 568-2 performs conflict control. In addition, since transfer from the input FIFO 567 to the mass memory 570 and transfer from the mass memory 570 to the output FIFO 569 may conflict, the IF control unit 568-2 performs conflict control.

In this state, frame write from the FIFO write control unit 566 to the input FIFO (0 system) 567A is performed. Neither frame write from the FIFO write control unit 566 to the output FIFO (0 system) 569A nor frame data transfer from the input FIFO (0 system) 567A to the output FIFO (0 system) 569A is performed.

[State 4 on Output FIFO (0 System) Side]

When the write permission input from the output FIFO (0 system) 569A is in a permitted state, and frame data is accumulated not in the area (address) of the mass memory 570 corresponding to the input FIFO (0 system) 567A but in the input FIFO (0 system) 567A, information representing that the write in the output FIFO (0 system) 569A is impossible is output to the FIFO write control unit 566, and data in the input FIFO (0 system) 567A is transferred to the output FIFO (0 system) 569A. This transfer is performed until the state transits to another state, or the frame data accumulated in the input FIFO (0 system) 567A becomes nonexistent.

In this state, frame write from the FIFO write control unit 566 to the input FIFO (0 system) 567A is performed. None of frame write from the FIFO write control unit 566 to the output FIFO (0 system) 569A, frame data transfer from the input FIFO (0 system) 567A to the mass memory 570, and frame data transfer from the area of the mass memory 570 corresponding to the input FIFO (0 system) 567A is performed.

Note that although the operation corresponding to the write permission input from the output FIFO (0 system) 569A has been described above, the access arbitration unit 568 similarly operates for the write permission input from the output FIFO (1 system) 569B as well.

Figure 37:
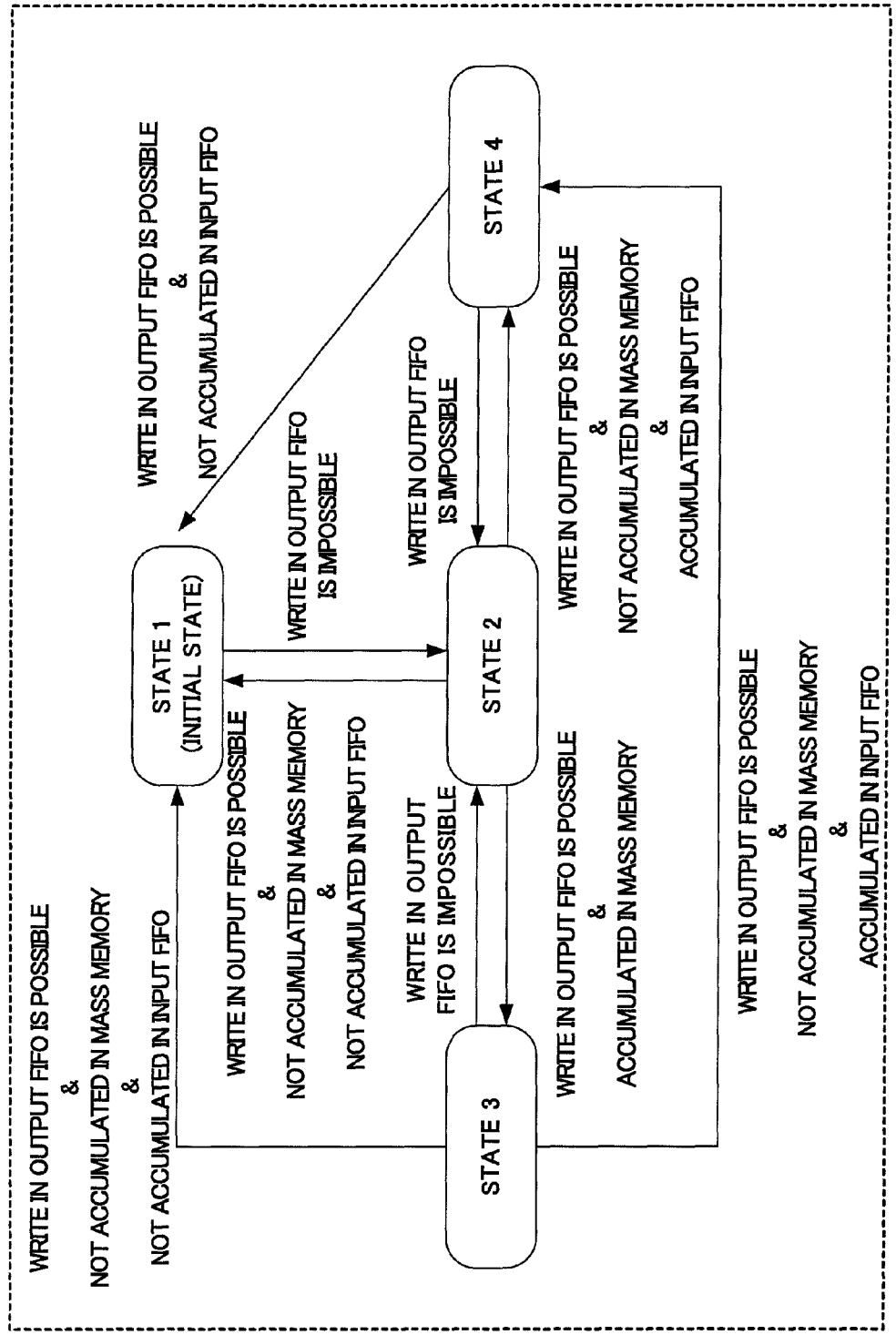
FIG. 37 is a view for explaining state transition of the access arbitration unit.

FIG. 37 shows state transition (example) of the access arbitration unit 568. FIG. 37 illustrates an operation corresponding to write permission input from the output FIFO 569 of the 0 system or 1 system. Two control circuits (for the 0 system and 1 system) that operate in this way can be provided and caused to operate independently (without depending on the operation of the other system) in terms of state transition. Note that although the 0 system and the 1 system may conflict in transfer to the mass memory 570 and transfer from the mass memory 570, this has no influence concerning the state transition.

In the frame transfer processing unit 56A, the output FIFO 569 (569A or 569B) accumulates frame data input from the access arbitration unit 568 and outputs the frame data in response to a request from the output FIFO read control unit 571 (571A or 571B). The output FIFO 569 also measures the frame data accumulation amount (a value obtained by subtracting the output data amount from the input data amount). When the value exceeds a predetermined value, the write permission signal to the access arbitration unit 568 is prohibited (unpermitted). This predetermined value is a value obtained by, for example, subtracting a data amount corresponding to the longest frame (2,000 Bytes) from the maximum value of the data amount accumulable in the output FIFO 569.

For example, if frame data of at least one frame is accumulated in the output FIFO 569 (569A or 569B), the output FIFO read control unit 571 (571A or 571B) reads out the frame data from the output FIFO 569 (569A or 569B) and transfers it to the LLID conversion unit 572 (572A or 572B).

The LLID conversion unit 572 (572A or 572B) rewrites LLID when the LLID of the input frame is a broadcast LLID (for example, FFFD in hexadecimal notation). For example, the LLID is rewritten to FFFF in hexadecimal notation for the 1G output port (0 system), or FFFE in hexadecimal notation for the 10G output port (1 system). In addition, the area of transfer instruction information is rewritten to idle data of the IEEE standardization or the like as needed.

[7.3. Effects of Seventh Embodiment]

According to this embodiment, since downstream frame transmission processing can be performed only by access (search) of the MAC address search table 561, the circuit scale on the downstream side becomes small. That is, the arrangement shown in FIG. 44 described as a possible related art needs the circuit to access the table that manages the downstream transmission speed for each LLID in addition to the circuit to access the MAC address search table to judge the transmission rate after deciding the destination LLID of a downstream frame. However, such a circuit is unnecessary, and the circuit scale on the downstream side become small.

According to this embodiment, when the destination MAC address of a downstream frame is a broadcast MAC address, information that indicates all systems as the output destinations of the downstream frame is set as the transfer instruction information (in this example, "11"). This makes it possible to write the downstream frame in the input FIFOs 567 or the output FIFOs 569 of all systems, that is, duplicate the downstream frame in the input FIFOs 567 or the output FIFO 569 of all systems and output the duplicated downstream frames from the output ports of all systems.

In the arrangement according to this embodiment, when processing to be performed upon receiving a frame having a broadcast MAC address as the transmission destination MAC address is decided by another circuit in the downstream output destination determination unit 562 without using the MAC address search table 561, a circuit for this is necessary. However, since the scale of the circuit (H/W) is small, the effectiveness of the present invention is not denied.

Note that when the transfer instruction for the plurality of systems is set to "1 (transfer instruction exists)" in the MAC address search table 561, and a downstream frame with the destination MAC address is input, the frame can be duplicated and output from the output ports of the plurality of systems.

It is also possible to add a circuit that sets the transfer instruction for the plurality of systems to "1 (transfer instruction exists)" when a downstream frame having a specific IP address (or VLAN tag) is input.

[Throughput]

Throughput when a DRAM is used as the mass memory 570 will be compared with that of the related art. The throughput in transfer to the DRAM or transfer from the DRAM depends on the data size in one transfer.

The maximum value (to be referred to as a "maximum burst size" hereinafter) of the size transferable in one transfer is decided by the specifications of the DRAM. When the data size at the time of transfer is smaller than the maximum burst size, the throughput is given by $$\text{bit width of DRAM} \times \text{operation clock rate} \times TD/(TO+TD)$$

where TD=data size (number of bits) in transfer/(bit width of DRAM×operation clock rate), and TO=overhead time in DRAM access per transfer The overhead time TO is a fixed value decided by the specifications of the DRAM. The smaller the data size at the time of transfer is, the smaller the throughput is.

An arrangement for performing transfer on the frame basis is conventionally used. In this case, if frames having the minimum frame length continue, the throughput extremely lowers depending on the specifications of the DRAM.

For example, assume that the bit width of the DRAM is 32, the operation clock rate is 312.5 MHz, and TO is 16 ns. When frames having the minimum frame length (64 Bytes) continue, $$TD=64\,[Byte]\times 8/(32\times 312.5\,[MHz])=51.2\,ns$$

Hence, the throughput is given by $$32\,[bit]\times 312.5\,[MHz]\times 51.2\,[ns]/(16\,[ns]+51.2\,[ns])=\text{about }7.6\,[Gbit/s]$$

This throughput is lower by 20% or more than the bus speed (32[bit]×312.5 [MHz]) of the DRAM of 10 Gbit/s.

On the other hand, in the arrangement of this embodiment, when the total size (number of bytes) of frame data accumulated in the input FIFO 567 when determining whether to transfer the frame data to the mass memory 570 is set to, for example, 1,000 Bytes, the size of data to be transferred to the mass memory 570 is always 1,000 Bytes or more (even when frames having the minimum frame length continue).

In this case, since $$\text{minimum value of }TD=1000\,[Byte]\times 8/(32\times 312.5\,[MHz])=800\,ns$$

the minimum throughput is given by $$32\,[bit]\times 312.5\,[MHz]\times 800\,[ns]/(16\,[ns]+800\,[ns])=\text{about }9.8\,[Gbit/s]$$

Even in transfer from the mass memory 570 to the output FIFO 569, the decrease in the throughput can similarly be suppressed by making the size of data to be transferred in one transfer larger than the minimum frame length (64 Bytes) in the arrangement of this embodiment.

In the arrangement of this embodiment, transfer via the mass memory 570 or direct transfer without intervening the mass memory 570 can selectively be used. This prevents a short frame from being retained in the OLT 5 for a long time (the latency from increasing), and avoids extreme lowing of the effective throughput when short frames are continuously input.

In the arrangement of this embodiment, a case in which the function of performing transfer from the input FIFO 567 to the output FIFO 569 is absent and a case in which the function is present (this embodiment) will be compared.

[When Transfer Function from Input FIFO to Output FIFO Is Absent]

In the arrangement of this embodiment, an example of the operation when the function of performing transfer from the input FIFO 567 to the output FIFO 569 is absent will be described below.

When a minimum (64 Bytes) frame is input after state transition from state 1 (initial state) to state 2, the frame is written in the input FIFO 567 but not transferred to the mass memory 570 in this state alone.

Even when write in the output FIFO 569 is enabled in this state, neither transfer from the input FIFO 567 to the output FIFO 569 nor transfer from the input FIFO 567 to the mass memory 570 is possible. That is, data is present but cannot be transferred to anywhere.

When another frame is input and transferred from the input FIFO 567 to the mass memory 570, all frames are transferred eventually. However, a case occurs in which a frame is retained in the input FIFO 567 for a long time (the latency increases).

[When Transfer Function from Input FIFO to Output FIFO is Present (Arrangement of this Embodiment)]

In the arrangement of this embodiment as well, when a minimum (64 Bytes) frame is input after state transition from state 1 (initial state) to state 2, the frame is written in the input FIFO 567 but not transferred to the mass memory 570 in this state alone.

The operation up to this point is the same as in the above-described example. When write in the output FIFO 569 is enabled in this state, transition to state 4 occurs, and transfer from the input FIFO 567 to the output FIFO 569 is performed immediately. That is, a frame is never retained in the input FIFO 567 for a long time (the latency never increases), unlike the above-described example.

8. Eighth Embodiment

Figure 38:
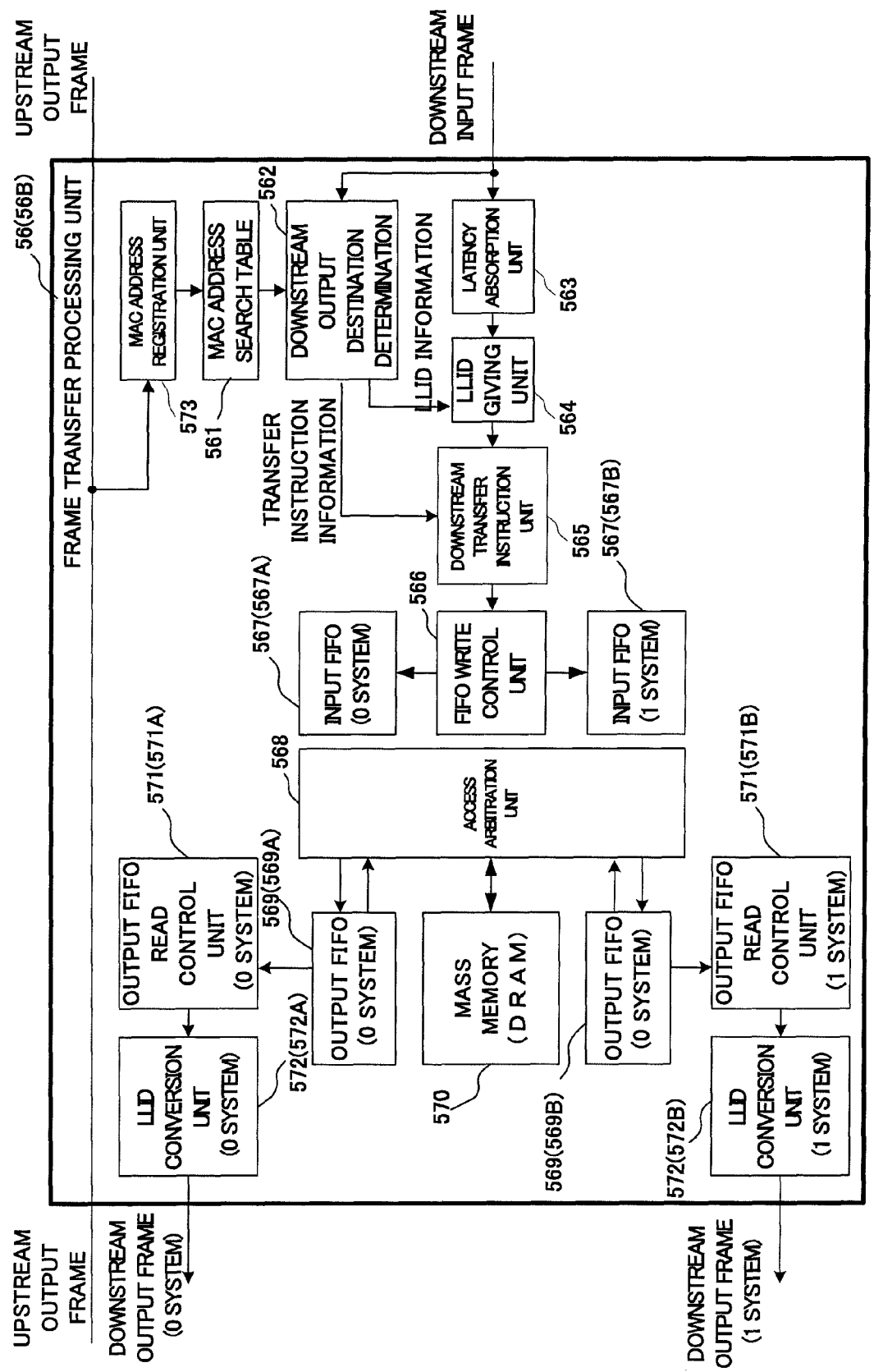
FIG. 38 is a block diagram showing an example of the arrangement of a frame transfer processing unit in an OLT according to the eighth embodiment.

An OLT according to the eighth embodiment of the present invention will be described next with reference to FIG. 30. FIG. 30 is a block diagram showing the arrangement of the OLT according to the eighth embodiment. As compared to the seventh embodiment (FIG. 25), an upstream input unit 59 is added to an OLT 5 according to the eighth embodiment. Additionally, as shown in FIG. 38, a MAC address registration unit 573 is added to a frame transfer processing unit 56 (56B).

In the eighth embodiment, a band assignment processing unit 58 has a function of reading out downstream output speed information corresponding to the LLID of a scheduled upstream frame from PON-IF port information registered in the band assignment processing unit 58 in advance and instructing the downstream output speed information to the upstream input unit 59 in synchronism with the timing of the upstream frame assigned by the band assignment processing unit 59, in addition to the function described in the seventh embodiment.

For example, when the LLID of a scheduled input frame is 1G-ONU, "1G" is instructed as the downstream output speed information. When the LLID of a scheduled input frame is 10G-ONU, "10G" is instructed as the downstream output speed information. Note that when the LLID of a scheduled input frame is asymmetric ONU (the upstream speed is 1G, and the downstream speed is 10G), "10G" is instructed.

The upstream input unit 59 inserts downstream output speed information into the preamble portion of an upstream frame in accordance with an instruction from the band assignment processing unit 58. For example, when the instruction from the band assignment processing unit 58 is "1G", the upstream input unit 59 inserts "0" into the downstream output speed information of the preamble portion of the upstream frame. When the instruction from the band assignment processing unit 58 is "10G", the upstream input unit 59 inserts "1" into the downstream output speed information of the preamble portion of the upstream frame. FIG. 14 shows an example of the arrangement of the frame output from the upstream input unit 59. Unlike the frame transmitted in the PON section 10 (see FIG. 2), downstream output speed information is inserted into the preamble portion.

In the eighth embodiment, as shown in FIG. 38, the MAC address registration unit 573 is added to the frame transfer processing unit 56B. The MAC address registration unit 573 automatically sets registered information in a MAC address search table 561 at the time of reception of an upstream frame. Automatic setting of registered information in the MAC address search table 561 will be described below with reference to the flowchart shown in FIG. 32.

At the time of reception of an upstream frame, the MAC address registration unit 573 checks whether the transmission source MAC address of the upstream frame is registered in the MAC address search table 561 (step S201). If the transmission source MAC address is not registered in the MAC address search table 561 (NO in step S201), the MAC address registration unit 573 checks whether the MAC address search table 561 has a free area (step S202). If no free area exists (NO in step S202), the processing directly ends. If a free area exists (YES in step S202), the MAC address registration unit 573 sets (newly registers) registered information in the MAC address search table 561 (step S203).

In this new registration of registered information, the MAC address registration unit 573 reads out downstream output speed information written in the upstream frame. If the downstream output speed information is "0", the transfer instruction information is set to "10" (0 system). If the downstream output speed information is "1", the transfer instruction information is set to "01" (1 system). This transfer instruction information is written in the MAC address search table 561 as registered information in association with the transmission source MAC address and LLID in the upstream frame. Note that in this case, the enable/disable information of the registered data is set to "enable".

On the other hand, if the transmission source MAC address of the upstream frame is registered in the MAC address search table 561 (YES in step S201), the MAC address registration unit 573 checks whether the downstream output speed information of the upstream frame is "1" (step S204). If the downstream output speed information is "1" (YES in step S204), the transfer instruction information is set to "01" (1 system), and the LLID and transfer instruction information of the matching MAC address in the MAC address search table 561 are updated (step S205). If the downstream output speed information is not "1" (NO in step S204), the transfer instruction information is set to "10" (0 system), and the LLID and transfer instruction information of the matching MAC address in the MAC address search table 561 are updated (step S206).

Note that in this example, when the transmission source MAC address of the upstream frame is registered in the MAC address search table 561, corresponding registered information in the MAC address search table 561 is updated. However, updating of the registered information may be prohibited.

In this example, when the instruction from the band assignment processing unit 58 is "1G", "0" is written in the upstream frame as downstream output speed information. When the instruction from the band assignment processing unit 58 is "10G", "1" is written in the upstream frame as output speed information. However, "10" may be written as the downstream output speed information in place of "0", and "01" may be written as the downstream output speed information in place of "1". This obviates the necessity of converting downstream output speed information into transfer instruction information.

In the above-described way, according to the eighth embodiment, the MAC address registration unit 573 automatically registers the MAC address, LLID, and transfer instruction information in the MAC address search table 561, including those of an asymmetric ONU (the upstream speed is 1G, and the downstream speed is 10G).

Note that in the arrangement of the eighth embodiment, the upstream input unit 59 that registers "speed information" in upstream processing needs to be added, as compared to the arrangement of the seventh embodiment. However, the "speed information" can be inserted into the preamble portion of the upstream frame using a simple circuit by obtaining the "speed information" (corresponding to the transmission speed of a control frame called a Gate frame) from the band assignment processing unit 58 that performs upstream band assignment.

In the arrangement according to the eight embodiment as well, when the destination MAC address of a downstream frame is a broadcast MAC address, the input frame can be duplicated and output from the output ports of all systems.

Note that when the transfer instruction for the plurality of systems is set to "1 (transfer instruction exists)" in the MAC address search table 561, and a downstream frame with the destination MAC address is input, the frame can be duplicated and output from the output ports of the plurality of systems.

It is also possible to add a circuit that sets the transfer instruction for the plurality of systems to "1 (transfer instruction exists)" when a downstream frame having a specific IP address (or VLAN tag) is input.

In the arrangement of the eighth embodiment as well, a decrease in throughput when using a DRAM as a mass memory 570 is suppressed, as in the seventh embodiment. In addition, transfer via the mass memory 570 or direct transfer without intervening the mass memory 570 can selectively be used, as in the seventh embodiment. This prevents a short frame from being retained in the OLT 5 for a long time (the latency from increasing).

9. Ninth Embodiment

Figure 39:
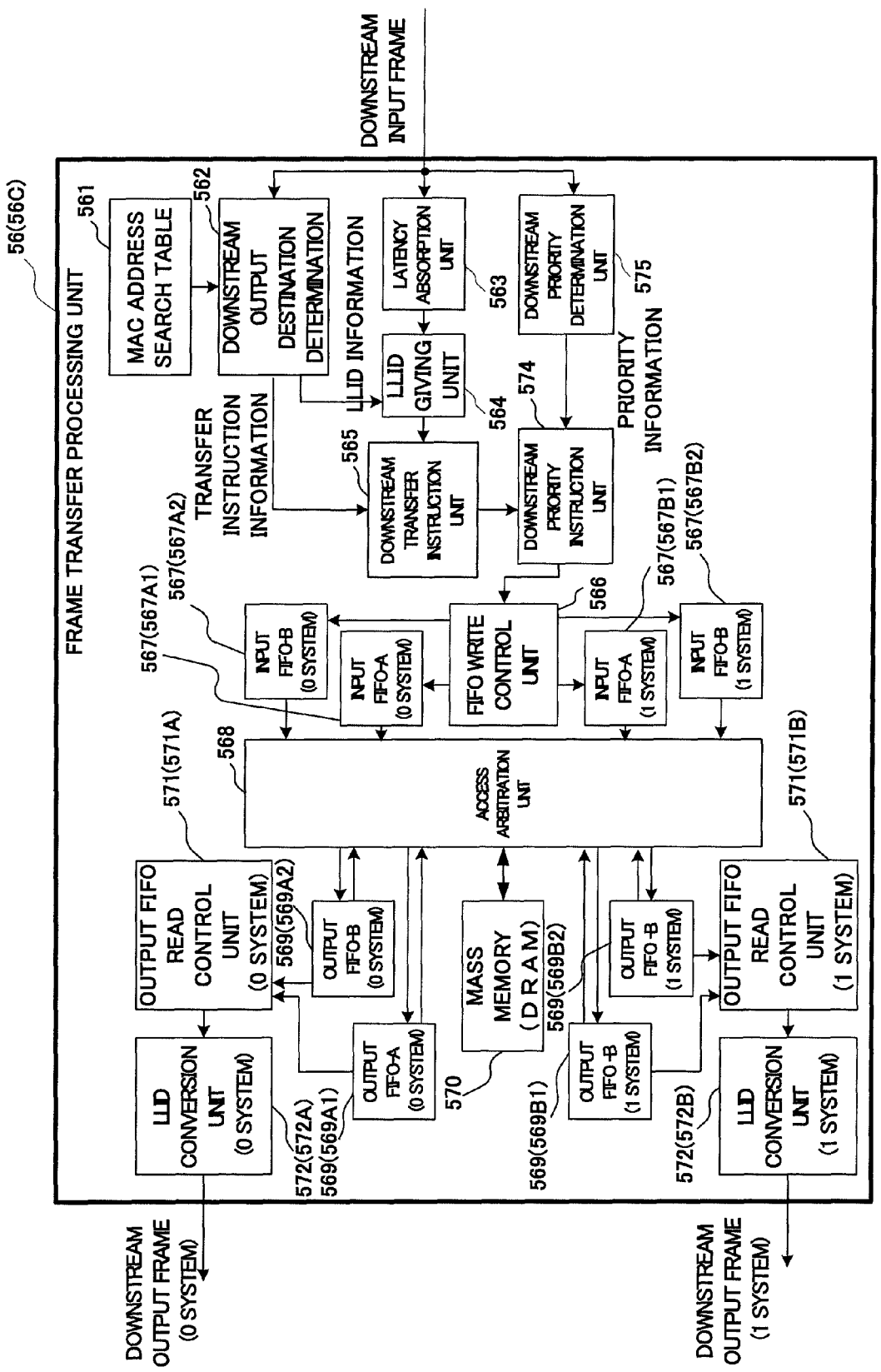
FIG. 39 is a block diagram showing an example of the arrangement of a frame transfer processing unit in an OLT according to the ninth embodiment.

An OLT according to the ninth embodiment of the present invention will be described next with reference to FIG. 39. FIG. 39 is a block diagram showing the arrangement of a frame transfer processing unit 56 (56C) in an OLT 5 according to the ninth embodiment. The frame transfer processing unit 56C has an arrangement obtained by adding a priority control function to the frame transfer processing unit 56A shown in FIG. 35.

The frame transfer processing unit 56C is different from the frame transfer processing unit 56A in that a plurality of input FIFOs 567 and a plurality of output FIFOs 569 (FIFO-A and FIFO-B) are included for each of the 0 system and the 1 system, a downstream priority instruction unit 574 is inserted between a downstream transfer instruction unit 565 and a FIFO write control unit 566, and a downstream priority determination unit 575 is added to the preceding stage of the downstream priority instruction unit 574.

In this example, an input FIFO-A (0 system) 567A1 and an input FIFO-B (0 system) 567A2 are provided as the input FIFOs of the 0 system, and an input FIFO-A (1 system) 567B1 and an input FIFO-B (1 system) 567B2 are provided as the input FIFOs of the 1 system. The input FIFO-A (0 system) 567A1 and the input FIFO-A (1 system) 567B1 are set as the input FIFOs on the high priority side.

In addition, an output FIFO-A (0 system) 569A1 and an output FIFO-B (0 system) 569A2 are provided as the output FIFOs of the 0 system, and an output FIFO-A (1 system) 569B1 and an output FIFO-B (1 system) 569B2 are provided as the output FIFOs of the 1 system. The output FIFO-A (0 system) 569A1 and the output FIFO-A (1 system) 569B1 are set as the output FIFOs on the high priority side.

In the frame transfer processing unit 56C, the downstream priority determination unit 575 decides the priority of an input downstream frame by referring to the PCP bits or VID in the VLAN tag or information representing priority in the IP header of the input downstream frame. If each of the 0 system and the 1 system includes two FIFOs (FIFO-A and FIFO-B), and, for example, the PCP bits in the VLAN tag are 0x1 to 0x7, the priority is decided to be high. If the PCP bits are 0x0, the priority is decided to be low.

Figure 40:
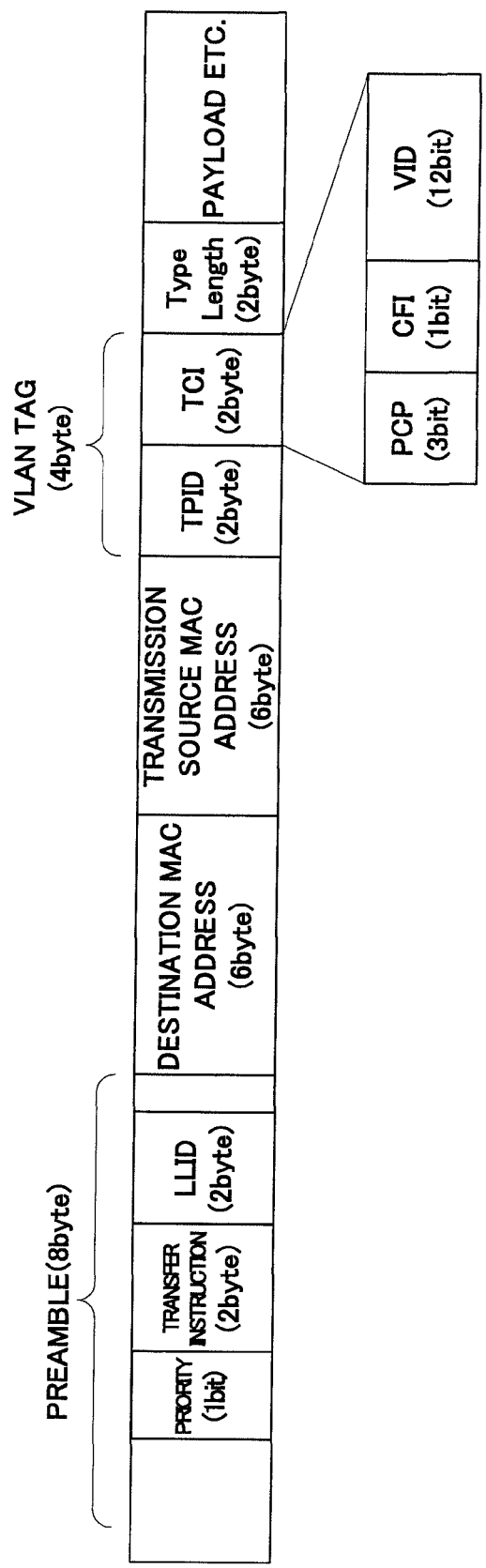
FIG. 40 is a view showing an example of the format of a frame output from a downstream priority instruction unit.
Figure 41:
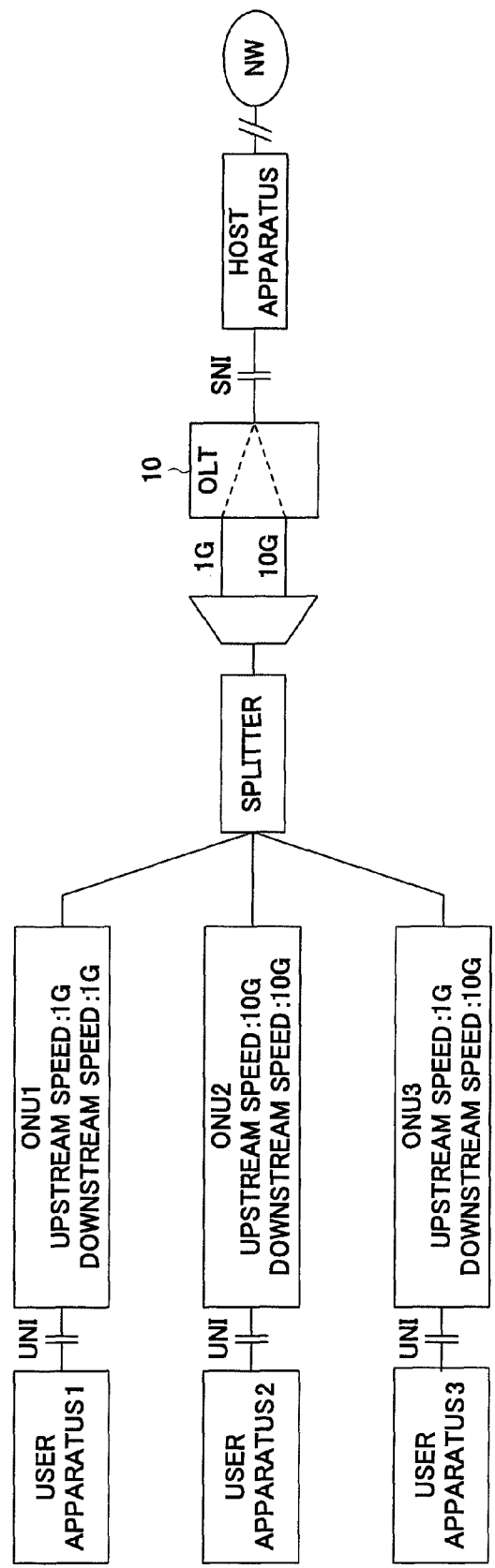
FIG. 41 is a view showing an example of the arrangement of a conventional 10G-EPON system.
Figure 42:
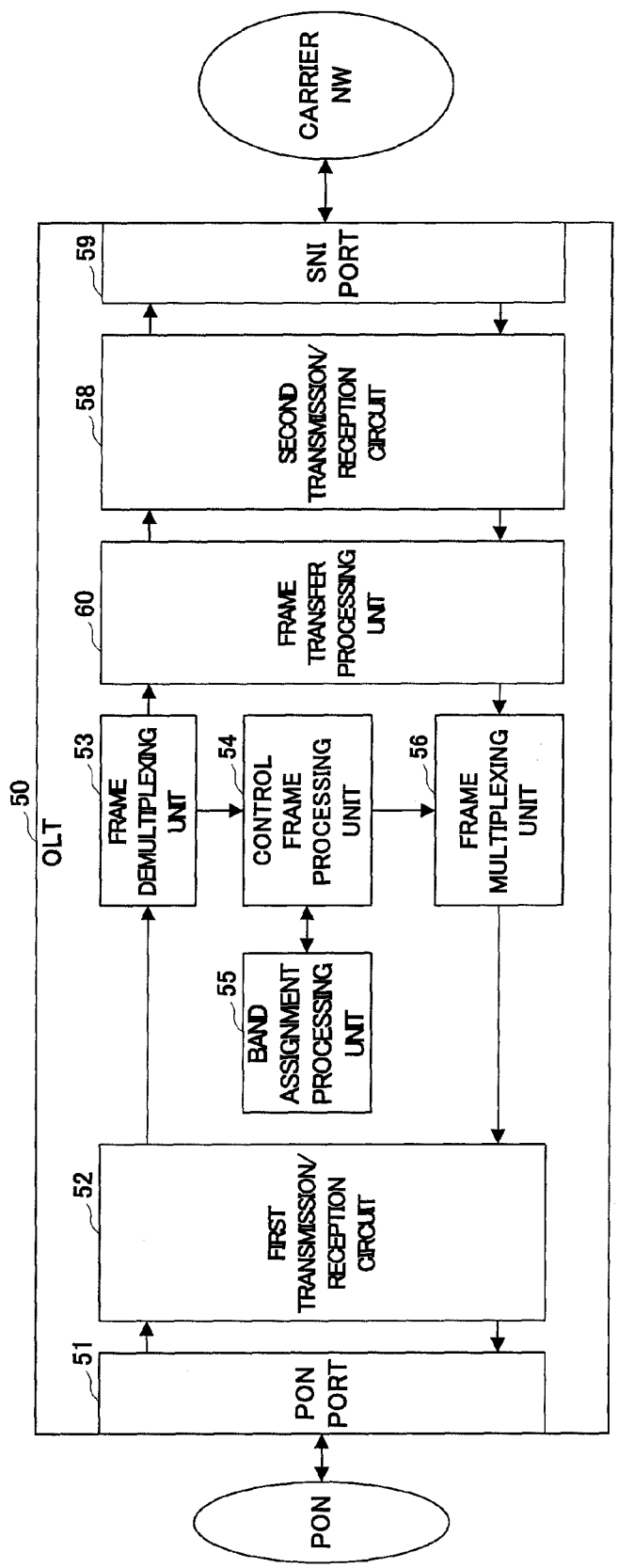
FIG. 42 is a block diagram showing an example of the arrangement of an OLT for conventional GE-PON.
Figure 43:
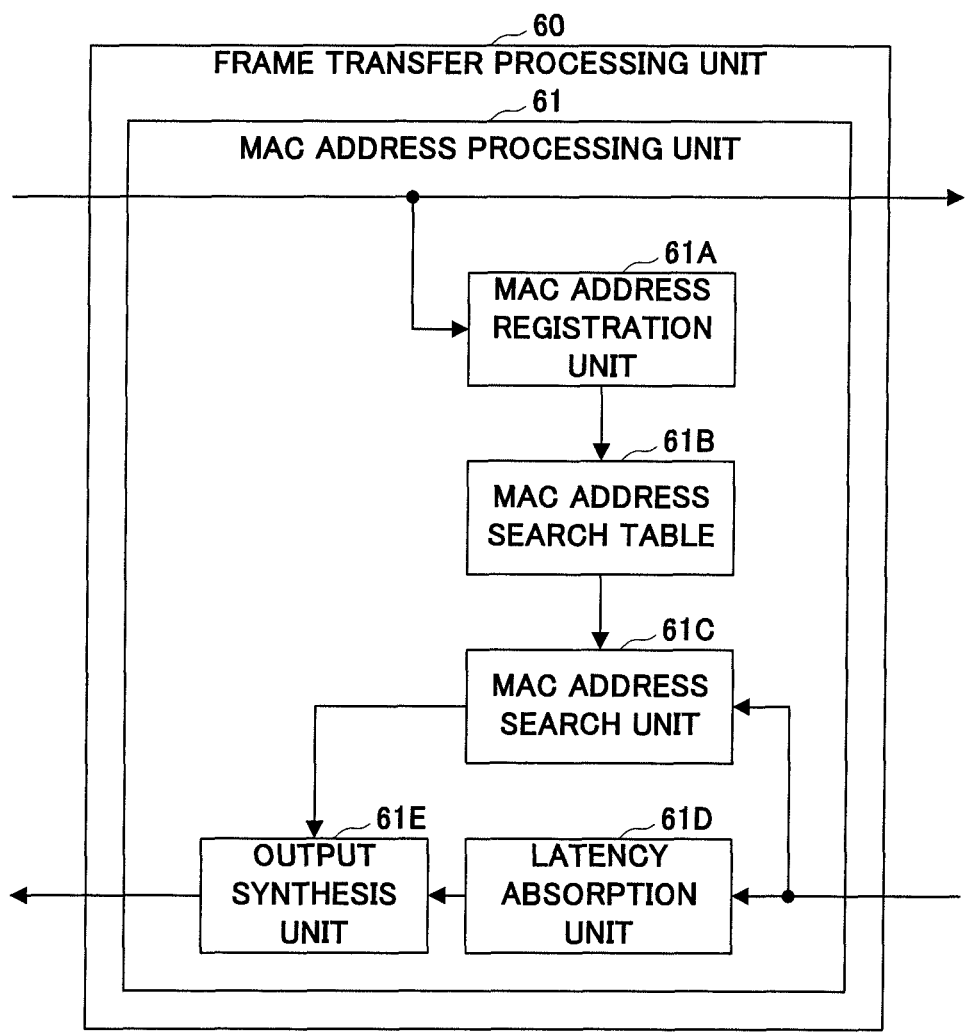
FIG. 43 is a block diagram showing an example of the arrangement of a frame transfer processing unit in the OLT for the conventional GE-PON.

In accordance with the priority determined by the downstream priority determination unit 575, the downstream priority instruction unit 574 gives priority information to the downstream frame from the downstream transfer instruction unit 565, and transfers the frame to the FIFO write control unit 566. FIG. 40 shows an example of the format of the frame output from the downstream priority instruction unit 574. The priority information is given to the preamble portion. For example, for high priority, "1" is given as priority information. For low priority, "0" is given as priority information.

In accordance with transfer instruction information and priority information written in the downstream frame from the downstream priority instruction unit 574 and control information from an access arbitration unit 568, the FIFO write control unit 566 writes the downstream frame in the input FIFO 567 or output FIFO 569 of the system indicated by the transfer instruction information, the priority information, and the control information.

For example, when the transfer instruction information is "10" (0 system), and the priority information is "1", the downstream frame is written in the input FIFO-A (0 system) 567A1 on the high priority side or the output FIFO-A (0 system) 569A1 on the high priority side. When the transfer instruction information is "01" (1 system), and the priority information is "1" (high priority), the downstream frame is written in the input FIFO-A (1 system) 567B1 on the high priority side or the output FIFO-A (1 system) 569B1 on the high priority side. When the transfer instruction information is "11" (0 system/1 system), and the priority information is "1" (high priority), the downstream frame is written in the input FIFO-A (0 system) 567A1 or the input FIFO-A (1 system) 567B1 on the high priority side or the output FIFO-A (0 system) 569A1 or the output FIFO-A (1 system) 569B1 on the high priority side.

Note that the control information from the access arbitration unit 568 represents whether write in each output FIFO 569 is possible, and is the same as in the seventh embodiment except that the number of FIFOs is different.

The access arbitration unit 568 not only mediates the write of the downstream frame from the FIFO write control unit 566 to the output FIFO 569 but also transfers frame data from the input FIFO 567 to a mass memory 570 or the output FIFO 569 and transfers frame data from the mass memory 570 to the output FIFO 569. This is the same as in the seventh embodiment except that the number of FIFOs is different.

For example, if frame data of at least one frame is accumulated in the output FIFO-A (0 system) 569A1 or the output FIFO-B (0 system) 569A2, the output FIFO read control unit 571A reads out the frame data from the output FIFO-A (0 system) 569A1 or the output FIFO-B (0 system) 569A2 and transfers it to the LLID conversion unit (0 system) 572A. In this case, if readout from the output FIFO-A (0 system) 569A1 on the high priority side is possible, the output FIFO read control unit (0 system) 571A gives higher priority to readout from the output FIFO-A (0 system) 569A1 on the high priority side.

For example, if frame data of at least one frame is accumulated in the output FIFO-A (1 system) 569B1 or the output FIFO-B (1 system) 569B2, the output FIFO read control unit 571B reads out the frame data from the output FIFO-A (1 system) 569B1 or the output FIFO-B (1 system) 569B2 and transfers it to the LLID conversion unit (1 system) 572B. In this case, if readout from the output FIFO-A (1 system) 569B1 on the high priority side is possible, the output FIFO read control unit (1 system) 571B gives higher priority to readout from the output FIFO-A (1 system) 569B1 on the high priority side.

The LLID conversion unit 572 (572A or 572B) rewrites the LLID when the LLID of the input frame is a broadcast LLID (for example, FFFD in hexadecimal notation). For example, the LLID is rewritten to FFFF in hexadecimal notation for the 1G output port (0 system), or FFFE in hexadecimal notation for the 10G output port (1 system). In addition, the area of the priority and transfer instruction information is rewritten to idle data of the IEEE standardization or the like as needed.

Note that in the above-described seventh to ninth embodiments, output ports of two systems, that is, the 0 system and the 1 system are provided. When three or more systems are provided, the same arrangement as described above can be used by extending the number of bits of the transfer instruction information.

A transmission circuits 52 (52A and 52B) may comply with specifications other than the IEEE specifications. For example, some of the plurality of transmission circuits 52 may comply with the IEEE specifications, and the remaining transmission circuits may comply with the G-PON specifications of ITU-T.

Note that when the transmission circuits 52 (52A and 52B) comply with specifications other than the IEEE specifications, the specifications of the LLID conversion units 572 (572A and 572B) and the like are changed in accordance with the specifications.

In the ninth embodiment, two kinds of FIFOs including a high priority FIFO and a low priority FIFO are provided as the input FIFOs 567 and output FIFOs 569 of each of the 0 system and the 1 system. However, when three or more input FIFOs 567 and three or more output FIFOs 569 are provided for each system, and the priority information is extended to a plurality of bits, the apparatus can cope with three or more kinds of priority.

10. Extension of Embodiments

The present invention has been described above with reference to the embodiments. However, the present invention is not limited to the above embodiments. Various changes and modifications understandable by those who are skilled in the art can be done for the arrangements and details of the present invention. In addition, the embodiments can arbitrarily be combined and implemented within a consistent range.

For example, a system that handles not an LLID but VID of a VLAN tag or the like as the identifier information of the present invention can newly be constituted. In this case, it is not essential to give the LLID of the IEEE standardization to a downstream frame, and a downstream frame given the same identifier information (for example, VID) may be output from the transmission circuits of the plurality of systems.

The present invention can be applied not only to the 10G-EPON system but to any station-side apparatus in an optical transmission system including a plurality of downstream output ports.

11. Supplementary Notes

Supplementary notes of the embodiments of the present invention will be described below.

[Supplementary Note 1]

There is provided an OLT that is connected to a plurality of ONUs via a PON and connected to a host apparatus via an SNI (Service Node Interface) and mutually transfers a frame to be exchanged between the ONUs and the host apparatus, comprising:

a reception circuit that receives an upstream frame from the ONU via the PON;

a plurality of transmission circuits that are provided in correspondence with preset transmission speeds and transmit a downstream frame to the ONUs via the PON at the transmission speeds;

a transmission/reception circuit that transmits an upstream frame to the host apparatus via the SNI and receives the downstream frame from the host apparatus via the SNI; and a frame transfer processing unit that transfers the upstream frame received by the reception circuit to the transmission/reception circuit and transfers the downstream frame received by the transmission/reception circuit to the transmission circuits, wherein the frame transfer processing unit comprises a MAC address search table in which an LLID (Logical Link ID) and downstream output destination selection information of the ONU are registered in correspondence with each of the individual MAC addresses of user apparatuses connected to the ONUs, and acquires the LLID and downstream output destination selection information corresponding to the destination MAC address of the downstream frame received by the transmission/reception circuit from the MAC address search table, gives the LLID to the downstream frame, and transfers the downstream frame to a transmission circuit corresponding to the downstream output destination selection information out of the transmission circuits.

[Supplementary Note 2]

There is provided an OLT according to supplementary note 1, wherein the frame transfer processing unit further comprises:

a MAC address search unit that acquires, from the MAC address search table, the LLID and the downstream output destination selection information corresponding to the destination MAC address of the downstream frame received by the transmission/reception circuit;

an LLID giving unit that gives the LLID acquired by the MAC address search unit to the downstream frame received by the transmission/reception circuit; and a downstream output destination control unit that transfers the downstream frame from the LLID giving unit to the transmission circuit corresponding to the downstream output destination selection information acquired by the MAC address search unit out of the transmission circuits.

[Supplementary Note 3]

There is provided an OLT according to supplementary note 1 or 2, wherein the frame transfer processing unit further comprises a MAC address registration unit that acquires a transmission source MAC address and the LLID from the upstream frame received by the reception circuit and registers the LLID and the downstream output destination selection information associated with the LLID in advance in the MAC address search table in association with the transmission source MAC address.

[Supplementary Note 4]

There is provided an OLT according to supplementary note 3, further comprising an upstream input unit that gives the downstream output destination selection information associated with the LLID of the upstream frame in advance to the upstream frame received by the reception circuit, wherein the MAC address registration unit acquires the transmission source MAC address, the LLID, and the downstream output destination selection information from the upstream frame output from the upstream input unit and registers the transmission source MAC address, the LLID, and the downstream output destination selection information in the MAC address search table.

[Supplementary Note 5]

There is provided an OLT according to supplementary note 3 or 4, wherein the MAC address registration unit also registers a reception state concerning the transmission source MAC address in the MAC address search table when registering the LLID and the downstream output destination selection information, and checks the reception state of each MAC address registered in the MAC address search table at a predetermined aging period, and sets, out of the MAC addresses, a MAC address whose reception has not been confirmed during the aging period in a disable state.

[Supplementary Note 6]

There is provided a frame transfer method used in an OLT that is connected to a plurality of ONUs via a PON and connected to a host apparatus via an SNI (Service Node Interface) and mutually transfers a frame to be exchanged between the ONUs and the host apparatus, the method comprising the steps of:

storing an LLID (Logical Link ID) and downstream output destination selection information of the ONU in a MAC address search table in correspondence with each of the individual MAC addresses of user apparatuses connected to the ONUs; and acquiring the LLID and the downstream output destination selection information corresponding to the destination MAC address of the downstream frame received from the host apparatus from the MAC address search table, giving the LLID to the downstream frame, and transferring the downstream frame to a transmission circuit corresponding to the downstream output destination selection information out of the plurality of transmission circuits that are provided in correspondence with preset transmission speeds and transmit the downstream frame to the ONU via the PON at the transmission speeds.

[Supplementary Note 7]

There is provided a station-side apparatus in an optical transmission system that transfers a frame between a host apparatus and a plurality of subscriber-side apparatuses connected via an optical transmission channel, comprising:

an input/output port of an upstream frame to the host apparatus and a downstream frame from the host apparatus;

an input port of the upstream frame from the subscriber-side apparatus;

output ports of a plurality of systems of the downstream frame to the subscriber-side apparatus; and a frame transfer processing unit that, using the MAC address of a destination written in the downstream frame from the host apparatus as a key, reads out the identifier information of the subscriber-side apparatus corresponding to the MAC address and transfer instruction information indicating the system of the output destination of the downstream frame to the subscriber-side apparatus from a MAC address search table and writes the identifier information and the transfer instruction information in the downstream frame from the host apparatus, writes, in accordance with the transfer instruction information written in the downstream frame, the downstream frame in a buffer of the system indicated by the transfer instruction information, reads out the downstream frame written in the buffer, and outputs the downstream frame from the output port of the system to which the buffer belongs.

[Supplementary Note 8]

There is provided a station-side apparatus in an optical transmission system according to supplementary note 7, wherein the frame transfer processing unit comprises:

a MAC address search table representing a correspondence between the MAC address, the identifier information, and the transfer instruction information;

a MAC address search unit that reads out the identifier information and the transfer instruction information corresponding to the MAC address from the MAC address search table using the MAC address of the destination written in the downstream frame from the host apparatus as a key;

an information write unit that writes the identifier information and the transfer instruction information read out by the MAC address search unit in the downstream frame from the host apparatus;

a buffer provided for each of the systems of the output ports;

a buffer write control unit that writes, in accordance with the transfer instruction information written in the downstream frame by the information write unit, the downstream frame in the buffer of the system indicated by the transfer instruction information; and a buffer read control unit that is provided for each system of the output ports, reads out the downstream frame written in the buffer of the system to which the buffer read control unit belongs in accordance with an instruction from the buffer write control unit, and outputs the readout downstream frame from the output port of the system to which the buffer read control unit belongs.

[Supplementary Note 9]

There is provided a station-side apparatus in an optical transmission system according to supplementary note 7 or 8, wherein in the MAC address search table, setting of the identifier information and the transfer instruction information in the table in association with the MAC address is performed in advance.

[Supplementary Note 10]

There is provided a station-side apparatus in an optical transmission system according to supplementary note 7 or 8, wherein in the MAC address search table, setting of the identifier information and the transfer instruction information in the table in association with the MAC address is performed automatically upon receiving the upstream frame from the subscriber-side apparatus.

[Supplementary Note 11]

There is provided a station-side apparatus in an optical transmission system according to supplementary note 8, further comprising an upstream input unit that writes, in the upstream frame from the subscriber-side apparatus, downstream output speed information associated in advance with the identifier information written in the upstream frame, wherein the frame transfer processing unit comprises a MAC address registration unit that confirms whether the MAC address of the transmission source written in the upstream frame from the subscriber-side apparatus is registered in the MAC address search table, and when the MAC address of the transmission source is not registered in the MAC address search table, sets the downstream output speed information written in the upstream frame as the transfer instruction information, and registers the transfer instruction information in the MAC address search table in association with the MAC address of the transmission source and the identifier information in the upstream frame.

[Supplementary Note 12]

There is provided a station-side apparatus in an optical transmission system according to supplementary note 8, wherein when the transfer instruction information written in the downstream frame by the information write unit indicates all systems of the output ports, the buffer write control unit writes the downstream frame in the buffers of all the systems.

[Supplementary Note 13]

There is provided a station-side apparatus in an optical transmission system according to supplementary note 8, wherein the frame transfer processing unit comprises:

a priority determination unit that determines priority of the downstream frame based on information written in the downstream frame from the host apparatus; and a downstream priority instruction unit that writes priority information determined by the priority determination unit in the downstream frame from the host apparatus, the buffer comprises buffer circuits in number corresponding to a type of the priority for each of the systems of the output ports, the buffer write control unit writes, in accordance with the transfer instruction information and the priority information written in the downstream frame, the downstream frame in the buffer indicated by the transfer instruction information and the priority information, and the buffer read control unit reads out the downstream frame written in the buffer while giving higher priority to readout from the buffer on high priority side out of the buffers of the system to which the buffer read control unit belongs, based on an instruction from the buffer write control unit.

[Supplementary Note 14]

There is provided a station-side apparatus in an optical transmission system that transfers a frame between a host apparatus and a plurality of subscriber-side apparatuses connected via an optical transmission channel, comprising:

an input/output port of an upstream frame to the host apparatus and a downstream frame from the host apparatus;

an input port of the upstream frame from the subscriber-side apparatus;

output ports of a plurality of systems of the downstream frame to the subscriber-side apparatus; and a frame transfer processing unit that, using the MAC address of a destination written in the downstream frame from the host apparatus as a key, reads out the identifier information of the subscriber-side apparatus corresponding to the MAC address and transfer instruction information indicating the system of the output destination of the downstream frame to the subscriber-side apparatus from a MAC address search table and writes the identifier information and the transfer instruction information in the downstream frame from the host apparatus, writes, in accordance with the transfer instruction information written in the downstream frame and internally generated control information, the downstream frame in an input FIFO or an output FIFO of the system indicated by the transfer instruction information and the control information, and simultaneously, controls transfer of frame data from the input FIFO to the output FIFO, transfer of the frame data from the input FIFO to a mass memory, and transfer of the frame data from the mass memory to the output FIFO, reads out the downstream frame written in the output FIFO, and outputs the downstream frame from the output port of the system to which the output FIFO belongs.

[Supplementary Note 15]

There is provided a station-side apparatus in an optical transmission system according to supplementary note 14, wherein the frame transfer processing unit comprises:

a MAC address search table representing a correspondence between the MAC address, the identifier information, and the transfer instruction information;

a MAC address search unit that reads out the identifier information and the transfer instruction information corresponding to the MAC address from the MAC address search table using the MAC address of the destination written in the downstream frame from the host apparatus as a key;

an information write unit that writes the identifier information and the transfer instruction information read out by the MAC address search unit in the downstream frame from the host apparatus;

the input FIFO and the output FIFO provided for each of the systems of the output ports;

the mass memory;

an access arbitration unit;

a FIFO write control unit that writes, in accordance with the transfer instruction information written in the downstream frame by the information write unit and a control signal from the access arbitration unit, the downstream frame in the input FIFO or output FIFO of the system indicated by the transfer instruction information and the control information; and an output FIFO read control unit that is provided for each system of the output ports, reads out the downstream frame written in the output FIFO of the system to which the output FIFO read control unit belongs, and outputs the readout downstream frame from the output port of the system to which the output FIFO read control unit belongs, and the access arbitration unit mediates write of the downstream frame to the output FIFO by the FIFO write control unit, and simultaneously controls transfer of the frame data from the input FIFO to the output FIFO, transfer of the frame data from the input FIFO to the mass memory, and transfer of the frame data from the mass memory to the output FIFO.

[Supplementary Note 16]

There is provided a station-side apparatus in an optical transmission system according to supplementary note 14 or 15, wherein in the MAC address search table, setting of the identifier information and the transfer instruction information in the table in association with the MAC address is performed in advance.

[Supplementary Note 17]

There is provided a station-side apparatus in an optical transmission system according to supplementary note 14 or 15, wherein in the MAC address search table, setting of the identifier information and the transfer instruction information in the table in association with the MAC address is performed automatically upon receiving the upstream frame from the subscriber-side apparatus.

[Supplementary Note 18]

There is provided a station-side apparatus in an optical transmission system according to supplementary note 15, wherein when a total data size of the frame data written in the input FIFO exceeds a predetermined value, the access arbitration unit transfers the data in the input FIFO to the mass memory at once.

[Supplementary Note 19]

There is provided a station-side apparatus in an optical transmission system according to supplementary note 15, further comprising an upstream input unit that writes, in the upstream frame from the subscriber-side apparatus, downstream output speed information associated in advance with the identifier information written in the upstream frame, wherein the frame transfer processing unit comprises a MAC address registration unit that confirms whether the MAC address of the transmission source written in the upstream frame from the subscriber-side apparatus is registered in the MAC address search table, and when the MAC address of the transmission source is not registered in the MAC address search table, sets the downstream output speed information written in the upstream frame as the transfer instruction information, and registers the transfer instruction information in the MAC address search table in association with the MAC address of the transmission source and the identifier information in the upstream frame.

[Supplementary Note 20]

There is provided a station-side apparatus in an optical transmission system according to supplementary note 15, wherein when the transfer instruction information written in the downstream frame by the information write unit indicates all systems of the output ports, the FIFO write control unit writes the downstream frame in the input FIFOs or output FIFOs of all the systems.

[Supplementary Note 21]

There is provided a station-side apparatus in an optical transmission system according to supplementary note 15, wherein the frame transfer processing unit comprises:

a priority determination unit that determines priority of the downstream frame based on information written in the downstream frame from the host apparatus; and a downstream priority instruction unit that writes priority information determined by the priority determination unit in the downstream frame from the host apparatus, the input FIFO comprises input FIFOs in number corresponding to a type of the priority for each of the systems of the output ports, the output FIFO comprises output FIFOs in number corresponding to the type of the priority for each of the systems of the output ports, the FIFO write control unit writes, in accordance with the transfer instruction information and the priority information written in the downstream frame and the control signal from the access arbitration unit, the downstream frame in the input FIFO or output FIFO indicated by the transfer instruction information, the priority information, and the control signal, and the output FIFO read control unit reads out the downstream frame written in the output FIFO while giving higher priority to readout from the output FIFO on high priority side out of the output FIFOs of the system to which the output FIFO read control unit belongs.

The invention claimed is:

1. A station-side apparatus comprising:

a reception circuit that receives an upstream frame from a subscriber-side apparatus connected via an optical transmission channel;

a transmission/reception circuit that transmits the upstream frame to a host apparatus connected via an interface and receives a downstream frame from the host apparatus via the interface;

a plurality of transmission circuits that are provided in correspondence with a plurality of transmission systems, respectively, and transmit the downstream frame to the subscriber-side apparatus via the optical transmission channel at transmission speeds preset via the optical transmission channel;

a frame transfer processing unit that transfers the upstream frame received by said reception circuit to said transmission/reception circuit and transfers the downstream frame received by said transmission/reception circuit to said transmission circuits; and a table in which a destination ID for identifying one of a user apparatus and the subscriber-side apparatus serving as a destination of the downstream frame, identifier information for identifying one of the subscriber-side apparatus to which the user apparatus is connected and the subscriber-side apparatus serving as the destination, and transfer instruction information indicating the transmission system of an output destination of the downstream frame are registered in association with each other, wherein said frame transfer processing unit acquires, from said table, the identifier information and the transfer instruction information associated with the destination ID of the downstream frame received by said transmission/reception circuit, gives the identifier information to the downstream frame, and transfers the downstream frame to, out of said plurality of transmission circuits, said transmission circuit of the transmission system indicated by the transfer instruction information, wherein said frame transfer processing unit further comprises a transmission source ID registration unit that acquires, from the upstream frame received by said reception circuit, a transmission source ID for identifying one of the user apparatus and the subscriber-side apparatus of a transmission source of the upstream frame and the identifier information for identifying one of the subscriber-side apparatus to which the user apparatus of the transmission source is connected and the subscriber-side apparatus of the transmission source, and registers the transmission source ID, the identifier information, and the transfer instruction information indicating the transmission system associated with the identifier information in advance in said table in association with each other.

2. A station-side apparatus according to claim 1, further comprising an upstream input unit that gives the transfer instruction information indicating the transmission system associated with the identifier information of the upstream frame in advance to the upstream frame received by said reception circuit, wherein said transmission source ID registration unit acquires the transmission source ID, the identifier information, and the transfer instruction information from the upstream frame, and registers the transmission source ID, the identifier information, and the transfer instruction information in said table.

3. A station-side apparatus according to claim 1, wherein said transmission source ID registration unit further registers, in said table, information about a reception state from the transmission source ID for identifying one of the user apparatus and the subscriber-side apparatus of the transmission source of the upstream frame when registering the identifier information and the transfer instruction information, and checks the information about the reception state from each transmission source ID registered in said table at a predetermined period, sets the transmission source ID whose reception from the transmission source ID has not been confirmed during the period in a disable state, and overwrites new registration contents on the registration contents of said table concerning the transmission source ID set in the disable state.

4. A station-side apparatus comprising:

a reception circuit that receives an upstream frame from a subscriber-side apparatus connected via an optical transmission channel;

a transmission/reception circuit that transmits the upstream frame to a host apparatus connected via an interface and receives a downstream frame from the host apparatus via the interface;

a plurality of transmission circuits that are provided in correspondence with a plurality of transmission systems, respectively, and transmit the downstream frame to the subscriber-side apparatus via the optical transmission channel at transmission speeds preset via the optical transmission channel;

a frame transfer processing unit that transfers the upstream frame received by said reception circuit to said transmission/reception circuit and transfers the downstream frame received by said transmission/reception circuit to said transmission circuits; and a table in which a destination ID for identifying one of a user apparatus and the subscriber-side apparatus serving as a destination of the downstream frame, identifier information for identifying one of the subscriber-side apparatus to which the user apparatus is connected and the subscriber-side apparatus serving as the destination, and transfer instruction information indicating the transmission system of an output destination of the downstream frame are registered in association with each other, wherein said frame transfer processing unit acquires, from said table, the identifier information and the transfer instruction information associated with the destination ID of the downstream frame received by said transmission/reception circuit, gives the identifier information to the downstream frame, and transfers the downstream frame to, out of said plurality of transmission circuits, said transmission circuit of the transmission system indicated by the transfer instruction information, further comprising a plurality of buffers provided for the plurality of transmission systems, respectively, wherein said frame transfer processing unit acquires, from said table, the identifier information and the transfer instruction information associated with the destination ID of the downstream frame received by said transmission/reception circuit, writes the identifier information and the transfer instruction information in the downstream frame, writes the downstream frame in said buffer of the transmission system indicated by the transfer instruction information written in the downstream frame, reads out the downstream frame written in said buffer, and transfers the downstream frame to said transmission circuit of the transmission system to which said buffer belongs.

5. A station-side apparatus according to claim 4, wherein said frame transfer processing unit comprises:

a destination ID search unit that reads out the identifier information and the transfer instruction information associated with the destination ID from said tale using the destination ID included in the downstream frame from the host apparatus as a key;

an information write unit that writes the identifier information and the transfer instruction information read out by said destination ID search unit in the downstream frame from the host apparatus;

a buffer write control unit that writes the downstream frame in said buffer of the transmission system indicated by the transfer instruction information written in the downstream frame by said information write unit; and a buffer read control unit that is provided for each of the plurality of transmission systems, reads out the downstream frame written in said buffer of the transmission system to which said buffer read control unit belongs, and transfers the readout downstream frame to said transmission circuit of the transmission system to which said buffer read control unit belongs.

6. A station-side apparatus according to claim 5, wherein when the transfer instruction information written in the downstream frame by said information write unit indicates all of the plurality of transmission systems, said buffer write control unit writes the downstream frame in said buffers of all the transmission systems.

7. A station-side apparatus according to claim 5, wherein said frame transfer processing unit comprises:
a priority determination unit that determines a type of priority of the downstream frame based on information written in the downstream frame from the host apparatus and representing the priority of the downstream frame; and
a downstream priority instruction unit that writes priority information representing the type of the priority of the downstream frame determined by said priority determination unit in the downstream frame from the host apparatus,
said buffer comprises buffer circuits in number corresponding to the type of the priority for each transmission system,
said buffer write control unit writes the downstream frame in said buffer circuit indicated by the transfer instruction information and the priority information written in the downstream frame, and
said buffer read control unit reads out the downstream frame written in said buffer circuit while giving higher priority to readout from said buffer circuit on high priority side out of said buffer circuits of the transmission system to which said buffer read control unit belongs, based on an instruction from said buffer write control unit.

8. A station-side apparatus comprising:
a reception circuit that receives an upstream frame from a subscriber-side apparatus connected via an optical transmission channel;
a transmission/reception circuit that transmits the upstream frame to a host apparatus connected via an interface and receives a downstream frame from the host apparatus via the interface;
a plurality of transmission circuits that are provided in correspondence with a plurality of transmission systems, respectively, and transmit the downstream frame to the subscriber-side apparatus via the optical transmission channel at transmission speeds preset via the optical transmission channel;
a frame transfer processing unit that transfers the upstream frame received by said reception circuit to said transmission/reception circuit and transfers the downstream frame received by said transmission/reception circuit to said transmission circuits; and
a table in which a destination ID for identifying one of a user apparatus and the subscriber-side apparatus serving, as a destination of the downstream frame, identifier information for identifying one of the subscriber-side apparatus to which the user apparatus is connected and the subscriber-side apparatus serving as the destination, and transfer instruction information indicating, the transmission system of an output destination of the downstream frame are registered in association with each other,
wherein said frame transfer processing unit acquires, from said table, the identifier information and the transfer instruction information associated with the destination ID of the downstream frame received by said transmission/reception circuit, gives the identifier information to the downstream frame, and transfers the downstream frame to, out of said plurality of transmission circuits, said transmission circuit of the transmission system indicated by the transfer instruction information, further comprising:
an upstream input unit that writes, in the upstream frame, downstream output speed information associated in advance with the identifier information written in the upstream frame from the subscriber-side apparatus; and
a transmission source ID registration unit that confirms whether the transmission source ID written in the upstream frame from the subscriber-side apparatus to identify one of the user apparatus and the subscriber-side apparatus of a transmission source of the upstream frame is registered in said table, and when the transmission source ID is not registered in said table, registers the downstream output speed information written in the upstream frame in said table as the transfer instruction information in association with the transmission source ID written in the upstream frame and the identifier information.

9. A station-side apparatus comprising:
a reception circuit that receives an upstream frame from a subscriber-side apparatus connected via an optical transmission channel;
a transmission/reception circuit that transmits the upstream frame to a host apparatus connected via an interface and receives a downstream frame from the host apparatus via the interface;
a plurality of transmission circuits that are provided in correspondence with a plurality of transmission systems, respectively, and transmit the downstream frame to the subscriber-side apparatus via the optical transmission channel at transmission speeds preset via the optical transmission channel;
a frame transfer processing unit that transfers the upstream frame received by said reception circuit to said transmission/reception circuit and transfers the downstream frame received by said transmission/reception circuit to said transmission circuits; and
a table in which a destination ID for identifying one of a user apparatus and the subscriber-side apparatus serving as a destination of the downstream frame identifier information for identifying one of the subscriber-side apparatus to which the user apparatus is connected and the subscriber side apparatus serving as the destination, and transfer instruction information indicating the transmission system of an output destination of the downstream frame are registered in association with each other,
wherein said frame transfer processing unit acquires, from said table, the identifier information and the transfer instruction information associated with the destination ID of the downstream frame received by said transmission/reception circuit, gives the identifier information to the downstream frame, and transfers the downstream frame to, out of said plurality of transmission circuits, said transmission circuit of the transmission system indicated by the transfer instruction information, further comprising:
a plurality of input FIFOs and output FIFOs provided for each of the plurality of transmission systems; and
a memory that stores frame data of the downstream frame,
wherein said frame transfer processing unit acquires, from said table, the identifier information and the transfer instruction information associated with the destination ID of the downstream frame received by said transmission/reception circuit, writes the identifier information and the transfer instruction information in the downstream frame, and writes the downstream frame in one of said input FIFO and said output FIFO of the transmission system indicated by the transfer instruction information written in the downstream frame, and simultaneously controls transfer of the frame data from said input FIFO to said output FIFO, transfer of the frame data from said input FIFO to said memory, and transfer of the frame data from said memory to said output FIFO in accordance with internally generated control information, reads out the downstream frame written in said output FIFO, and transfers the downstream frame to said transmission circuit of the transmission system to which said output FIFO belongs.

10. A station-side apparatus according to claim 9, wherein said frame transfer processing unit further comprises:
- a destination ID search unit that reads out, from said table, the identifier information and the transfer instruction information associated with the destination ID using the destination ID included in the downstream frame from the host apparatus as a key;
- an information write unit that writes the identifier information and the transfer instruction information read out by said destination ID search unit in the downstream frame from the host apparatus;
- a FIFO write control unit that writes the downstream frame in one of said input FIFO and said output FIFO of the transmission system indicated by the transfer instruction information written in the downstream frame by said information write unit and a control signal from an access arbitration unit;
- an output FIFO read control unit that is provided for each of the plurality of transmission systems, reads out the downstream frame written in said output FIFO of the transmission system to which said output FIFO read control unit belongs, and transfers the readout downstream frame to said transmission circuit of the transmission system to which said output FIFO read control unit belongs; and
- said access arbitration unit that mediates write of the downstream frame to said output FIFO by said FIFO write control unit, and simultaneously controls transfer of the frame data from said input FIFO to said output FIFO, transfer of the frame data from said input FIFO to said memory, and transfer of the frame data from said memory to said output FIFO.

11. A station-side apparatus according to claim 10, wherein when a total data size of the frame data written in said input FIFO exceeds a predetermined value, said access arbitration unit transfers the data in said input FIFO to said memory at once.

12. A station-side apparatus according to claim 10, wherein when the transfer instruction information written in the downstream frame by said information write unit indicates all of the plurality of transmission systems, said FIFO write control unit writes the downstream frame in said input FIFOs or said output FIFOs of all the transmission systems.

13. A station-side apparatus according to claim 10, wherein said frame transfer processing unit comprises:
- a priority determination unit that determines a type of priority of the downstream frame based on information written in the downstream frame from the host apparatus and representing the priority of the downstream frame; and
- a downstream priority instruction unit that writes priority information representing the type of the priority of the downstream frame determined by said priority determination unit in the downstream frame from the host apparatus,
- said input FIFO comprises input FIFO circuits in number corresponding to the type of the priority for each transmission system,
- said output FIFO comprises output FIFO circuits in number corresponding to the type of the priority for each transmission system,
- said FIFO write control unit writes the downstream frame in one of said input FIFO circuit and said output FIFO circuit indicated by the transfer instruction information and the priority information written in the downstream frame and the control signal from said access arbitration unit, and
- said output FIFO read control unit reads out the downstream frame written in said output FIFO circuit while giving higher priority to readout from said output FIFO circuit on high priority side out of said output FIFO circuits of the transmission system to which said output FIFO read control unit belongs.

* * * * *

UNITED STATES PATENT AND TRADEMARK OFFICE
CERTIFICATE OF CORRECTION

| | | |
|---|---|---|
| PATENT NO. | : 9,178,616 B2 | Page 1 of 1 |
| APPLICATION NO. | : 14/119186 | |
| DATED | : November 3, 2015 | |
| INVENTOR(S) | : Kawamura et al. | |

It is certified that error appears in the above-identified patent and that said Letters Patent is hereby corrected as shown below:

In the Claims

Column 57, Claim 8, line 57, delete "information indicating, the" and insert -- information indicating the --

Column 58, Claim 9, line 41, delete "downstream frame identifier" and insert -- downstream frame, identifier --

Column 58, Claim 9, line 44, delete "subscriber side apparatus" and insert -- subscriber-side apparatus --

Signed and Sealed this
Seventh Day of June, 2016

Michelle K. Lee
*Director of the United States Patent and Trademark Office*